United States Patent
So et al.

(10) Patent No.: US 11,433,815 B2
(45) Date of Patent: Sep. 6, 2022

(54) DISPLAY SYSTEM

(71) Applicant: PANASONIC INTELLECTUAL PROPERTY MANAGEMENT CO., LTD., Osaka (JP)

(72) Inventors: Shoji So, Osaka (JP); Kenji Nagatomi, Osaka (JP); Norihiro Imamura, Osaka (JP); Michihiro Yamagata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 318 days.

(21) Appl. No.: 16/883,412

(22) Filed: May 26, 2020

(65) Prior Publication Data

US 2020/0377021 A1    Dec. 3, 2020

(30) Foreign Application Priority Data

May 31, 2019 (JP) .............................. JP2019-103353
Jul. 11, 2019 (JP) .............................. JP2019-129669
(Continued)

(51) Int. Cl.
  *B60R 1/12* (2006.01)
  *G02B 27/14* (2006.01)
  (Continued)

(52) U.S. Cl.
  CPC .................. *B60R 1/12* (2013.01); *B60R 1/04* (2013.01); *G02B 5/3083* (2013.01);
  (Continued)

(58) Field of Classification Search
  CPC ..... B60R 1/12; B60R 1/04; B60R 2001/1253; B60R 2300/20; B60R 2300/8066;
  (Continued)

(56) References Cited

U.S. PATENT DOCUMENTS 10,882,454 B2 * 1/2021 Imamura ................ H04N 7/181
11,110,861 B2 * 9/2021 Imamura ................ H04N 7/183
(Continued)

FOREIGN PATENT DOCUMENTS

JP  2017-210229     11/2017
JP  2020-62947       4/2020
JP  2020062947 A  *  4/2020

OTHER PUBLICATIONS

Office Action dated Mar. 16, 2021 issued in Japanese Patent Application No. 2019-225835 along with an English translation.

*Primary Examiner* — James M Pontius
(74) *Attorney, Agent, or Firm* — Greenblum & Bernstein, P.L.C.

(57) ABSTRACT

A display system includes: a display device; a reflection optical system; a housing; and a shield member. The reflection optical system includes at least a last reflective member on which light, emerging from a display screen of the display device, is incident either directly or indirectly. The shield member is held by the housing to assume either a shielding state or an unshielding state. The shielding state is a state where the shield member at least partially cuts off light incident on, or reflected from, the last reflective member. The unshielding state is a state where the shielding state is canceled. The shield member in the shielding state reflects, toward the viewer's eyes, external light impinging on the housing. The housing has a holding structure to hold the shield member, no matter whether the shield member assumes the shielding state or the unshielding state.

20 Claims, 36 Drawing Sheets

(30) Foreign Application Priority Data

Jul. 11, 2019 (JP) .............................. JP2019-129670
Nov. 25, 2019 (JP) .............................. JP2019-212702
Dec. 13, 2019 (JP) .............................. JP2019-225835

(51) Int. Cl.
    *G02B 5/30*      (2006.01)
    *B60R 1/04*      (2006.01)

(52) U.S. Cl.
    CPC .... *G02B 27/142* (2013.01); *B60R 2001/1253* (2013.01); *B60R 2300/20* (2013.01); *B60R 2300/8066* (2013.01)

(58) Field of Classification Search
    CPC . B60R 1/00; B60R 16/023; B60R 2300/8026; G02B 5/3083; G02B 27/142; G02B 2027/0156; G02B 27/0101; G02B 2027/015; G02F 1/13306; H04N 7/18
    See application file for complete search history.

(56) References Cited

U.S. PATENT DOCUMENTS

| | | | |
|---|---|---|---|
| 11,235,706 B2* | 2/2022 | Imamura | B60R 1/00 |
| 2020/0070726 A1* | 3/2020 | Imamura | G02B 27/0018 |
| 2020/0377021 A1* | 12/2020 | So | B60R 1/12 |
| 2021/0129755 A1* | 5/2021 | Imamura | G02B 5/10 |
| 2021/0197725 A1* | 7/2021 | Imamura | B60R 1/08 |
| 2021/0261058 A1* | 8/2021 | Nagatomi | B60R 1/08 |

* cited by examiner

DISPLAY SYSTEM

CROSS-REFERENCE TO RELATED APPLICATION

The present application is based upon, and claims the benefit of foreign priority to, Japanese Patent Application No. 2019-103353 filed on May 31, 2019, Japanese Patent Application No. 2019-129669 filed on Jul. 11, 2019, Japanese Patent Application No. 2019-129670 filed on Jul. 11, 2019, Japanese Patent Application No. 2019-212702 filed on Nov. 25, 2019, and Japanese Patent Application No. 2019-225835 filed on Dec. 13, 2019, the entire contents of which are hereby incorporated by reference.

TECHNICAL FIELD

The present disclosure generally relates to a display system, and more particularly relates to a display system for displaying an image.

BACKGROUND ART

JP 2017-210229 A discloses a display system for vehicles. This display system for vehicles includes: a display device for displaying an image thereon; a half mirror for reflecting the image displayed on the display device; and a concave mirror for further reflecting the image that has been reflected from the half mirror. The half mirror transmits the image that has been reflected from the concave mirror to make the driver or passenger view the image. This display system for vehicles further includes an angle adjustment unit for adjusting the angle of a housing with respect to the driver/passenger's viewpoint. When the housing is placed at a first predetermined position by the angle adjustment unit, the half mirror reflects the image being displayed on the display device to make the driver/passenger view the image. In such a situation, the display system for vehicles is used as an electronic mirror. On the other hand, when the housing is placed at a second predetermined position, which is different from the first predetermined position, by the angle adjustment unit, the half mirror reflects a rear view from the vehicle to make the driver/passenger monitor the view. In such a situation, the display system for vehicles is used as an optical mirror.

The display system for vehicles is selectively used as an electronic mirror or an optical mirror by having its housing tilted entirely, and the angle of the housing adjusted, by the angle adjustment unit. This allows, when an error occurs in the display operation by the display device, the driver/passenger to switch the position of the housing to the second predetermined position using the angle adjustment unit to use the display system for vehicles as an optical mirror and thereby monitor a rear view or side view from the vehicle.

This display system for vehicles, however, needs to have its housing tilted significantly to switch its position from the first predetermined position to the second predetermined position when used as an optical mirror. When the entire housing is tilted so significantly, the driver/passenger's sight in front of the vehicle is sometimes obstructed.

SUMMARY

The present disclosure provides a display system which is able to display an alternative image even when an error occurs in the display operation by the display device, and thereby reduce the chances of the viewer's sight being obstructed by the housing.

A display system according to an aspect of the present disclosure includes: a display device having a display screen; a reflection optical system including at least a last reflective member; a housing; and a shield member. On the last reflective member, light that has emerged from the display screen of the display device is incident either directly or indirectly. The last reflective member reflects the light toward a viewer's eyes. The housing holds the display device and the reflection optical system. The shield member is held by the housing to assume either a shielding state or an unshielding state. The shielding state is a state where the shield member at least partially cuts off light incident on, or reflected from, the last reflective member. The unshielding state is a state where the shielding state is canceled. The shield member in the shielding state reflects, toward the viewer's eyes, external light impinging on the housing. The housing has a holding structure to hold the shield member, no matter whether the shield member assumes the shielding state or the unshielding state.

DESCRIPTION OF EMBODIMENTS

Note that the drawings to be referred to in the following description of embodiments are all schematic representations. That is to say, the ratio of the dimensions (including thicknesses) of respective constituent elements illustrated on the drawings does not always reflect their actual dimensional ratio.

First Embodiment (1) Overview

Figure 1:
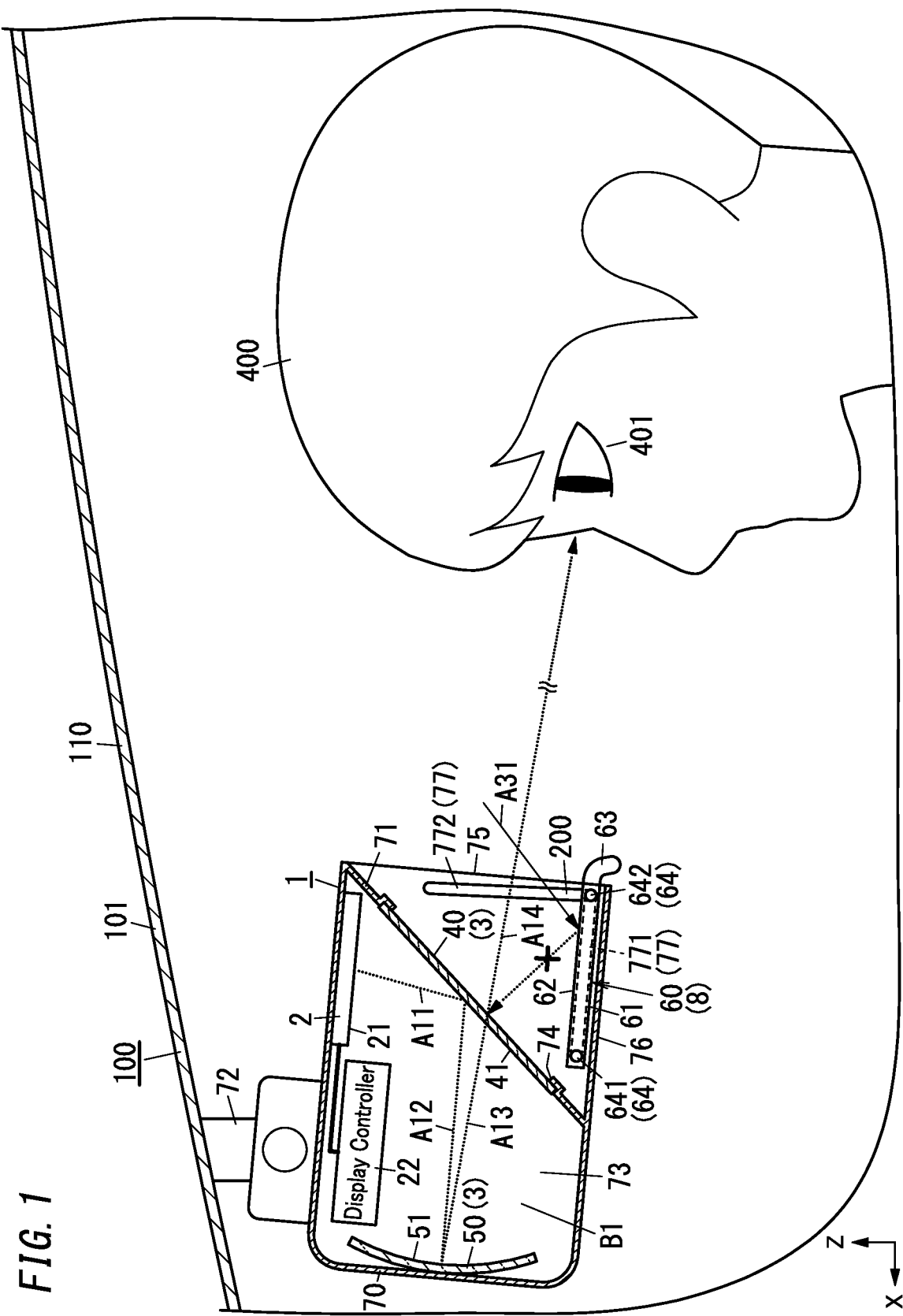
FIG. 1 schematically illustrates a display system according to a first embodiment of the present disclosure in a situation where its mirror member is located at a first position.
Figure 2:
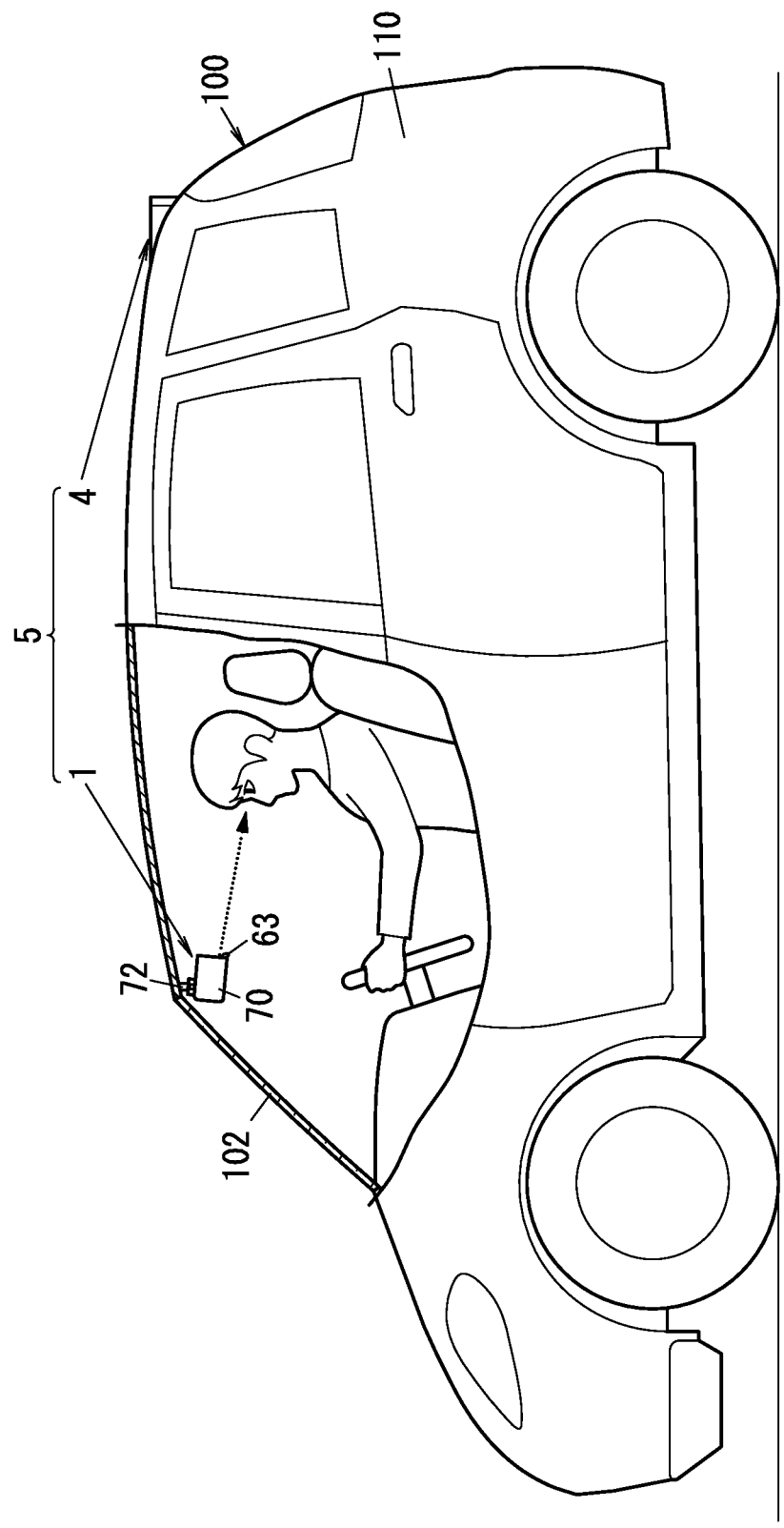
FIG. 2 schematically illustrates a moving vehicle equipped with an electronic mirror system including the display system.
Figure 3:
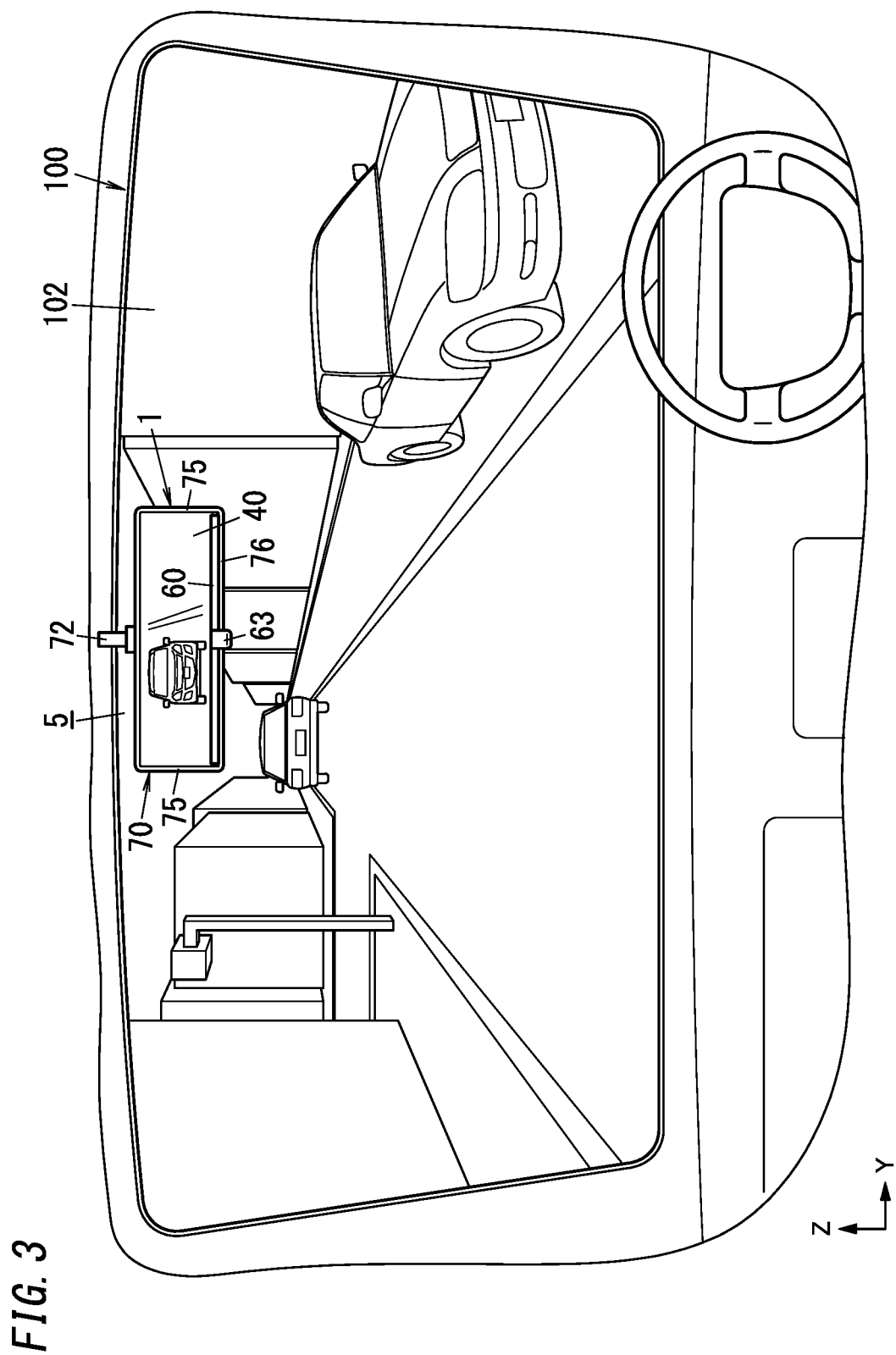
FIG. 3 illustrates how the electronic mirror system may be used.

A display system 1 according to this embodiment may be used in an automobile 100 as an exemplary moving vehicle as shown in FIGS. 1-3.

As shown in FIG. 1, the display system 1 includes: a display device 2 having a display screen 21; a reflection optical system B1 including at least a last reflective member 50; a housing 70 to hold the display device 2 and the reflection optical system B1; and a shield member 8.

On the last reflective member 50, light that has emerged from the display screen 21 of the display device 2 is incident either directly or indirectly. The last reflective member 50 reflects the incident light toward a viewer's 400 eyes 401.

The shield member 8 is held by the housing 70 to assume either a shielding state or an unshielding state. The shielding state is a state where the shield member 8 at least partially cuts off light incident on, or reflected from, the last reflective member 50. The unshielding state is a state where the shielding state is canceled. Also, in the shielding state, the shield member 8 reflects, toward the viewer's 400 eyes 401, external light impinging on the housing 70. The housing 70 has a holding structure 200 to hold the shield member 8, no matter whether the shield member 8 assumes the shielding state or the unshielding state.

As used herein, if the light that has emerged from the display screen 21 of the display device 2 is "indirectly incident on" the last reflective member 50, it means that the light that has emerged from the display screen 21 is incident on the last reflective member 50 after having been reflected or refracted by one or more optical members such as a mirror, a lens, and/or a prism.

Also, the reflection optical system B1 includes one or more reflective members (including the last reflective member 50). The reflection optical system B1 causes the light that has emerged from the display screen 21 of the display device 2 to be reflected at least once from one or more reflective members and then allows the reflected light to be incident on the viewer's 400 eyes 401. That is to say, the last reflective member 50 is the reflective member that reflects the light that has emerged from the display screen 21 of the display device 2 for the last time, out of the one or more reflective members that the reflection optical system B1 has, and that allows the reflected light to be incident on the viewer's 400 eyes 401.

Note that when the shield member 8 is "held" by the holding structure 200, the holding structure 200 for holding at least the shield member 8 may be secured integrally to, and inseparable from, the housing 70. For example, the holding structure 200 may be secured in advance to the housing 70 so as to be inseparable from the housing 70, and the shield member 8 may be mounted removably to that holding structure 200. Alternatively, both the shield member 8 and the holding structure 200 may be secured integrally to the housing 70 so as to be inseparable from the housing 70. Furthermore, when the shield member 8 is "held" by the holding structure 200, the shield member 8 may be "housed" in the housing 70. As used herein, the shield member 8 "housed" in the housing 70 may be literally located entirely inside the closure formed by the housing 70 or may be attached to a non-closed external part of the housing 70 so that a major part of the shield member 8 falls within a projection range of the housing 70. When the major part of the shield member 8 falls within the projection range of the housing 70, it means that when the housing 70 is viewed in an arbitrary viewing direction, the shield member 8 falls within the closure formed by the housing 70.

Also, as used herein, the "shielding state" refers to a state where the light incident on, or reflected from, the last reflective member 50 is at least partially cut off by the shield member 8 and the external light impinging on the housing 70 is reflected by the shield member 8 toward the viewer's 400 eyes 401. When held in the shielding state by the holding structure 200, the shield member 8 cuts off the light incident on, or reflected from, the last reflective member 50 at least partially, thereby suspending the display operation based on the image produced on the display screen 21 of the display device 2. In addition, when held in the shielding state by the holding structure 200, the shield member 8 reflects, toward the viewer's 400 eyes 401, the external light impinging on the housing 70. This allows the display system 1 to serve as an optical mirror.

Meanwhile, the "unshielding state" refers herein to a state where the shield member 8 has canceled cutting off the light incident on, or reflected from, the last reflective member 50, i.e., a state where the light incident on, or reflected from, the last reflective member 50 is not cut off by the shield member 8. In the unshielding state, the light that has emerged from the display screen 21 of the display device 2 is reflected from the reflection optical system B1 and then incident on the viewer's 400 eyes 401. This allows the viewer 400 to view an image based on the image produced on the display screen 21 of the display device 2. In the following description, the latter image will be hereinafter referred to as a "first image" and the former image will be hereinafter referred to as a "second image."

In some cases, an error may occur in the display operation by the display device 2. For example, no image may be produced on the display screen 21 due to a failure of the display device 2. In addition, when the display device 2 is supposed to display an image captured by an image capture device 4, the display device 2 may fail to perform the display operation normally due to either a failure of the image capture device 4 or a communication error that has occurred between the image capture device 4 and the display device 2. In this display system 1, when an error occurs in the display operation by the display device 2 due to a failure of the display device 2 or for any other reason, the state of the shield member 8 is switched into the shielding state, thereby making the display system 1 serve as an optical mirror. Therefore, compared to a situation where the half mirror 40 included in the reflection optical system B1 is used as an optical mirror by adjusting the angle of the entire housing 70 without using the shield member 8, the tilt angle of the housing 70 may be reduced significantly. This allows the display system 1 according to this embodiment to display an alternative image even when any error occurs in the display operation by the display device 2, and yet reduce the chances of the viewer's 400 sight being obstructed by the housing 70. Furthermore, the shield member 8 is held by the holding structure 200 onto the housing 70 in each of the shielding state and the unshielding state. This also saves the trouble of having the shield member 8 held onto the housing 70 in each of the shielding state and the unshielding state, compared to a situation where the shield member 8 is separated from the housing 70.

Figure 4:
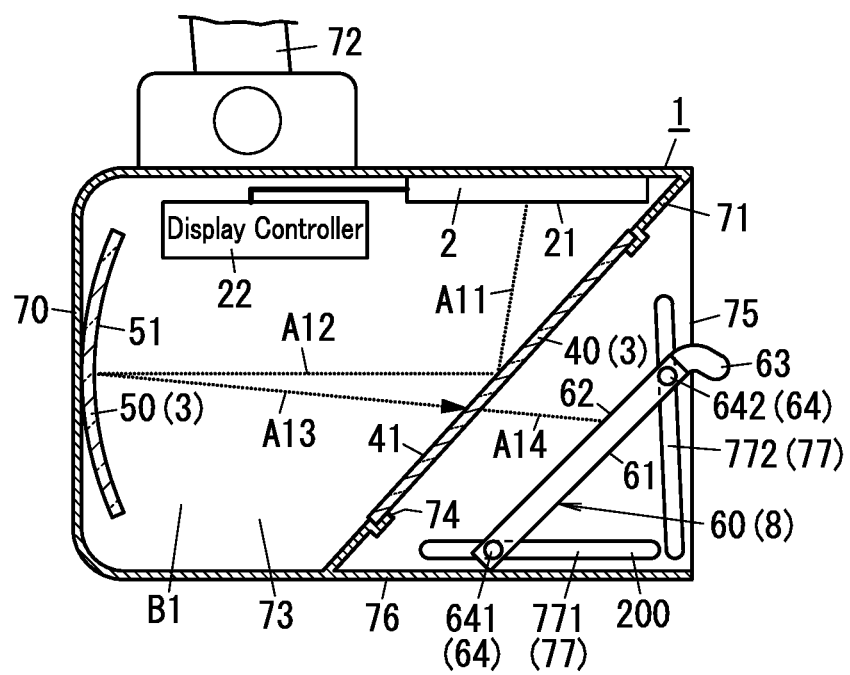
FIG. 4 schematically illustrates the display system in a situation where the mirror member is located halfway between the first position and the second position.
Figure 5:
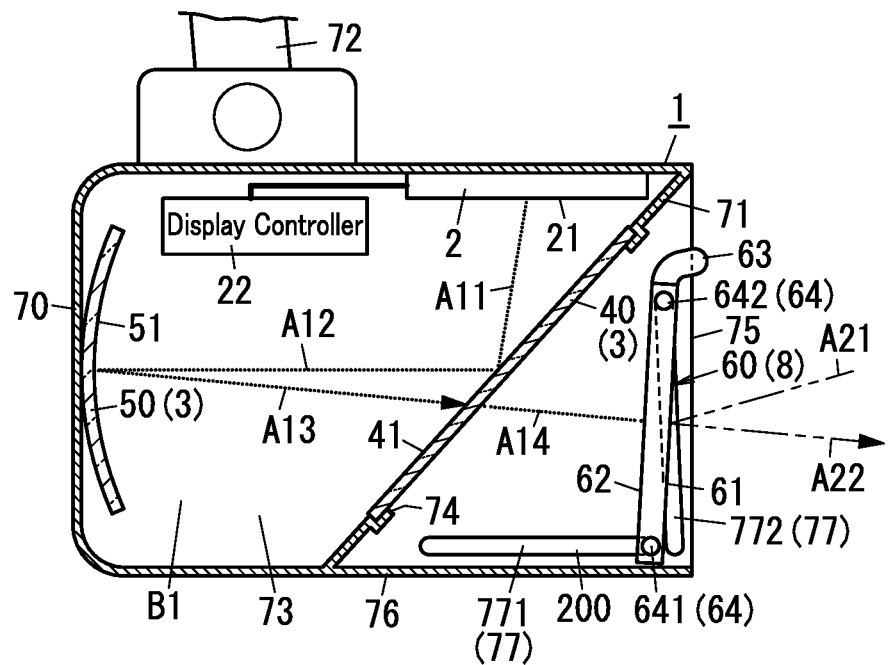
FIG. 5 schematically illustrates the display system in a situation where the mirror member is located at the second position.

Note that in FIGS. 1, 4, and 5, the optical paths A11-A14 along which the light that has emerged from around the center of the display screen 21 of the display device 2 is transmitted through the half mirror 40 and then goes out of the housing 70 are indicated by the dotted lines. In FIG. 5, the optical paths A21 and A22 along which the external light incident onto around the center of the mirror member 60 from outside of the housing 70 is reflected from the mirror member 60 are indicated by the two-dot chain lines. Note that in FIGS. 1, 4, and 5, the dotted lines and two-dot chain lines indicating the optical paths A11-A14, A21, and A22 are virtual lines shown on those drawings just for the sake of convenience.

(2) Details

A display system 1 and an electronic mirror system 5 according to the first embodiment will be described in detail with reference to FIGS. 1-6. In the following description, the X-axis direction shown in FIG. 1 is defined herein as the forward/backward direction, the Z-axis direction shown in FIGS. 1 and 3 is defined herein as the upward/downward direction, and the Y-axis direction shown in FIG. 3 is defined herein as the rightward/leftward direction. Also, the positive X-axis direction is defined herein as the forward direction, the positive Y-axis direction is defined herein as the rightward direction, and the positive Z-axis direction is defined herein as the upward direction. Note that these directions are only examples and do not define the directions in which the display system 1 and electronic mirror system 5 should be used. Also, even though arrows indicating these directions are shown in FIGS. 1-6, these arrows are just shown there as an assistant to description and are insubstantial ones.

(2.1) Configuration

As described above, the display system 1 according to this embodiment includes the display device 2, the reflection optical system B1 including at least the last reflective member 50, a mirror member 60 serving as the shield member 8, and the housing 70. The display system 1 further includes a display controller 22.

In this embodiment, the reflection optical system B1 further includes a half mirror 40. The light that has emerged from the display screen 21 of the display device 2 is incident on the last reflective member 50 via the half mirror 40, and the light reflected from the last reflective member 50 is transmitted through the half mirror 40 and then incident on the viewer's 400 eyes 401.

In this embodiment, the housing 70 is provided with, as the shield member 8, a mirror member 60 in a plate shape. One surface of the mirror member 60 is a reflective surface 61. The mirror member 60 switches its state from a first state to a second state, and vice versa, by performing a sliding operation and a rotational operation. The first state is the unshielding state in which the mirror member 60 is placed at a first position outside of an optical path of the light reflected from the last reflective member 50 to be incident on the viewer's 400 eyes 401. The second state is the shielding state in which the mirror member 60 is placed at a second position between the last reflective member 50 and the viewer 400 with the reflective surface 61 oriented toward the viewer 400 and in which the external light coming from outside of the housing 70 is reflected from the reflective surface 61 to produce a reflected image on the viewer's 400 eyes 401. That is to say, the shield member 8 is an optical mirror (mirror member 60). The optical mirror (mirror member 60) has the reflective surface 61, which reflects, when the shield member 8 assumes the shielding state, the incoming external light toward the direction in which the light is reflected from the last reflective member 50 (in the unshielding state).

The display system 1 according to this embodiment and the image capture device 4 (see FIG. 2) together form the electronic mirror system 5. The display device 2 displays, on the display screen 21, an image captured by the image capture device 4. The electronic mirror system 5 is mounted on the moving vehicle body 110 of an automobile 100 as an exemplary moving vehicle. That is to say, the moving vehicle (automobile 100) includes the electronic mirror system 5 and the moving vehicle body 110 to mount the electronic mirror system 5 thereon.

The housing 70 of the display system 1 may be a molded product of a synthetic resin, for example. The housing 70 may be formed in the shape of a rectangular parallelepiped with an internal chamber 73. The housing 70 is formed in such a shape that when mounted on the moving vehicle body 110, its dimension measured in the rightward/leftward direction (i.e., along the width of the vehicle) is larger than its dimension measured in the upward/downward direction or its dimension measured in the forward/backward direction with respect to the moving vehicle body 110. In the chamber 73 of the housing 70, housed are the display device 2, the reflection optical system B1 including the last reflective member 50, and the display controller 22.

The housing 70 is installed on a front portion, located close to a windshield 102, of the roof 101 of the moving vehicle body 110 so as to come into sight of the viewer 400 who is seated in the driver's seat (see FIG. 2). The housing 70 is mounted on the roof 101 of the moving vehicle body 110 via a supporting member 72 such as a ball joint so as to be suspended from the roof 101 and is arranged in front of the viewer 400. The supporting member 72 includes an adjusting mechanism (such as the ball joint) for adjusting the orientation of the housing 70. In the example illustrated in FIGS. 1 and 2, the supporting member 72 is arranged in an upper part of the housing 70 and suspended from the roof 101. However, this is only an example and should not be construed as limiting. Alternatively, the supporting member may also be arranged in a rear part (i.e., a part closer to the front end of the vehicle) of the housing 70 to mount the housing 70 onto the windshield 102.

A rear wall 71 of the housing 70 is inclined obliquely and has a through hole 74. The dimension of the through hole 74 as measured in the rightward/leftward direction (i.e., the direction perpendicular to the upward/downward direction and the forward/backward direction) is larger than its dimension as measured in the upward/downward direction. The ratio of its dimension as measured in the rightward/leftward direction (i.e., its longer-side dimension) to its dimension as measured in the upward/downward direction (i.e., its shorter-side dimension) may be approximately 3:1 to 6:1. The half mirror 40 is fitted into the through hole 74. In addition, the housing 70 further includes, as its integral parts, lateral hood parts 75 protruding backward from the right and left side edges of the rear wall 71 and a lower hood part 76 protruding backward from the lower side edge of the rear wall 71. In this case, the lateral hood parts 75 and the lower hood part 76 form respective parts of a single integral hood.

The display device 2 is housed in an upper part of the chamber 73 with the display screen 21 facing downward. The display device 2 lets light, forming an image, emerge from itself. The display device 2 includes a light source and a liquid crystal display (LCD) panel, for example. The LCD panel is arranged in front of the light source. The light source is used as a backlight for the LCD panel. The light source is a so-called "surface-emitting light source." The light source is a side-lighting light source that uses a solid-state light-emitting element such as a light-emitting diode or a laser diode. The light emitted from the light source is transmitted through the LCD panel and then emerges from the display screen 21 of the display device 2. The image is formed by the light that has emerged from the display screen 21 of the display device 2.

The display system 1 according to this embodiment includes, as two or more reflective members 3 for reflecting the light that has emerged from the display screen 21 of the display device 2, the half mirror 40 and the last reflective member 50. In other words, the display system 1 includes the reflection optical system B1 constituted of the half mirror 40 and the last reflective member 50.

The half mirror 40 is fitted into the through hole 74 cut through the rear wall 71 of the housing 70. The half mirror 40 has a light-transmitting property. That is to say, the half mirror 40 has the capability of transmitting a part of the incoming light and reflecting almost the rest of the incoming light. In this embodiment, the half mirror 40 is implemented as a beam splitter in a flat plate shape having an optical transmittance of approximately 50% and an optical reflectance of approximately 50%. The half mirror 40 is arranged obliquely with respect to the upward/downward direction such that the upper end of the half mirror 40 protrudes backward with respect to the lower end of the half mirror 40.

The surface, facing the chamber 73 (hereinafter referred to as the "inner surface"), of the half mirror 40 faces the display screen 21 of the display device 2 and the reflective surface 51 of the last reflective member 50 (hereinafter referred to as the "last reflective surface"). As used herein, if two surfaces or parts "face each other," it may naturally mean that two surfaces or parts are arranged parallel to each other but may also mean that the two surfaces or parts are arranged non-parallel to each other (i.e., one of the two surfaces or parts is inclined with respect to the other). In this embodiment, the half mirror 40 is arranged such that a normal to the inner surface 41 thereof intersects obliquely with the direction in which the light that has emerged from the display screen 21 of the display device 2 is incident on the half mirror 40 and with the direction in which the light reflected from the reflective surface 51 is incident on the half mirror 40. In this embodiment, the inner surface 41 that is the reflective surface, from which the light coming from the display device 2 is reflected, is a flat surface. However, this is only an example and should not be construed as limiting. The inner surface 41 may also be a curved surface such as a free-form surface. Forming the inner surface 41 of the half mirror 40 as a free-form surface allows the distortion of the image produced on the reflective surface 51 to be reduced, the curvature of the image plane to be reduced, and the resolution to be increased.

The last reflective member 50 may be configured as a concave mirror, for example. The reflective surface 51 of the last reflective member 50 may be formed by evaporating a reflective metal film of aluminum, for example, on the surface of glass. The last reflective member 50 is arranged in a front region of the chamber 73 with the reflective surface 51 facing backward. In other words, the last reflective member 50 is arranged inside the chamber 73 so as to face the inner surface 41 of the half mirror 40. Note that the last reflective member 50 does not have to be a concave mirror but may also be a plane mirror, for example.

In this embodiment, the inner surface 41 of the half mirror 40 reflects a part of the light that has emerged from the display screen 21 of the display device 2 toward the reflective surface 51 of the last reflective member 50. The reflective surface 51 of the last reflective member 50 further reflects, toward the half mirror 40, the light that has been reflected from the inner surface 41 of the half mirror 40. The half mirror 40 transmits a part of the light coming from the last reflective member 50 and the light transmitted through the half mirror 40 is eventually incident on the viewer's 400 eyes 401. This allows the viewer 400 to view an image based on the image produced on the display screen 21 of the display device 2. That is to say, the viewer 400 views the image that has been reflected from the half mirror 40 and the last reflective member 50. Thus, to the viewer's 400 eyes, the image produced on the display device 2 looks as if the image were present beyond the reflective surface 51 (e.g., 1 to 3 meters ahead of his or her viewpoint) in the direction in which the viewer 400 views the reflective surface 51 of the last reflective member 50 through the half mirror 40. That is to say, the image produced on the display device 2 turns into a virtual image. Therefore, in a situation where the viewer 400 turns his or her eyes to the image (virtual image) displayed by the display system 1 while watching the situation in front of the automobile 100 through the windshield 102, it is much easier for the viewer 400 to adjust the focal length. In addition, the display device 2 lets the light emerge from itself obliquely (i.e., along the optical path A11) with respect to a normal to the display screen 21. Letting the light emerge obliquely in this manner allows the virtual image distance (i.e., the distance from the viewer's viewpoint to a point where the image is viewable) to be lengthened in an upper part of the image and shortened in a lower part of the image. A sense of perspective provided by an image captured by the image capture device 4 to represent a rear view from the automobile 100 resembles such a perspective that lengthens the virtual image distance in an upper part of the virtual image displayed by the display system 1 and shortens the virtual image distance in a lower part of the virtual image. This produces a pseudo sense of depth and allows the viewer 400 to sense the distance to the following vehicle more easily. Nevertheless, if the display device 2 lets the outgoing light emerge obliquely, then trapezoidal distortion could be produced in the virtual image. The trapezoidal distortion of the virtual image may be reduced by setting, on the reflective surface 51, a reflection angle somewhat downwardly with respect to the incoming light.

The mirror member 60 is mounted to the housing 70 so as to reciprocate between a first position (i.e., the position of the mirror member 60 shown in FIG. 1) and a second position (i.e., the position of the mirror member 60 shown in FIG. 5). More specifically, the mirror member 60 serving as the shield member 8 is held by the holding structure 200 onto the housing 70 so as to reciprocate between the first position and the second position.

The first position is a position of the mirror member 60 where the mirror member 60 is located on, and parallel to, the lower hood part 76 of the housing 70. That is to say, the first position is located outside of the optical path of the light transmitted through the half mirror 40 to be incident on the viewer's 400 eyes 401 and the light reflected from the last reflective member 50 does not pass through the first position. Thus, in the first state where the mirror member 60 is located at the first position, the mirror member 60 assumes the unshielding state in which the mirror member 60 cancels cutting off the light reflected from the last reflective member 50, and therefore, the viewer 400 is able to view the reflected image (second image) produced by having the image (first image) on the display screen 21 of the display device 2 reflected by the reflection optical system B1.

The second position is a position of the mirror member 60 where the mirror member 60 is located between the half mirror 40 and the viewer 400. Specifically, the second position is a position where the mirror member 60 is arranged such that the surface of the mirror member 60 intersects, at an angle of approximately 90 degrees, with the optical path A14 of light transmitted through the half mirror 40 toward the viewer's 400 eyes 401. In the second state where the mirror member 60 is located at the second position, the mirror member 60 assumes the shielding state in which the light reflected from the last reflective member 50 is cut off. In addition, in the second state, the external light coming from outside of the housing 70 is reflected from the reflective surface 61 to impinge on the viewer's eyes. This allows the viewer to view the reflected image produced on the reflective surface 61.

Note that the first position does not have to be the position of the mirror member 60 shown in FIG. 1 but may also be changed as appropriate. Likewise, the second position does not have to be the position of the mirror member 60 shown in FIG. 5 but may also be changed as appropriate as long as the viewer 400 is able to view the reflected image produced on the reflective surface 61.

In this case, the mirror member 60 is arranged in the space surrounded with the lateral hood parts 75, the lower hood part 76, and the half mirror 40 (i.e., housed in the housing 70) at each of the first and second positions. This allows the mirror member 60 to be arranged without increasing the overall size of the housing 70.

The mirror member 60 is formed in the shape of a flat plate, of which a plan view is rectangular. The mirror member 60 has its dimensions set such that its dimensions as measured in the rightward/leftward direction and upward/downward direction when the mirror member 60 is located at the second position are the same as the apparent dimensions of the half mirror 40 as viewed from the viewer's 400 viewpoint. Thus, in the second state (shielding state) where the mirror member 60 is located at the second position, the half mirror 40 looks, to the viewer's 400 eyes 401, as if the half mirror 40 were covered entirely with the mirror member 60. Note that in the second state, the half mirror 40 does not have to look, to the viewer's 400 eyes 401, as if the half mirror 40 were covered entirely with the mirror member 60. Optionally, a part of the half mirror 40 may be visible to the viewer's 400 eyes 401 even in the second state.

In this case, one surface of the mirror member 60 (i.e., the surface, facing away from the half mirror 40 and facing toward the viewer 400, of the mirror member 60 located at the second position) is a reflective surface 61 that reflects at least light falling within the visible light range. Thus, in a state where the mirror member 60 is located at the second position, the viewer 400 is able to view a reflected image, produced by having the light coming from behind the automobile 100 reflected by the mirror member 60, by adjusting the orientation of the housing 70 using the adjusting mechanism for the supporting member 72. Note that the reflective surface 61 provided on one surface of the mirror member 60 may be a plane or a convex surface, whichever is appropriate. In other words, the mirror member 60 may be implemented as a plane mirror or a convex mirror, without limitation.

The other surface of the mirror member 60 (i.e., the surface opposite from the reflective surface 61) is an opaque surface 62, which reflects at least light falling within the visible light range at a lower reflectance than the reflective surface 61. In the first state where the mirror member 60 is located at the first position, the opaque surface 62 of the mirror member 60 faces the half mirror 40. Furthermore, in this embodiment, the opaque surface 62 of the mirror member 60 has the capability of absorbing the incoming light. The color of the opaque surface 62 is darker than that of the inner surface of the roof 101 of the moving vehicle body 110 (see FIG. 2) and may be black, for example. Making the color of the opaque surface 62 a dark color such as black in this manner gives the opaque surface 62 the capability of absorbing the light incident on the opaque surface 62. This reduces the chances of the external light that has come from outside of the housing 70 along the optical path A31 to be incident on the opaque surface 62 of the mirror member 60 being reflected from the opaque surface 62 in the unshielding state where the mirror member 60 is located at the first position as shown in FIG. 1. Therefore, this reduces the chances of the external light that has come from outside of the housing 70 to be incident on the opaque surface 62 being reflected from the opaque surface 62 and the half mirror 40 and eventually incident on the viewer's 400 eyes 401. This increases the contrast of the image displayed by the display system 1.

In this embodiment, the opaque surface 62 has the capability of absorbing the incoming light. However, this is only an example and should not be construed as limiting. Alternatively, the opaque surface 62 may be formed as a rough surface to have the capability of scattering the incoming light. Making the opaque surface 62 scatter the incoming light in the unshielding state where the mirror member 60 is located at the first position reduces the chances of the external light coming from outside of the housing 70 to be incident on the opaque surface 62 being reflected from the opaque surface 62 and the half mirror 40 and eventually incident on the viewer's 400 eyes 401.

As can be seen, the opaque surface 62 of the mirror member 60 needs to absorb and/or scatter at least the light falling within the visible light range to reduce the chances of the external light being reflected from the half mirror 40 and eventually incident on the viewer's 400 eyes 401. Note that the opaque surface 62 needs to absorb and/or scatter at least the light falling within the visible light range and may transmit light falling outside of the visible light range, e.g., light falling within the infrared range.

Figure 6:
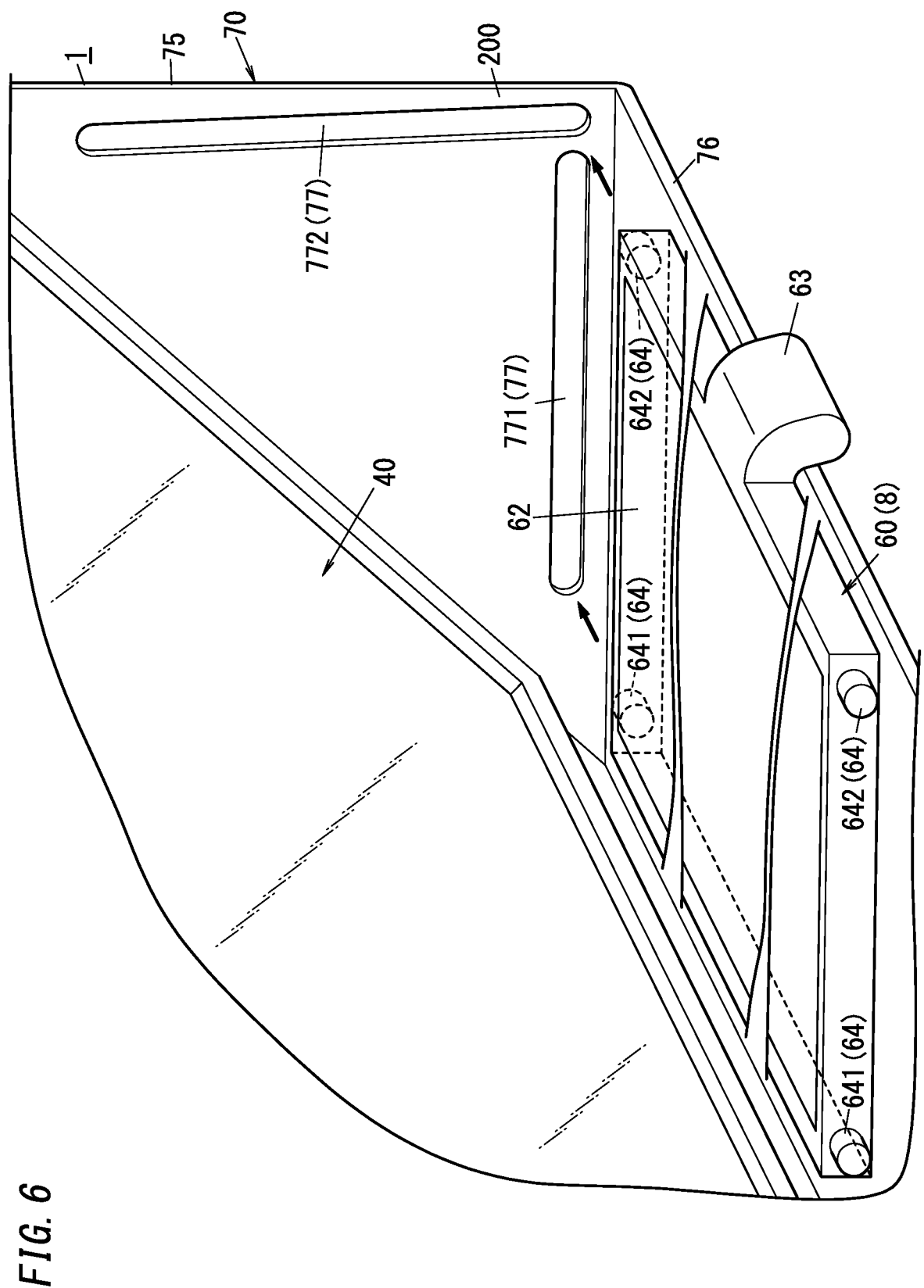
FIG. 6 is a perspective view illustrating a main part of the display system.

The right and left side edges of the mirror member 60 are provided with a plurality of cylindrical projections 64 as shown in FIGS. 1 and 6. In this embodiment, the plurality of projections 64 includes first projections 641 provided at the front end of the right and left side faces of the mirror member 60 located at the first position and second projections 642 provided at the rear end of the right and left side faces of the mirror member 60 located at the first position. In addition, the mirror member 60 further includes, at the rear end thereof, a protruding piece 63, which protrudes obliquely downward, as an integral part thereof, in the state where the mirror member 60 is located at the first position. The user of the display system 1 (such as the viewer 400 such as the driver of the automobile 100) is able to displace the mirror member 60 by pushing the protruding piece 63 serving as an operating member upward with one of his or her fingers or pulling the protruding piece 63 downward with the finger. That is to say, the display system 1 further includes an operating member (protruding piece 63) for manually switching the state of the mirror member 60 to either the first state or the second state. In this embodiment, the protruding piece 63 is provided in the middle in the rightward/leftward direction at the rear end of the mirror member 60. Alternatively, a plurality of such protruding pieces 63 may be provided at right and left ends in the rightward/leftward direction. Still alternatively, another protruding piece may be provided to protrude in the rightward/leftward direction from the right or left side edge of the mirror member 60 and stick out of the housing 70 through a through hole cut through the lateral hood parts 75. The portion, sticking out of the housing 70, of the protruding piece may be used as an operating member.

The housing 70 has a plurality of guide grooves 77, which are cut through the inner surface of right and left lateral hood parts 75 and to which the plurality of projections 64 of the mirror member 60 are inserted. The plurality of guide grooves 77 includes first guide grooves 771 to which the first projections 641 of the mirror member 60 are inserted and second guide grooves 772 to which the second projections 642 of the mirror member 60 are inserted. The first guide grooves 771 are cut through the inner surface of the lateral hood parts 75 so as to extend in the forward/backward direction. The second guide grooves 772 are cut through the inner surface of the lateral hood parts 75 so as to extend in the upward/downward direction. In this embodiment, the projections 64 are provided for the mirror member 60 and the guide grooves 77 are provided for the housing 70. However, this is only an example and should not be construed as limiting. Alternatively, projections may be provided for the housing 70 and guide grooves to which the projections are inserted may be provided for the mirror member 60. In other words, in this embodiment, the holding structure 200 for holding the mirror member 60 serving as the shield member 8 includes the projections 64 provided for one of the two members consisting of the housing 70 and the mirror member 60 and guide grooves 77 provided for the other of the two members consisting of the housing 70 and the mirror member 60 to receive the projections 64. Changing the positions of the projections 64 inside the guide grooves 77 causes the state of the mirror member 60 to be switched to either the first state (corresponding to the unshielding state) or the second state (corresponding to the shielding state).

As shown in FIG. 1, in the first state where the mirror member 60 is located at the first position, the first projections 641 are located around the internal front end of the first guide grooves 771 and the second projections 642 are located around the internal bottom end of the second guide grooves 772. In the first state (corresponding to the unshielding state), the mirror member 60 is located over, and along the upper surface of, the lower hood part 76, and is located outside of the optical path of the light transmitted through the half mirror 40 and eventually incident on the viewer's 400 eyes 401. Thus, when the mirror member 60 is in the first state, the viewer 400 is able to view the image produced on the display screen 21 of the display device 2 (i.e., the first image) as an image that has been magnified and has had its focal length extended (i.e., the second image) by being reflected by the reflection optical system B1. Note that in the state where the mirror member 60 is located at the first position, the mirror member 60 is kept in the first state by having its end portions latched by hooks or any other suitable catching members provided for the housing 70.

When the user pushes upward the protruding piece 63 of the mirror member 60 in the first state, the first projections 641 slide backward inside the first guide grooves 771 and the second projections 642 slide upward inside the second guide grooves 772 as shown in FIG. 4. In this case, making the first projections 641 and the second projections 642 perform sliding operation while performing rotational operation inside the first guide grooves 771 and the second guide grooves 772, respectively, allows the mirror member 60 to move toward the second position while performing the rotational operation as a whole. That is to say, by performing the sliding operation and the rotational operation, the mirror member 60 moves from the first position to the second position, and vice versa. In this case, the mirror member 60 may perform the sliding operation and the rotational operation either in parallel or separately from each other.

When the mirror member 60 moves to reach the second position, the first projections 641 are located near the internal rear end of the first guide grooves 771 and the second projections 642 are located near the internal upper end of the second guide grooves 772 as shown in FIG. 5. In the second state where the mirror member 60 is located at the second position (i.e., in the shielding state), the mirror member 60 stands in the upward/downward direction with the reflective surface 61 facing away from the half mirror 40. As used herein, when the mirror member 60 stands in the upward/downward direction, the mirror member 60 does not have to stand vertically (i.e., perpendicularly to the lower hood part 76) but may be inclined with respect to the vertical direction as long as the viewer 400 is able to monitor a rear view from the automobile 100 via the reflective surface 61. In this second state, to the viewer's 400 eyes 401, the half mirror 40 is covered almost entirely with the mirror member 60. This allows the viewer 400 to view a reflected image produced by having the external light coming from outside of the housing 70 (from behind the automobile 100) reflected from the reflective surface 61. Note that when the mirror member 60 is located at the second position, the light transmitted through the half mirror 40 is cut off by the mirror member 60, thus preventing the viewer 400 from viewing the image produced on the display screen 21 of the display device 2. Therefore, if an error occurs in the display operation by the display device 2, the viewer 400 is able to view the reflected image reflected from the reflective surface 61 by switching the state of the mirror member 60 from the first state to the second state. Note that in the second state where the mirror member 60 is located at the second position, the mirror member 60 is kept in the second state by having its end portions latched by hooks or any other catching members provided for the housing 70.

Also, to switch the state of the mirror member 60 from the second state (corresponding to the shielding state) to the first state (corresponding to the unshielding state), the user (such as the viewer 400) pulls downward the protruding piece 63 of the mirror member 60. When the protruding piece 63 is pulled downward, the first projections 641 move forward inside the first guide grooves 771 and the second projections 642 move downward inside the second guide grooves 772, thereby switching the state of the mirror member 60 from the second state to the first state. Switching the state of the mirror member 60 to the first state allows the viewer 400 to view the reflected image produced by having the image on the display screen 21 of the display device 2 reflected by the reflection optical system B1.

As can be seen, according to this embodiment, the projections 64 are provided for the mirror member 60 and the guide grooves 77 to which the projections 64 are inserted are provided for the housing 70. Changing the positions of the projections 64 inside the guide grooves 77 causes the mirror member 60 to move to either the first position or the second position, thus switching the state of the mirror member 60 to either the first state or the second state.

In the embodiment described above, the projections 64 are implemented as cylindrical projections fixed on the mirror member 60. However, this is only an example and should not be construed as limiting. Alternatively, the projections 64 may also be cylindrical rollers attached rotatably to shafts provided for the mirror member 60. Implementing the projections 64 as rotatable rollers reduces the chances of the projections 64 being jammed while sliding inside the guide grooves 77, thus reducing the wear of the projections 64 and enabling the state of the mirror member 60 to be switched more smoothly to either the first state or the second state.

The display controller 22 controls the display state of the image produced by the display device 2. The display controller 22 communicates (either via a cable or wirelessly) with the image capture device 4 over an intra-vehicle network provided for the automobile 100. The display controller 22 is provided by the image capture device 4 with image data of a captured image representing a rear view from the automobile 100. The display controller 22 may have the image, based on the captured image provided by the image capture device 4, produced on the display device 2.

As used herein, the image based on the captured image may be the captured image itself, an image obtained by subjecting the captured image to image processing, or a computer graphics (CG) image generated based on the captured image, whichever is appropriate. For example, an image captured at night by the image capture device 4 tends to be a darker one, and therefore, may be subjected to brightness correction. Also, a CG image or a marker indicating an obstacle shot in the image may be generated based on the image captured by the image capture device 4 and an image in which the CG image or marker is superimposed on the image captured by the image capture device 4 may be displayed on the display screen 21 of the display device 2. Alternatively, an image in which a marker indicating driver assistance information (such as vehicle velocity information, navigation information, pedestrian information, foregoing vehicle information, lane deviation information, and vehicle condition information) is superimposed on the image captured by the image capture device 4 may be displayed on the display device 2.

The image capture device 4 may be, for example, a complementary metal-oxide semiconductor (CMOS) image sensor mounted on a rear portion of the automobile 100 to capture an image representing a rear view from the automobile 100. The image capture device 4 does not have to be a CMOS image sensor but may be any other type of image sensor such as a charge coupled device (CCD) image sensor as well.

The image capture device 4 outputs the image data, obtained by capturing an image representing a rear view from the automobile 100, to the display controller 22 over the intra-vehicle network. The image capture device 4 is arranged around a middle in the rightward/leftward direction of the rear portion of the automobile 100 to capture an image falling within a viewable range by a conventional rearview mirror. The electronic mirror system 5 may be used as a known rear view mirror. Since the image capture device 4 is mounted on a rear portion of the automobile 100, neither the back seat nor pillars are shot in the image captured by the image capture device 4. Optionally, the image capture device 4 may also capture an image representing a rear side view from the automobile 100. Still alternatively, the image capture device 4 may also capture an image falling within a viewable range by a conventional door mirror or fender mirror. That is to say, the electronic mirror system 5 may be used as a rearview mirror in place of the known door mirror or fender mirror. The image capture device 4 is mounted on the top rear portion of the moving vehicle body 110. However, this is only an example and should not be construed as limiting. Alternatively, the image capture device 4 may also be mounted at any other appropriate position from which an image may be captured in a desired range.

In the display system 1 according to this embodiment, the image produced on the display device 2, i.e., the light that has emerged from the display screen 21 of the display device 2, is reflected a number of times (e.g., twice in this embodiment) from the half mirror 40 and the last reflective member 50. In this embodiment, the distance (viewing distance) from the viewer 400 to the position where the image (virtual image) viewable for the viewer 400 is displayed is determined by the length of the optical path leading from the display screen 21 of the display device 2 to the reflective surface 51, the focal length of the reflection optical system B1, and other factors. Thus, having the light that has emerged from the display screen 21 of the display device 2 reflected twice allows the volume of the housing 70 (chamber 73) to be reduced with the viewing distance to the image display position maintained at a desired distance. This reduces the overall size of the housing 70 in the direction in which the viewer 400 views the image produced on the reflective surface 51 through the half mirror 40.

(2.2) Operation

Next, it will be described how the display system 1 according to this embodiment and the electronic mirror system 5 including the display system 1 operate. Note that the state of the mirror member 60 is supposed to have been switched to the first state (corresponding to the unshielding state) where the mirror member 60 is located at the first position as shown in FIG. 1.

For example, when receiving a control signal, instructing the electronic mirror system 5 to start operating, from an electronic control unit (ECU) of the automobile 100 while receiving power supplied from a battery of the automobile 100, the electronic mirror system 5 starts operating.

For example, when receiving a control signal that instructs the display controller 22 to start operating from the ECU of the automobile 100, the display controller 22 makes the image capture device 4 to capture an image representing a rear view from the automobile 100 at a predetermined frame rate, thus acquiring the image data of the image captured from the image capture device 4.

On receiving the image data of the captured image from the image capture device 4, the display controller 22 generates an image based on the captured image and has the image produced on the display screen 21 of the display device 2.

When the image is produced on the display screen 21 of the display device 2, the light forming the image travels in the direction parallel to the optical path A11 toward the inner surface 41 of the half mirror 40. The half mirror 40 is a beam splitter. The inner surface 41 of the half mirror 40 reflects part of the light coming from the display device 2 toward the reflective surface 51 of the last reflective member 50. The reflective surface 51 is a concave mirror, which reflects, toward the inner surface 41 of the half mirror 40, light forming a magnified image by magnifying the image produced on the display screen 21. When the light reflected from the reflective surface 51 of the last reflective member 50 is incident on the inner surface 41 of the half mirror 40, part of the incident light is transmitted through the half mirror 40 to leave the housing 70. This allows the viewer 400 to view the image magnified by the reflective surface 51. Thus, the viewer 400 is able to monitor the rear view from the automobile 100 by viewing, through the half mirror 40, the image magnified by the reflective surface 51.

If an error occurs in the image produced on the display screen 21 of the display device 2 due to a failure of the display device 2 or the image capture device 4, then the viewer 400 pushes the protruding piece 63 upward to switch the state of the mirror member 60 to the second state (corresponding to the shielding state) where the mirror member 60 is located at the second position. In the second state, the mirror member 60 is located at the second position between the half mirror 40 and the viewer 400 with the reflective surface 61 oriented toward the viewer 400 as shown in FIG. 5. Thus, when the state of the mirror member 60 has been switched to the second state and the orientation of the housing 70 has been adjusted using the adjusting mechanism of the supporting member 72, the viewer 400 is able to view the reflected image produced by having the light coming from outside of the housing 70 (e.g., from behind the automobile 100) reflected from the reflective surface 61. Therefore, even when an error occurs in the display operation by the display device 2, the viewer 400 is still able to monitor the rear view from the automobile 100 by using the mirror member 60 switched to the second state to view the reflected image produced on the reflective surface 61 of the mirror member 60. That is to say, even if an error occurs in the display operation by the display device 2, the display system 1 is still able to display an alternative image by using the mirror member 60. In this embodiment, the orientation of the housing 70 may also be finely adjusted using the adjusting mechanism for the supporting member 72. Nevertheless, switching the state of the mirror member 60 to the second state allows the viewer 400 to view the reflected image produced on the reflective surface 61 of the mirror member 60. This reduces the degree of tilt of the housing 70 compared to a situation where the half mirror 40 is used in place of an optical mirror by adjusting the angle of the entire housing 70 without using the mirror member 60. Consequently, this reduces the chances of the viewer's 400 sight (i.e., the view in front of the viewer 400) being obstructed by the housing 70, thus reducing a decline in the visibility of the front view.

Optionally, the display system 1 may further include a detection switch for detecting the state where the mirror member 60 is located at the second position. When the detection switch detects that the mirror member 60 is located at the second position, the display controller 22 may suspend the display operation by the display device 2 based on the result of detection by the detection switch. This cuts down the power consumption of the display system 1.

(3) Variations

The exemplary embodiment described above is only one of various embodiments of the present disclosure, and may be readily modified, changed, replaced, or combined with any other embodiments, depending on a design choice or any other factor, without departing from a true spirit and scope of the present disclosure.

Next, variations of the exemplary embodiment will be enumerated one after another. Optionally, any of the variations to be described below may be adopted in combination as appropriate.

The display system 1 according to the present disclosure includes a computer system. The computer system includes a processor and a memory as principal hardware components. In other words, the computer system performs the functions of the display system 1 according to the present disclosure (such as the functions of the display controller 22) by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be integrated together in a single device or distributed in multiple devices without limitation. As used herein, the "computer system" may include a microcontroller including at least one processor and at least one memory. Therefore, the microcontroller may also be made up of a single or a plurality of electronic circuits including a semiconductor integrated circuit (IC) or a largescale integrated circuit (LSI).

(3.1) First Variation

Figure 7:
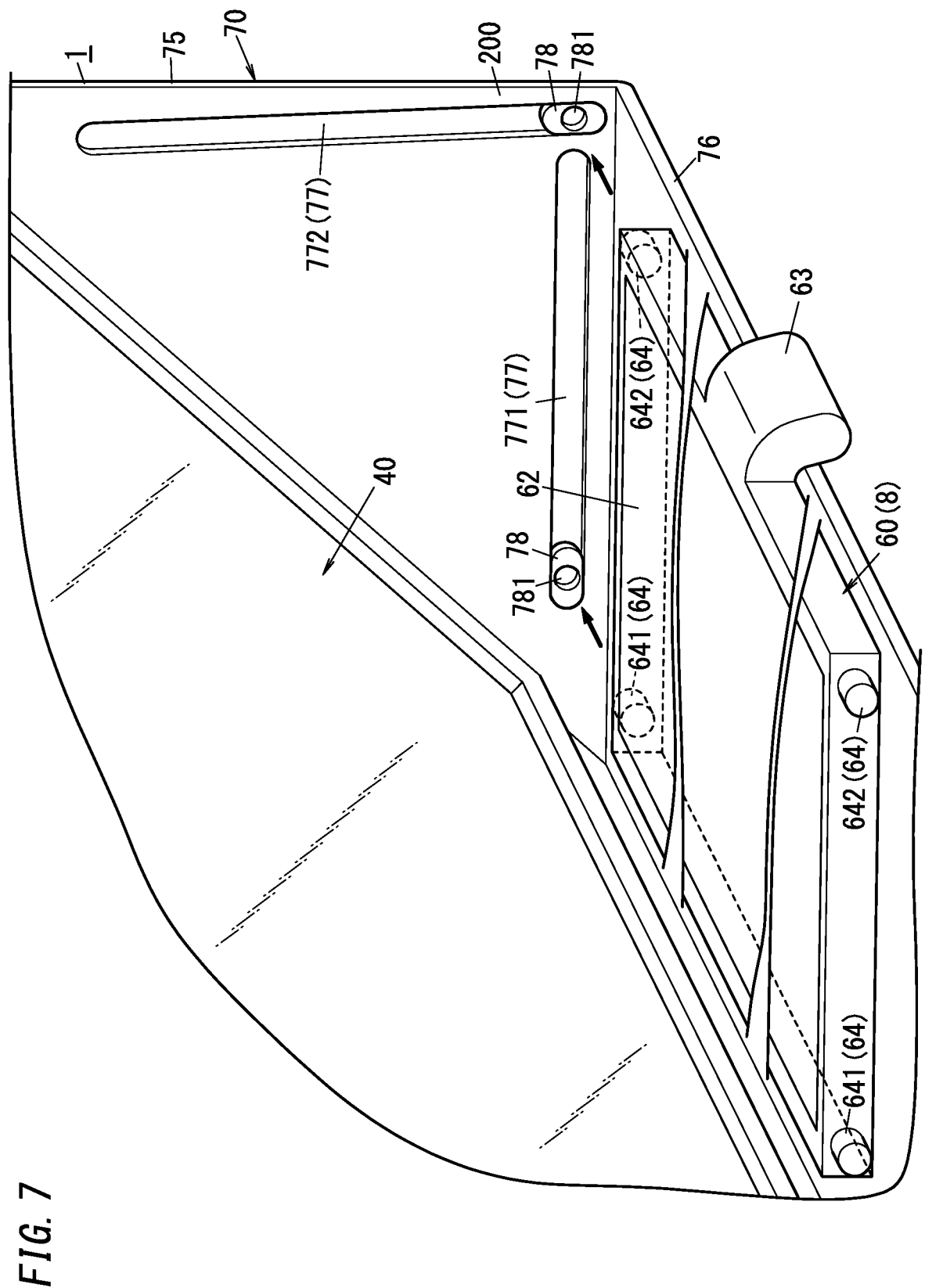
FIG. 7 is a perspective view illustrating a main part of a display system according to a first variation of the first embodiment.

A first variation of the display system 1 will be described with reference to FIG. 7.

The display system 1 according to the first variation further includes guide members 78, each of which is inserted into an associated one of the guide grooves 77 to slide along the associated guide groove 77, which is a major difference from the exemplary embodiment described above. In the other respects, the first variation has the same configuration as the exemplary embodiment described above. Thus, in the following description, any constituent element of this first variation, having the same function as a counterpart of the exemplary embodiment described above, will be designated by the same reference numeral as that counterpart's, and description thereof will be omitted herein.

In this variation, the guide member 78 is fitted into each of the first guide grooves 771 and the second guide grooves 772. The guide member 78 may be implemented as a molded product of synthetic resin, for example, and both end faces thereof in the sliding direction are curved surfaces. The guide member 78 has a circular hole 781, to which the cylindrical projection 64 is inserted. The projection 64 is supported rotatably by the guide member 78.

In the first state, the guide member 78 inserted into each of the first guide grooves 771 is located around the front end of the first guide groove 771, and the guide member 78 inserted into each of the second guide grooves 772 is located around the bottom end of the second guide groove 772.

When the viewer 400 pushes upward the protruding piece 63 to switch the state of the mirror member 60 to the second state, the guide members 78 slide backward inside the first guide grooves 771 and the guide members 78 slide upward inside the second guide grooves 772. In the meantime, as these guide members 78 perform the sliding operation, the projections 64 perform a rotational operation with respect to the guide members 78. The sliding operation by the guide members 78 and the rotational operation by the projections 64 cause the mirror member 60 to move from the first position to the second position.

On the other hand, when the viewer 400 pulls down the protruding piece 63 to switch the state of the mirror member 60 from the second state to the first state, the guide members 78 slide forward inside the first guide grooves 771 and the guide members 78 slide downward inside the second guide grooves 772. In the meantime, as these guide members 78 perform the sliding operation, the projections 64 perform a rotational operation with respect to the guide members 78. The sliding operation by the guide members 78 and the rotational operation by the projections 64 cause the mirror member 60 to move from the second position to the first position.

As can be seen, in the display system 1 according to the first variation, as the mirror member 60 reciprocates between the first position and the second position, the sliding operation and the rotational operation are performed separately by the guide members 78 and the projections 64, respectively. According to this first variation, the guide members 78 sliding inside the guide grooves 77 do not perform the rotational operation. This allows the guide members 78 to perform the sliding operation smoothly, thus enabling the mirror member 60 to reciprocate smoothly between the first position and the second position. In addition, the projections 64 perform only the rotational operation without performing the sliding operation. This reduces the chances of the projections 64 being worn through the sliding operation.

(3.2) Second Variation

Figure 8:
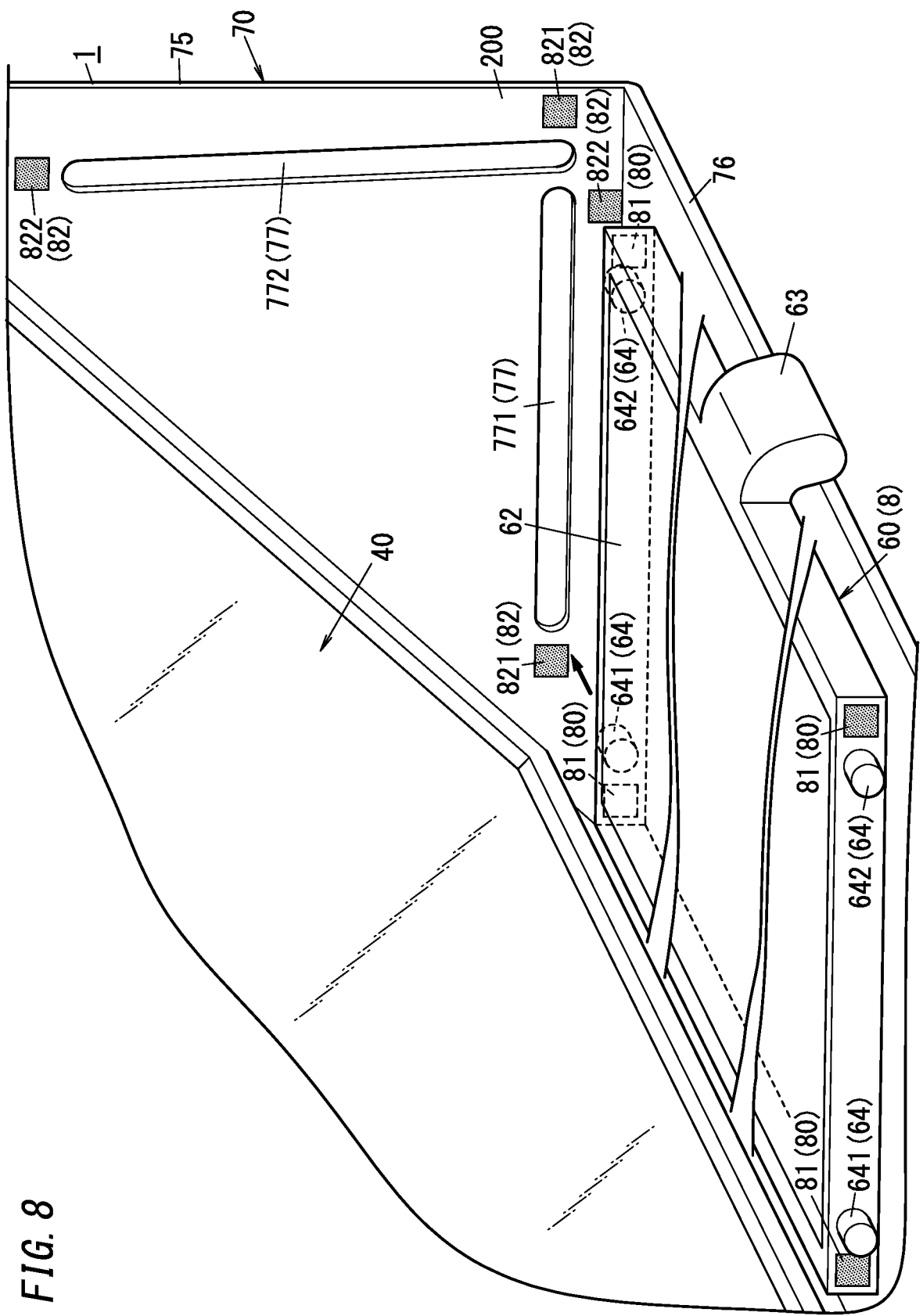
FIG. 8 is a perspective view illustrating a main part of a display system according to a second variation of the first embodiment.

A second variation of the display system 1 will be described with reference to FIG. 8.

The display system 1 according to the second variation further includes a state keeper 80 for keeping the mirror member 60 in either the first state or the second state, which is a major difference from the exemplary embodiment described above. In the other respects, the second variation has the same configuration as the exemplary embodiment described above. Thus, in the following description, any constituent element of this second variation, having the same function as a counterpart of the exemplary embodiment described above, will be designated by the same reference numeral as that counterpart's, and description thereof will be omitted herein.

In this variation, the state keeper 80 may include, for example, a plurality of magnets 81 provided for the mirror member 60. The mirror member 60 has the shape of a rectangular flat plate in a plan view. When the mirror member 60 is located at the first position, a plurality of (e.g., four) magnets 81 such as permanent magnets are attached to the right and left side faces of the mirror member 60 at both ends in the forward/backward direction.

To the inner surface of the right and left lateral hood parts 75 of the housing 70, attached are a plurality of plate pieces 82 made of a magnetic material (such as iron) to be attracted to the magnets 81 with their magnetic force. In this variation, the plurality of plate pieces 82 include four first plate pieces 821, which are arranged at four points respectively facing the magnets 81 of the mirror member 60 located at the first position, and four second plate pieces 822, which are arranged at four points respectively facing the magnets 81 of the mirror member 60 located at the second position.

In the first state (unshielding state) where the mirror member 60 is located at the first position, the four magnets 81 of the mirror member 60 respectively catch the four first plate pieces 821 of the housing 70, thus holding the mirror member 60 at the first position.

As the viewer 400 pushes upward the protruding piece 63 of the mirror member 60 to displace the mirror member 60 from the first position, the magnets 81 are uncoupled from the first plate pieces 821, thus canceling the holding state under the magnetic force applied by the magnets 81. As the viewer 400 pushes further upward the protruding piece 63 of the mirror member 60 to make the mirror member 60 reach the second position, the four magnets 81 of the mirror member 60 respectively catch the four second plate pieces 822 of the housing 70, thus holding the mirror member 60 at the second position. As can be seen, the mirror member 60 is held in the second state (shielding state) by making the magnets 81 provided at the four corners of the mirror member 60 catch the second plate pieces 822 provided for the housing 70, thus reducing the backlash of the mirror member 60 due to the sway of the automobile 100, for example.

As the viewer 400 pulls downward the protruding piece 63 of the mirror member 60 located at the second position, the magnets 81 are uncoupled from the second plate pieces 822 thus canceling the holding state under the magnetic force applied by the magnets 81. When the mirror member 60 comes out of hold under the magnetic force applied by the magnets 81, the mirror member 60 moves by itself from the second position to the first position due to its own weight. Then, when the mirror member 60 reaches the first position, the four magnets 81 of the mirror member 60 catch the four first plate pieces 821 of the housing 70, thus holding the mirror member 60 at the first position. As can be seen, as the viewer 400 releases the mirror member 60 out of hold by the magnets 81 by pulling downward the protruding piece 63 of the mirror member 60 located at the second position, the mirror member 60 moves by itself to the first position due to its own weight. This facilitates the operation of switching the state of the mirror member 60 to the first state.

In this variation, the housing 70 is provided with the plate pieces 82 of a magnetic material to be attracted to the magnets 81 of the mirror member 60 with their magnetic force. However, this is only an example and should not be construed as limiting. Alternatively, the housing 70 may be provided with magnets such as permanent magnets to be attracted to the magnets 81 of the mirror member 60.

Alternatively, the magnets 81 may be provided for the housing 70 and the plate pieces 82 to be attracted to the magnets 81 may be provided for the mirror member 60. That is to say, according to this variation, the magnets 81 may be provided for one of the two members consisting of the mirror member 60 and the housing 70, and plate pieces of a magnetic material or magnets to be attracted to the magnets 81 may be provided for the other of the two members consisting of the mirror member 60 and the housing 70. In other words, the state keeper 80 may include the magnets 81 provided for at least one of the mirror member 60 or the housing 70 so that the mirror member 60 may be kept in each of the first state and the second state under the magnetic force applied by the magnets 81. The magnetic force applied by the magnets 81 that form parts of the state keeper 80 keeps the mirror member 60 in each of the first state and the second state. This reduces the chances of the mirror member 60 causing a backlash in each of the first state and the second state.

In this variation, the number and arrangement of the magnets 81 forming parts of the state keeper 80 may be changed as appropriate according to the shape of the mirror member 60, the force of holding the mirror member 60, and other factors.

In this variation, the magnets 81 forming parts of the state keeper 80 do not have to be permanent magnets but may also be electromagnets. If the state keeper 80 includes electromagnets, the mirror member 60 may come out of hold by the state keeper 80 when the supply of electricity to the coil of the electromagnets is stopped. For example, in a situation where the display system 1 shown in FIG. 8 is used with the housing 70 upside down, when coming out of hold by the state keeper 80, the mirror member 60 may move from the first position to the second position due to its own weight. According to this configuration, a switch (not shown) for stopping the supply of electricity to the electromagnets may be provided. This allows the viewer 400 such as the driver to displace the mirror member 60 from the first position (i.e., a position in the unshielding state) to the second position (i.e., a position in the shielding state) at any timing he or she likes by operating the switch. Optionally, when the mirror member 60 reaches the second position after having been moved with the supply of electricity to the coil of the electromagnets stopped, electricity may start to be supplied to the electromagnets again. This reduces the backlash of the mirror member 60 located at the second position.

(3.3) Third Variation

Figure 9:
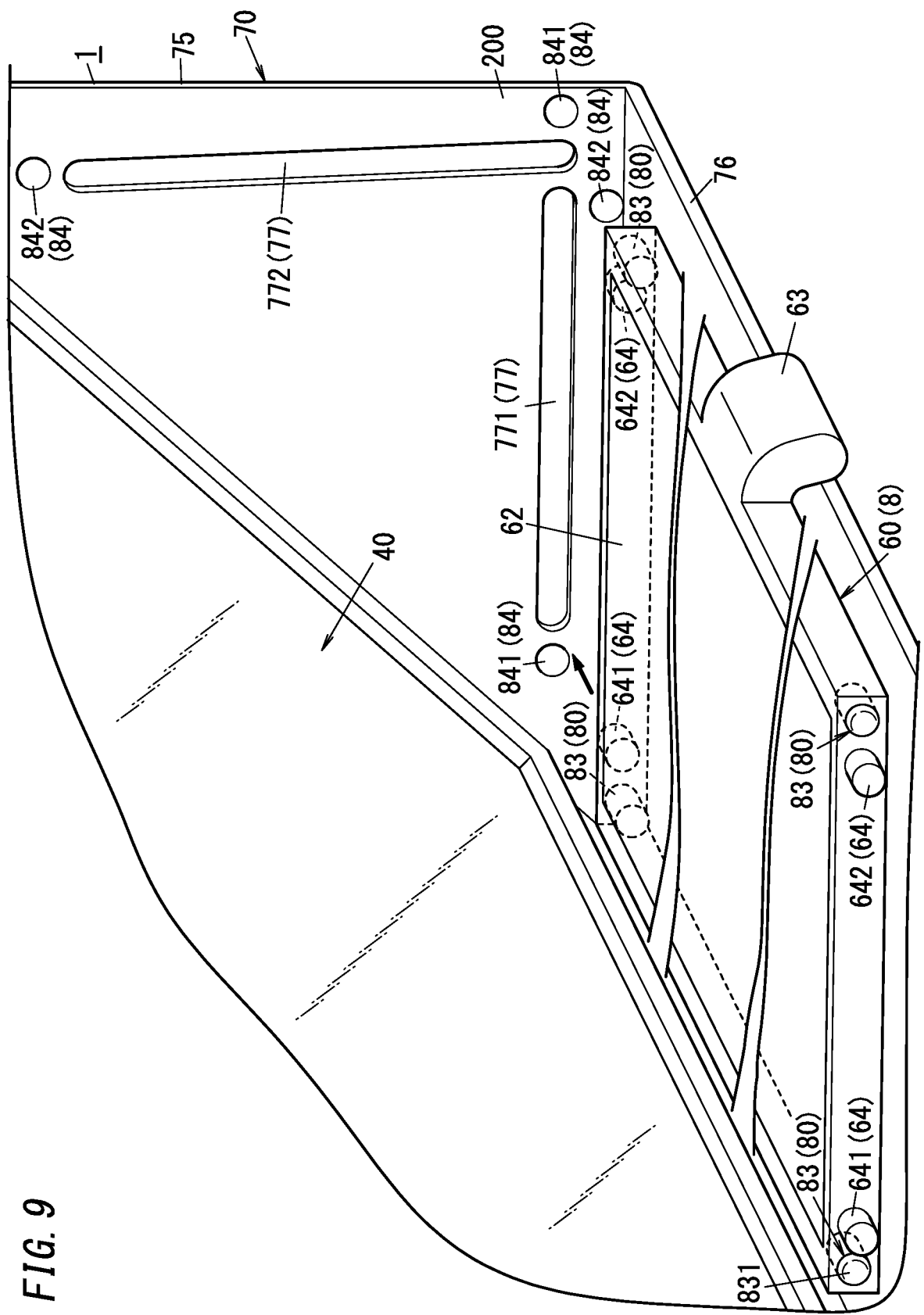
FIG. 9 is a perspective view illustrating a main part of a display system according to a third variation of the first embodiment.

A third variation of the display system 1 will be described with reference to FIG. 9.

In the display system 1 according to the third variation, the state keeper 80 includes ball plungers 83 provided for the mirror member 60, which is a major difference from the second variation described above. In the other respects, the third variation has the same configuration as the second variation or the exemplary embodiment described above. Thus, in the following description, any constituent element of this third variation, having the same function as a counterpart of the second variation or the exemplary embodiment described above, will be designated by the same reference numeral as that counterpart's, and description thereof will be omitted herein.

The mirror member 60 has a rectangular flat plate shape in a plan view. To the right and left side faces of the mirror member 60, the ball plungers 83 are attached to both ends in the forward/backward direction of the mirror member 60 located at the first position.

The inner surface of the right and left lateral hood parts 75 of the housing 70 have receiving holes 84, to which respective balls 831 of the ball plungers 83 are inserted. The mirror member 60 is provided with a plurality of (e.g., four) ball plungers 83. The inner surface of the right and left lateral hood parts 75 of the housing 70 have a plurality of receiving holes 84, to which respective balls 831 of the ball plungers 83 are inserted. The plurality of receiving holes 84 may include four first receiving holes 841 and four second receiving holes 842, for example. Into the first receiving holes 841, inserted are the respective balls 831 of the ball plungers 83 of the mirror member 60 located at the first position. Into the second receiving holes 842, inserted are the respective balls 831 of the ball plungers 83 of the mirror member 60 located at the second position. That is to say, inserting the balls 831 of the ball plungers 83 into the respective receiving holes 84 allows the mirror member 60 to be kept in each of the first state and the second state.

Specifically, when the mirror member 60 is located at the first position, the balls 831 of the ball plungers 83 are inserted into the first receiving holes 841 of the housing 70 to firmly hold the mirror member 60 at the first position. In the first state, the respective balls 831 of the ball plungers 83 provided at the four corners of the mirror member 60 are inserted into the first receiving holes 841 of the housing 70, thus reducing the backlash of the mirror member 60 due to the sway of the automobile 100, for example.

As the viewer 400 pushes upward the protruding piece 63 of the mirror member 60 to displace the mirror member 60 from the first position, the balls 831 are forced out of the first receiving holes 841 to let the mirror member 60 come out of hold by the ball plungers 83. As the viewer 400 pushes further upward the protruding piece 63 of the mirror member 60 to make the mirror member 60 reach the second position, the balls 831 of the ball plungers 83 are inserted into the second receiving holes 842, thus firmly holding the mirror member 60 at the second position. As can be seen, inserting the respective balls 831 of the ball plungers 83 provided at the four corners of the mirror member 60 into the second receiving holes 842 allows the mirror member 60 to be kept in the second state, thus reducing the backlash of the mirror member 60 due to the sway of the automobile 100, for example.

As the viewer 400 pulls downward the protruding piece 63 of the mirror member 60 located at the second position, the balls 831 of the ball plungers 83 are forced out of the second receiving holes 842 to let the mirror member 60 come out of hold by the ball plungers 83. As the viewer 400 pulls further downward the protruding piece 63 to make the mirror member 60 reach the first position after the mirror member 60 has come out of hold by the ball plungers 83, the balls 831 of the ball plungers 83 are inserted into the first receiving holes 841, thus firmly holding the mirror member 60 at the first position.

In this variation, the ball plungers 83 are provided for the mirror member 60. However, this is only an example and should not be construed as limiting. Alternatively, the ball plungers 83 may be provided for the housing 70 and the mirror member 60 may have receiving holes 84 to which the balls 831 of the ball plungers 83 are inserted. That is to say, according to this variation, the ball plungers 83 may be provided for one of the two members consisting of the mirror member 60 and the housing 70, and the receiving holes 84 to which the balls 831 of the ball plungers 83 are inserted may be provided for the other of the two members consisting of the mirror member 60 and the housing 70. In other words, the state keeper 80 includes the ball plungers 83 provided for one of the two members consisting of the housing 70 and the mirror member 60, and the other of the two members consisting of the housing 70 and the mirror member 60 may have the receiving holes 84 to which the balls 831 of the ball plungers 83 are inserted. Inserting the balls 831 into the receiving holes 84 allows the mirror member 60 to be kept in each of the first state and the second state.

In this variation, the number and arrangement of the ball plungers 83 forming parts of the state keeper 80 may be changed as appropriate according to the shape of the mirror member 60, the force of holding the mirror member 60, and other factors. For example, each of the ball plungers 83 may be arranged at the tip of an associated one of the first and second projections 641 and 642 so as to be received at a receiving hole 84 provided at the bottom of an associated one of the first and second guide grooves 771 and 772.

The display system 1 according to each of the second and third variations includes the state keeper 80 including either magnets 81 or the ball plungers 83. However, the state keeper 80 for keeping the mirror member 60 in the first state or the second state does not have to be magnets or ball plungers. Alternatively, the state keeper 80 may also be implemented as, for example, hooks provided for one of the two members consisting of the mirror member 60 and the housing 70. The mirror member 60 may be kept in each of the first state and the second state by bringing the hooks provided for one of the two members consisting of the mirror member 60 and the housing 70 into engagement with the other of the two members.

According to the second and third variations described above, the state keeper 80 keeps the mirror member 60 in each of the first state and the second state. However, this is only an example and should not be construed as limiting. Alternatively, the mirror member 60 may also be kept in at least one of the first and second states (e.g., in the second state).

(3.4) Fourth Variation

A fourth variation of the display system 1 will be described with reference to FIGS. 10 and 11.

Figure 10:
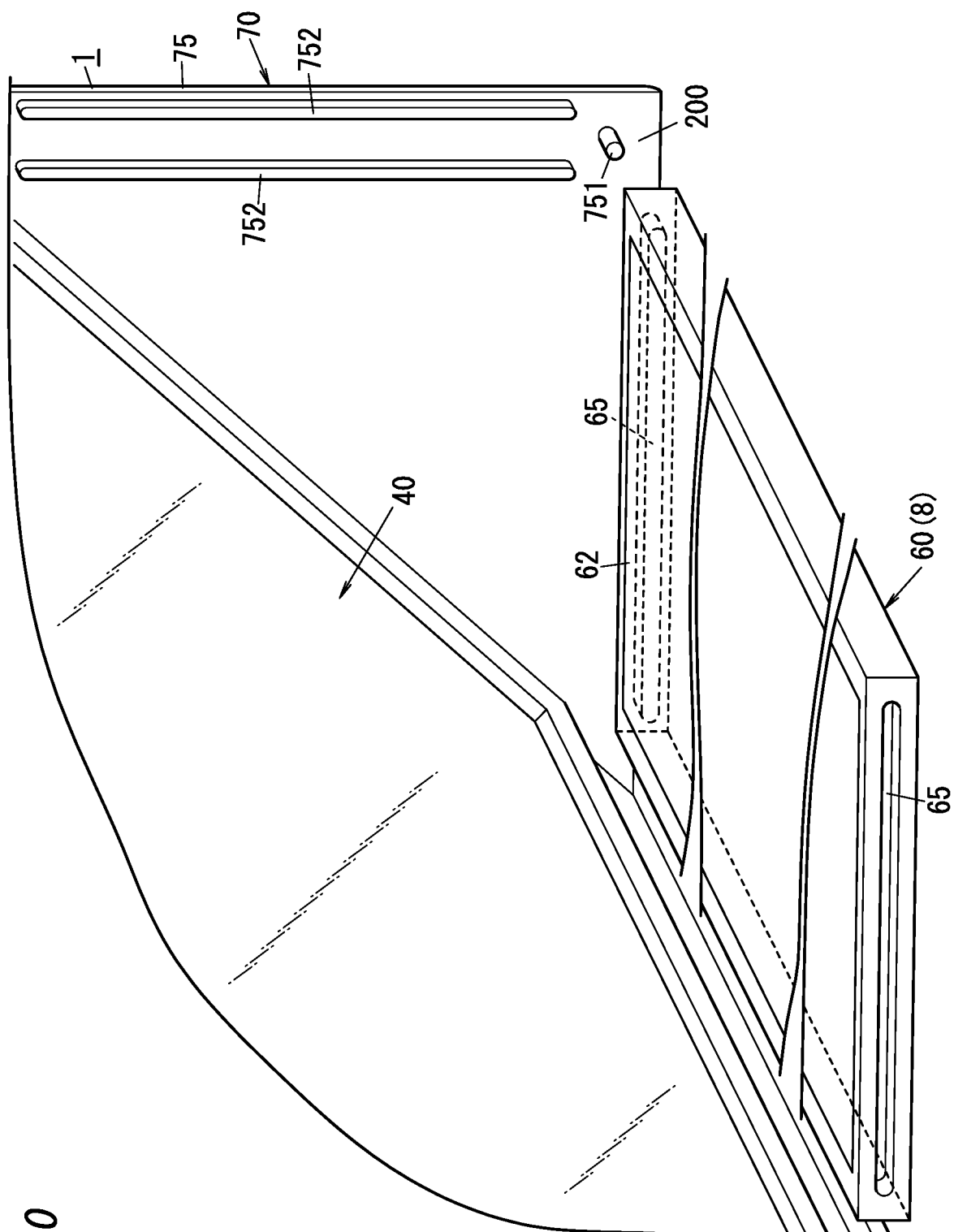
FIG. 10 is a perspective view illustrating a main part of a display system according to a fourth variation of the first embodiment.

In the display system 1 according to the fourth variation, the inner surface of the right and left lateral hood parts 75 of the housing 70 is provided with projections 751 and the right and left side faces of the mirror member 60 each have a guide groove 65, to which the projection 751 is inserted, as shown in FIG. 10, which are major differences from the exemplary embodiment described above. In the other respects, the fourth variation has the same configuration as the exemplary embodiment described above. Thus, in the following description, any constituent element of this fourth variation, having the same function as a counterpart of the exemplary embodiment described above, will be designated by the same reference numeral as that counterpart's, and description thereof will be omitted herein.

In the guide grooves 65 of the mirror member 60, inserted are the projections 751 provided for the housing 70. The mirror member 60 is able to perform the sliding operation and rotational operation with respect to the housing 70 with the projections 751 inserted into the guide grooves 65. The mirror member 60 includes, at the front end of the lower surface thereof, a protruding piece 63A (see FIG. 11) protruding downward when the mirror member 60 is located at the first position. In addition, the inner surface of the right and left lateral hood parts 75 of the housing 70 is provided with two guide rails 752 extending in the upward/downward direction to guide the mirror member 60. Note that a part of housing 70, which comes under the mirror member 60 located at the first position, is open. That is to say, no lower hood part 76 is provided under the mirror member 60.

Figure 11:
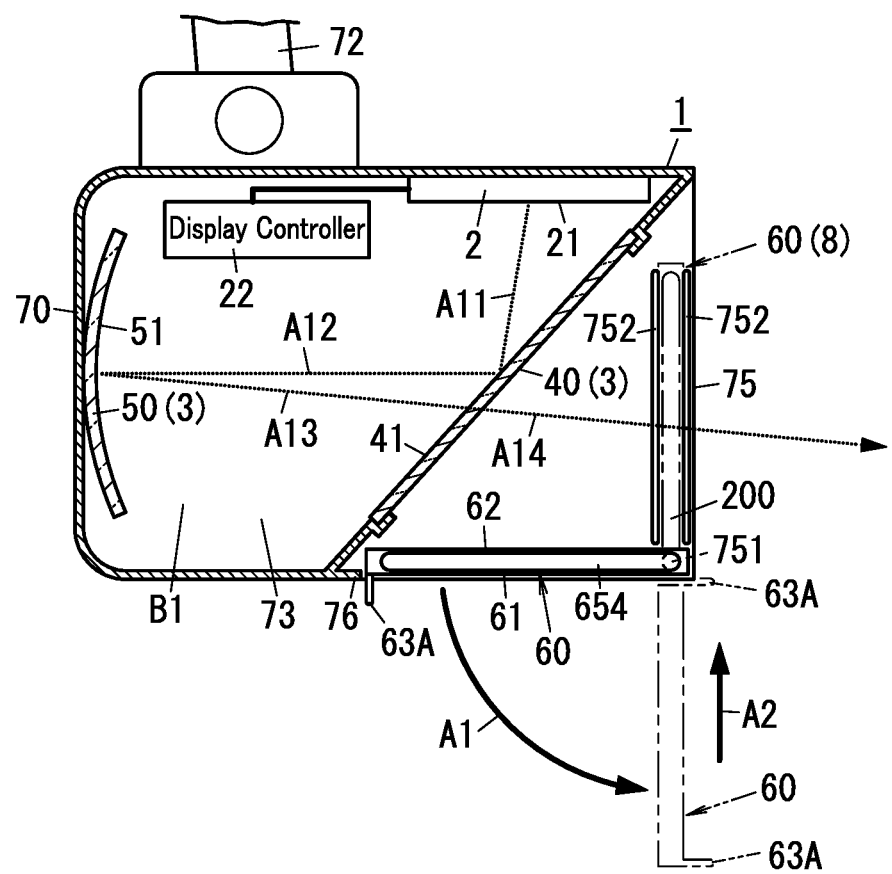
FIG. 11 schematically illustrates the display system according to the fourth variation.

As shown in FIG. 11, in the first state where the mirror member 60 is located at the first position, each of the projections 751 is located around the right end of its associated guide groove 65. When the mirror member 60 is located at the first position, the first state where the mirror member 60 is located at the first position is kept by the state keeper 80 that has already been described for the second or third variation.

To switch the state of the mirror member 60 from the first state to the second state, the user (e.g., the viewer 400) of the display system 1 pulls downward the protruding piece 63A to rotate the mirror member 60 counterclockwise (i.e., in the direction indicated by the arrow A1) around the projections 751. Thereafter, the viewer 400 displaces, holding the protruding piece 63A in his or her hand, the mirror member 60 upward (i.e., in the direction indicated by the arrow A2). At this time, with the projections 751 inserted into the guide grooves 651, the mirror member 60 moves to reach the second position while being guided by the guide rails 752. Once the mirror member 60 has reached the second position, the second state where the mirror member 60 is located at the second position is kept by the state keeper 80 that has already been described for the second or third variation.

In the display systems 1 according to the exemplary embodiment and fourth variation described above, the projections 64 or 751 are provided for one of the two members consisting of the housing 70 and the mirror member 60 and the guide grooves 77 or 65, to which the projections 64 or 751 are inserted, are provided for the other of the two members consisting of the housing 70 and the mirror member 60. Changing the positions of the projections 64 or 751 inside the guide grooves 77 or 65 allows the state of the mirror member 60 to be switched to either the first state or the second state. Switching the state of the mirror member 60 to either the first state or the second state in this manner by changing the positions of the projections 64 or 751 along the guide grooves 77 or 65 allows the mirror member 60 to move smoothly.

(3.5) Fifth Variation

A fifth variation of the display system 1 will be described with reference to FIG. 12.

Figure 12:
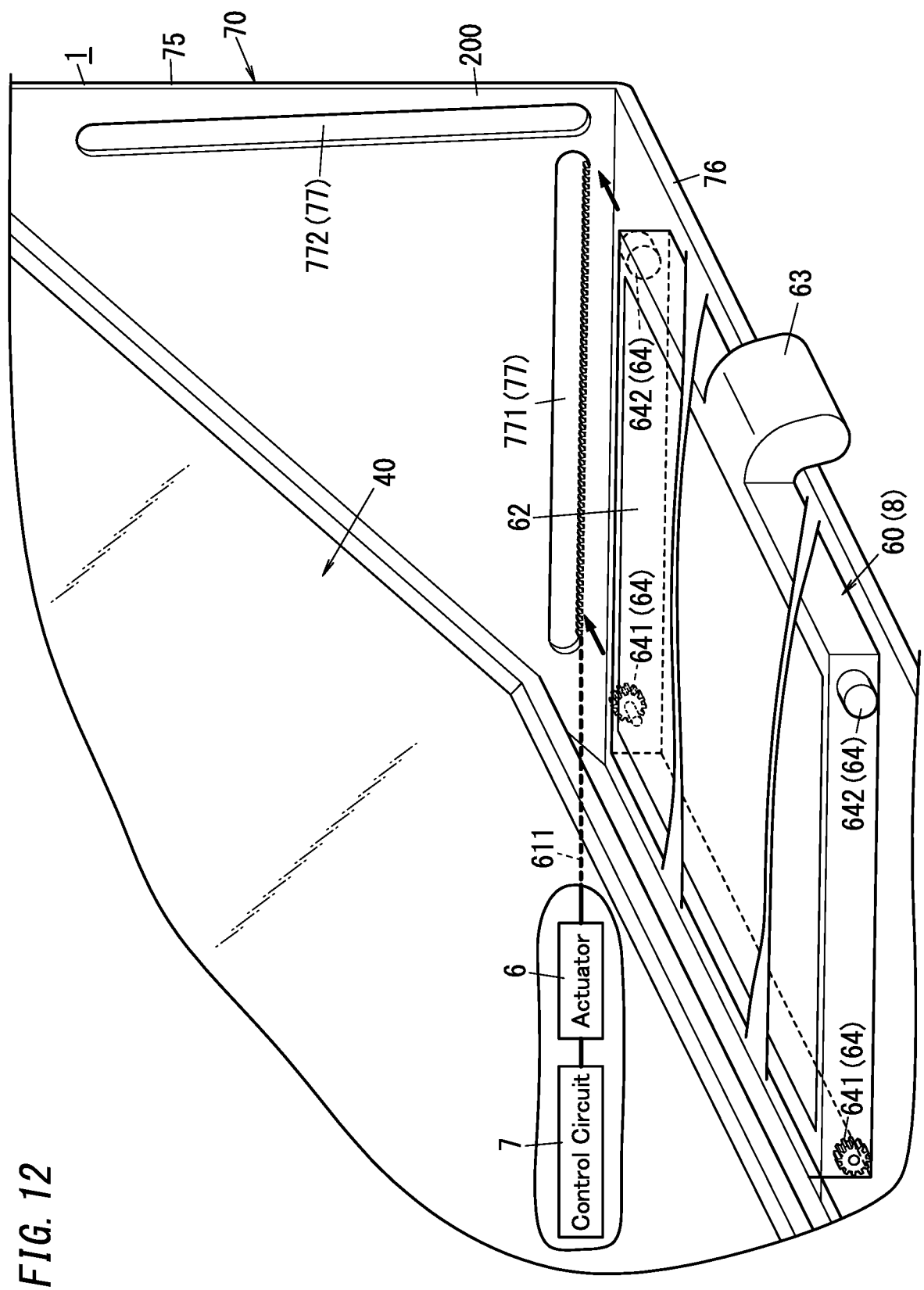
FIG. 12 schematically illustrates a display system according to a fifth variation of the first embodiment.

The display system 1 according to the fifth variation further includes an actuator 6 for reciprocating the mirror member 60 back and forth between the first position and the second position as shown in FIG. 12, which is a major difference from the exemplary embodiment described above. In the following description, any constituent element of this fifth variation, having the same function as a counterpart of the exemplary embodiment described above, will be designated by the same reference numeral as that counterpart's, and description thereof will be omitted herein.

In this variation, a pair of worm gears 611 is arranged inside the lateral hood parts 75 so as to extend along the first guide grooves 771, for example. The worm gears 611 are arranged to be ready to rotate. One end of each of the worm gears 611 is inserted into the chamber 73. The actuator 6 includes an electric motor, for example, and one end of each of the worm gears 611 is coupled to the output shaft of the motor. A control circuit 7 for controlling the motor (actuator 6) is also housed in the chamber 73.

The worm gears 611 are partially exposed inside the first guide grooves 771. The peripheral surface of each of the first projections 641 inserted into the first guide grooves 771 has a pinion gear. With the first projections 641 inserted into the first guide groove 771, the worm gears 611 arranged in the first guide grooves 771 mesh with the pinion gears on the surface of the first projections 641.

In this case, the first projections 641 are fixed to the mirror member 60. As the control circuit 7 rotates the worm gears 611 by controlling the actuator 6, the first projections 641 move inside the first guide grooves 771 with the rotation of the worm gears 611. Moving the first projections 641 inside the first guide grooves 771 causes the mirror member 60 to reciprocate back and forth between the first position and the second position.

On receiving an error signal, indicating that an error has occurred in the display operation by the display device 2, from the display device 2 or the display controller 22, for example, the control circuit 7 controls the motor (actuator 6) to displace the mirror member 60 from the first position to the second position. This allows the mirror member 60 to be displaced to the second position when an error occurs in the display operation by the display device 2, thus allowing the viewer 400 to view the reflected image produced on the reflective surface 61 of the mirror member 60. Thus, the display system 1 is able to display an alternative image even when an error occurs in the display operation by the display device 2.

Optionally, on receiving a notification signal, indicating that the display operation by the display device 2 has recovered from the error, from the display device 2 or the display controller 22, for example, the control circuit 7 may control the motor (actuator 6) to displace the mirror member 60 to the first position. This allows, when the display operation by the display device 2 has recovered from the error, the viewer 400 to view the image produced on the display device 2 through the reflection optical system B1.

In this variation, the mirror member 60 is displaced by having the motor rotate the worm gears 611. However, the mechanism for having the motor rotate the mirror member 60 may be changed as appropriate. For example, the mirror member 60 may be reciprocated between the first position and the second position by having the motor rotate a rotational drum for reeling up and feeding out a wire, one end of which is connected to the mirror member 60. Also, the actuator 6 does not have to be implemented as a motor but may also be implemented as a solenoid for driving a mechanism for displacing the mirror member 60 from the first position to the second position.

(3.6) Sixth Variation

Figure 13:
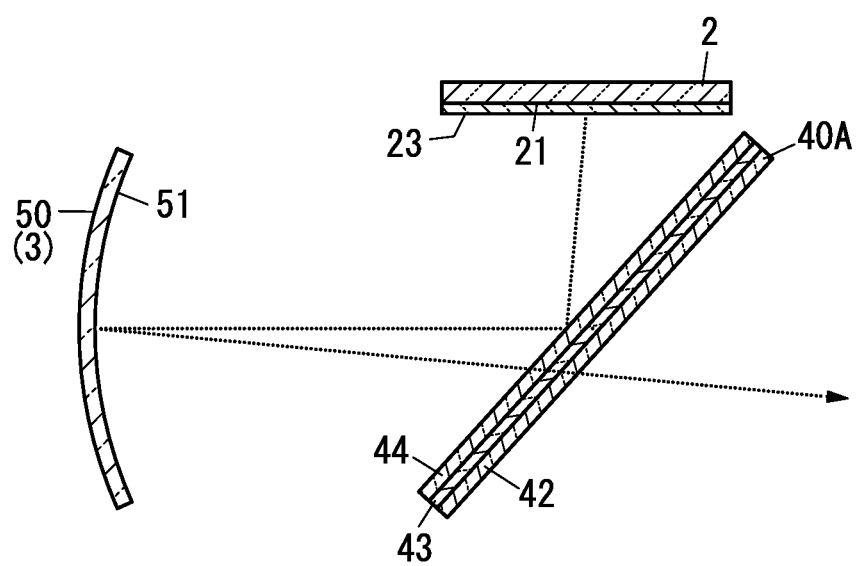
FIG. 13 schematically illustrates a display system according to a sixth variation of the first embodiment.

In the exemplary embodiment described above, the half mirror 40 is implemented as an evaporation type beam splitter. However, the half mirror 40 does not have to be an evaporation type beam splitter. Alternatively, as shown in FIG. 13, the display device 2 may be implemented as an LCD panel, a λ/4 retarder (first λ/4 retarder) 23 may be arranged on the display screen 21 thereof, and the half mirror 40A may have a multilayer structure in which a reflective polarizer 43 such as a wire grid and a λ/4 retarder 44 are stacked one on top of the other on a flat glass plate 42. The λ/4 retarder 23 produces, in the electric field oscillation direction, a retardation of a quarter wavelength between the incoming light incident on the λ/4 retarder 23 from the LCD panel and the outgoing light transmitted through, and going out of, the λ/4 retarder 23.

That is to say, the half mirror 40A shown in FIG. 13 has a multilayer structure in which a reflective polarization film (reflective polarizer 43) and a λ/4 retarder 44 (second λ/4 retarder) are stacked one on top of the other. The reflective polarizer 43 transmits light having a predetermined oscillation direction. The λ/4 retarder 44 produces, in the electric field oscillation direction, a retardation of a quarter wavelength between the incoming light and outgoing light of the half mirror 40. In this case, the reflective polarizer 43 forming part of the half mirror 40A may be a polarizer which reflects S-polarized light and transmits P-polarized light, for example.

When such a configuration is adopted, the P-polarized light that has emerged from the display screen 21 is transformed by the λ/4 retarder 23 on the display screen 21 into circularly polarized light. Thereafter, the circularly polarized light is transformed by the λ/4 retarder 44 on the reflective polarizer 43 into S-polarized light. In the S-polarized light, almost every light ray is reflected from the reflective polarizer 43 and the reflected light is transformed by the λ/4 retarder 44 on the reflective polarizer 43 into circularly polarized light. The circularly polarized light is reflected from the last reflective member 50 and then incident again on the λ/4 retarder 44 on the reflective polarizer 43 to be transformed into P-polarized light. In the P-polarized light, almost every light ray is transmitted through the reflective polarizer 43 and the transmitted light ray reaches the viewer's 400 eyes 401. This configuration allows the light that has emerged from the display device 2 to impinge on the viewer's 400 eyes 401 more efficiently than the evaporation type beam splitter.

In this variation, when the optical mirror serving as the shield member 8 is replaced with a liquid crystal member such as a liquid crystal mirror, the following configuration is suitably adopted. When the shield member 8 is implemented as a liquid crystal mirror, the liquid crystal mirror may be arranged on an optical path between the half mirror 40 and the viewer 400. The transmittance of the light through the liquid crystal mirror varies according to the applied voltage. More specifically, in the liquid crystal mirror, at least the transmittance of visible light varies according to the applied voltage. That is to say, the liquid crystal mirror may assume, depending on the applied voltage, either the shielding state in which the visible light is partially cut off or the unshielding state in which cutting off the visible light is canceled. The shielding state is a state where the transmittance of visible light through the liquid crystal mirror is relatively low. The unshielding state is a state where the transmittance of visible light through the liquid crystal mirror is higher than in the shielding state. In this case, the reflection optical system B1 including the λ/4 retarders 44 and 23 on the half mirror 40 and the display screen 21 may be designed such that when the liquid crystal mirror is in the unshielding state, the polarization direction of the light reflected from the half mirror 40 is aligned with the molecular alignment direction of the liquid crystal mirror when the reflected light impinges on the liquid crystal mirror. The reflection optical system B1 including the λ/4 retarders 44 and 23 on the half mirror 40 and the display screen 21 may be designed such that when the liquid crystal mirror is in the shielding state, the polarization direction of the light impinging on the liquid crystal mirror intersects with the molecular alignment direction of the liquid crystal mirror.

(3.7) Seventh Variation

Figure 14:
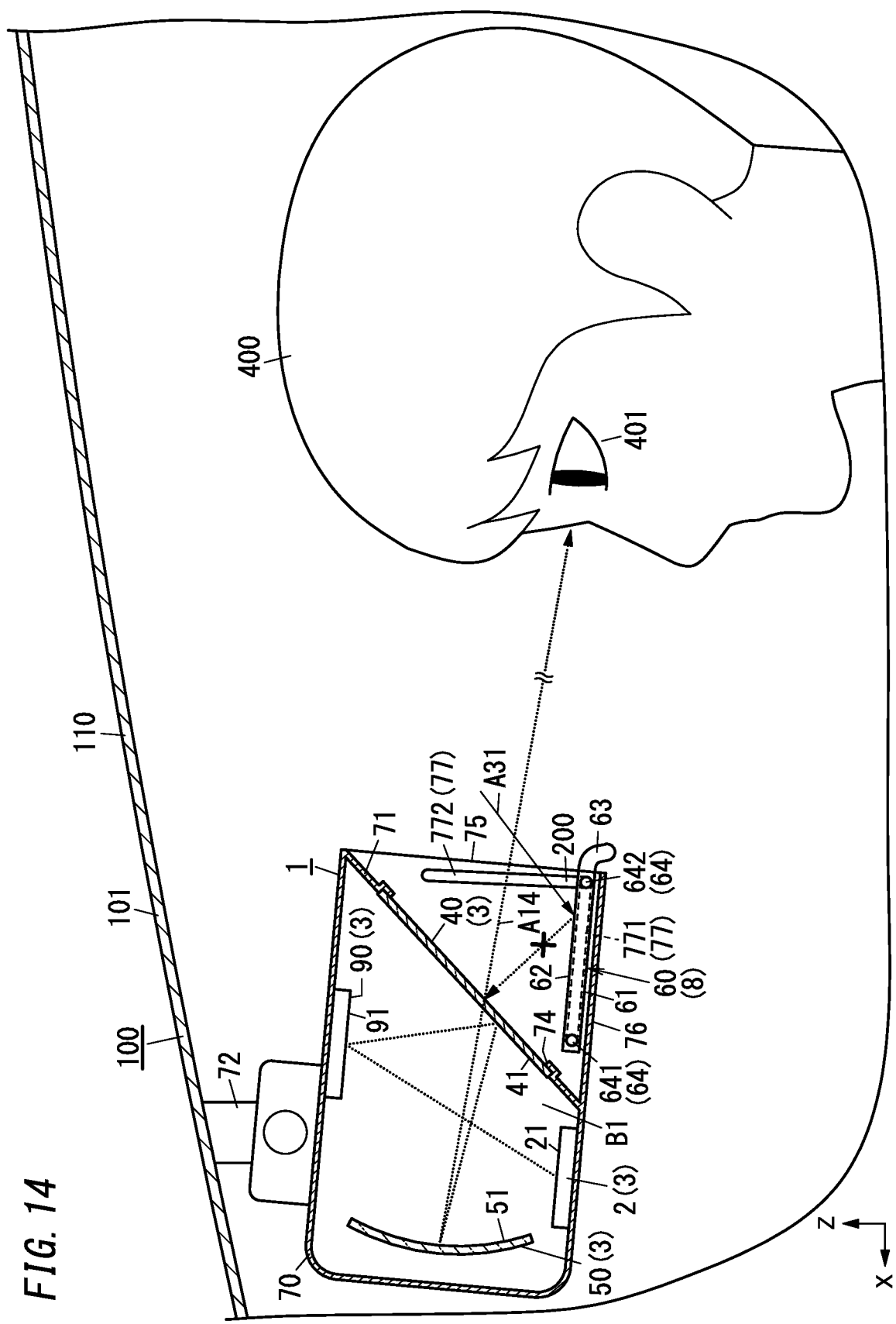
FIG. 14 schematically illustrates a display system according to a seventh variation of the first embodiment.

Optionally, in the exemplary embodiment and first to sixth variations described above, the reflection optical system B1 may further include an intermediate reflective member 90. FIG. 14 schematically illustrates a display system 1 according to the seventh variation. In the other respects, the seventh variation has the same configuration as the first embodiment described above. Thus, in the following description, any constituent element of this seventh variation, having the same function as a counterpart of the first embodiment described above, will be designated by the same reference numeral as that counterpart's, and description thereof will be omitted herein.

The display system 1 according to the seventh variation includes a reflection optical system B1 including the intermediate reflective member 90 and the last reflective member 50.

The display device 2 is arranged on the bottom of the chamber 73 with its display screen 21 facing upward.

The intermediate reflective member 90 may be implemented as a plane mirror, for example, and may be arranged on the ceiling of the chamber 73 with its reflective surface 91 facing downward. The intermediate reflective member 90 reflects, toward the half mirror 40, the light that has emerged from the display screen 21 of the display device 2. That is to say, in the display system 1 according to this seventh variation, the reflection optical system B1 further includes the intermediate reflective member 90 for reflecting, toward the half mirror 40, the light that has emerged from the display screen 21 of the display device 2. Note that the intermediate reflective member 90 does not have to be a plane mirror but may also be a concave mirror, a convex mirror, or a Fresnel mirror.

The last reflective member 50 may be implemented as a concave mirror, for example. The last reflective member 50 is arranged at the front end of the chamber 73 with the reflective surface 51 thereof facing backward.

In the seventh variation, the reflection optical system B1 includes the intermediate reflective member 90 and the last reflective member 50. The light that has emerged from the display screen 21 of the display device 2 is incident on the reflective surface 91 of the intermediate reflective member 90 and reflected from the reflective surface 91 toward the half mirror 40. The light incident on the half mirror 40 is further reflected from the half mirror 40 to be incident on the last reflective member 50. The last reflective member 50 reflects the incident light back toward the half mirror 40. Part of the incident light is transmitted through the half mirror 40 to eventually impinge on the viewer's 400 eyes 401.

In the seventh variation, only one intermediate reflective member 90 is provided. However, the number of the intermediate reflective members 90 provided does not have to be one but may be changed as appropriate.

Also, in the exemplary embodiment and first to sixth variations described above, the reflection optical system B1 includes the half mirror 40. However, the reflection optical system B1 does not have to include the half mirror 40. Alternatively, a transparent cover may be attached in place of the half mirror 40 to the housing 70, and an intermediate reflective member for reflecting, toward the last reflective member 50, the light that has emerged from the display device 2 may be arranged inside the housing 70 so that the light reflected from the last reflective member 50 may go out of the housing 70 through the transparent cover.

(3.8) Other Variations

In the exemplary embodiment described above, the display device 2 is arranged on the ceiling of the chamber 73. However, this is only an example and should not be construed as limiting. Alternatively, the display device 2 may also be arranged on the bottom of the chamber 73.

In that case, the display device 2, the half mirror 40, the last reflective member 50, and the mirror member 60 will be arranged upside down, compared to the arrangement shown in FIG. 1. Specifically, the half mirror 40 will be arranged obliquely such that the lower end thereof protrudes backward with respect to the upper end thereof. In the first state, the mirror member 60 will be arranged over the half mirror 40.

In the first state where the mirror member 60 is located at the first position, as the viewer 400 operates the protruding piece 63 to displace the mirror member 60 from the first position, the mirror member 60 will move toward the second position due to its own weight. In other words, as the viewer 400 displaces the mirror member 60 from the first position using the operating member (i.e., the protruding piece 63), the state of the mirror member 60 switches from the first state to the second state due to its own weight. This provides a display system 1 which is able to display an alternative image even when any error occurs in the display operation performed by the display device 2. In addition, this also allows the viewer 400 to more easily perform the operation of switching the state of the mirror member 60 from the first state to the second state.

The electronic mirror system 5 according to the exemplary embodiment and variations described above does not have to be applied to the automobile 100 but is also applicable to any other type of moving vehicles including motorcycles, bicycles, railway trains, aircrafts, construction machines, ships, and boats Second Embodiment A second exemplary embodiment of the display system 1 will be described with reference to FIGS. 15-17.

In the display system 1 according to the second embodiment, the two or more reflective members 3 further include an intermediate reflective member 90 for reflecting, toward the half mirror 40, the light that has emerged from the display screen 21 of the display device 2, which is a major difference from the first embodiment described above. In the other respects, the second embodiment has the same configuration as the first embodiment described above. Thus, in the following description, any constituent element of this second embodiment, having the same function as a counterpart of the first embodiment described above, will be designated by the same reference numeral as that counterpart's, and description thereof will be omitted herein.

In this second embodiment, the two or more reflective members 3 include the intermediate reflective member 90, the half mirror 40, and the last reflective member 50. That is to say, the reflection optical system B1 includes the intermediate reflective member 90, the half mirror 40, and the last reflective member 50. In the chamber 73 of the housing 70, housed are the intermediate reflective member 90, the half mirror 40, and the last reflective member 50. Although not shown in any of FIGS. 15-17, the display controller 22 is also housed in the chamber 73.

In the second embodiment, the display device 2 is arranged on the ceiling of the chamber 73 with the display screen 21 thereof facing downward. The intermediate reflective member 90 may be implemented as a plane mirror, for example, and may be arranged on the bottom of the chamber 73 with its reflective surface 91 facing upward. The half mirror 40 is fitted into the through hole 74 cut through the rear wall 71 of the housing 70. The last reflective member 50 is arranged at the front end of the chamber 73 with the reflective surface 51 thereof facing backward. In this embodiment, the half mirror 40 is arranged obliquely such that the lower end thereof protrudes backward with respect to the upper end thereof.

Figure 15:
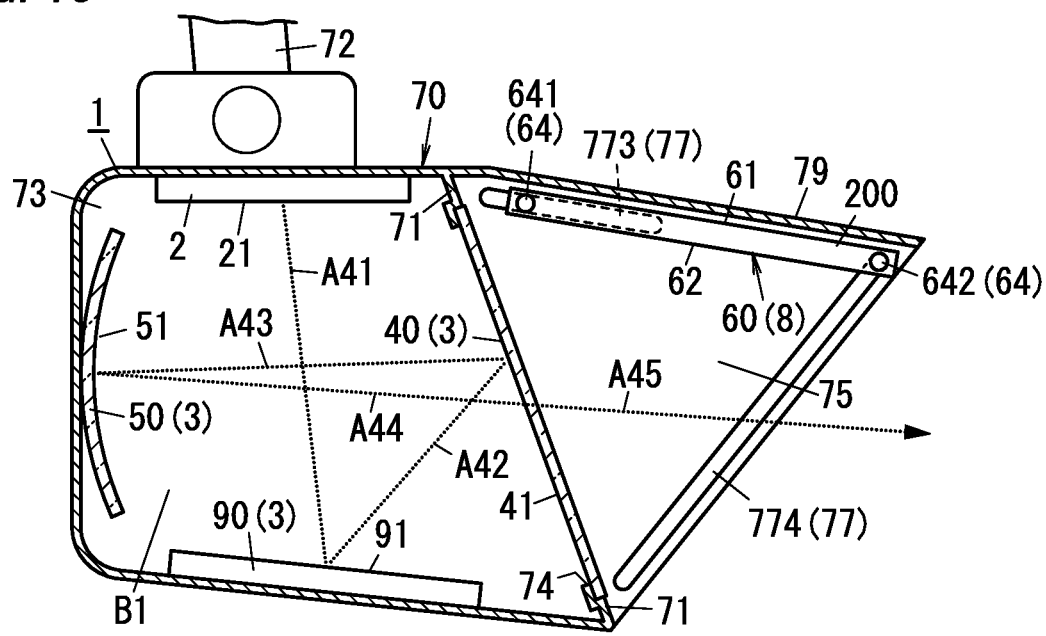
FIG. 15 schematically illustrates a display system according to a second embodiment of the present disclosure in a situation where its mirror member is located at a first position.
Figure 16:
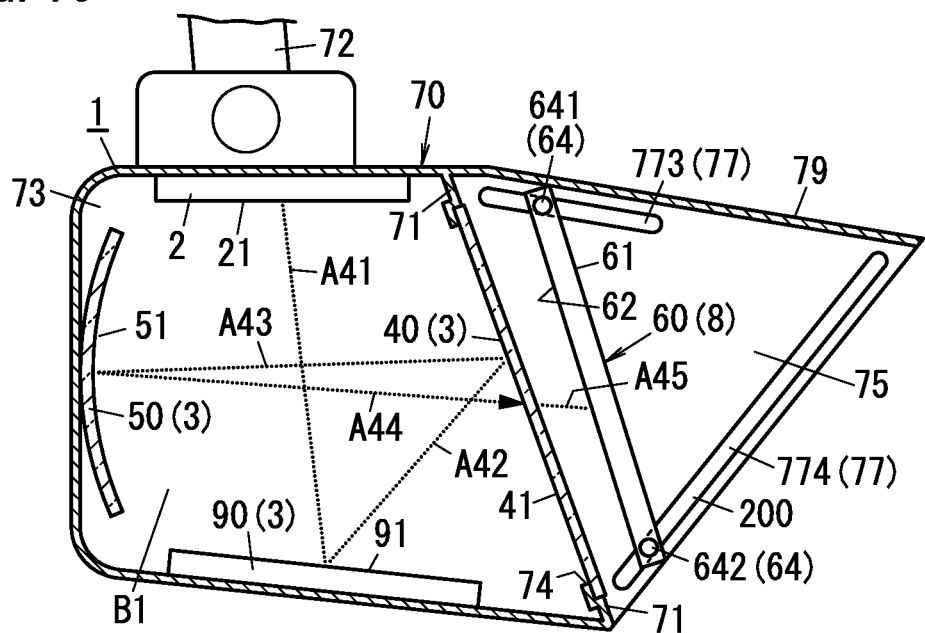
FIG. 16 schematically illustrates the display system in a situation where the mirror member is located halfway between the first position and the second position.
Figure 17:
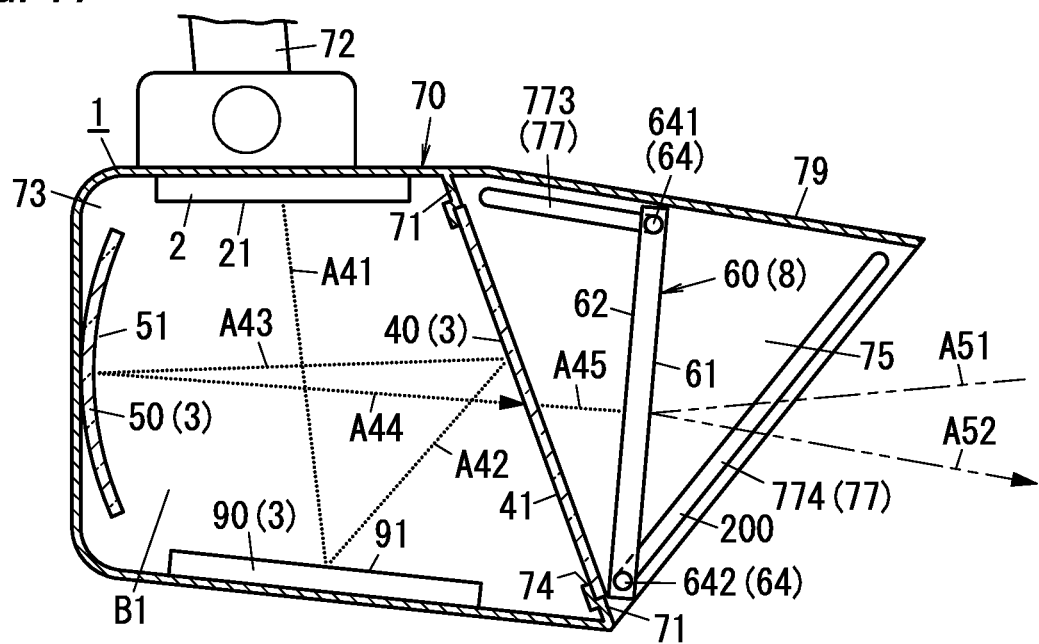
FIG. 17 schematically illustrates the display system in a situation where the mirror member is located at the second position.

In FIGS. 15-17, the optical paths A41-A45 along which the light that has emerged from around the center of the display screen 21 of the display device 2 is transmitted through the half mirror 40 to go out of the housing 70 are indicated by the dotted lines. In FIG. 17, the optical paths A51 and A52 along which the external light incident onto around the center of the mirror member 60 from outside of the housing 70 is reflected from the mirror member 60 are indicated by the two-dot chain lines. Note that in FIGS. 15-17, the dotted lines and two-dot chain lines indicating the optical paths A41-A45, A51, and A52 are virtual lines shown on those drawings just for the sake of convenience.

In this embodiment, as shown in FIG. 15, the light that has emerged from the display device 2 is reflected from the intermediate reflective member 90 and the half mirror 40, further reflected from the last reflective member 50 toward the half mirror 40, and then transmitted through the half mirror 40 to go out of the housing 70. To form such optical paths A41-A45, the display device 2 lets the outgoing light travel obliquely to a normal to the display screen 21 (i.e., along the optical path A41). In this embodiment, the light that has emerged from the display screen 21 of the display device 2 is reflected three times. This allows the housing 70 (chamber 73) to be further downsized while maintaining a desired viewing distance to the location where the virtual image is displayed.

The right and left side edges of the mirror member 60 are provided with a plurality of (e.g., four) cylindrical projections 64 as in the first embodiment described above. In this embodiment, the plurality of projections 64 includes first projections 641 provided at the front end of the right and left side faces of the mirror member 60 located at the first position and second projections 642 provided at the rear end of the right and left side faces of the mirror member 60 located at the first position. In addition, the mirror member 60 further includes, at the rear end thereof, a protruding piece (operating member), which protrudes obliquely downward, as an integral part thereof, in the state where the mirror member 60 is located at the first position. In FIGS. 15-17, illustration of the protruding piece is omitted.

Furthermore, in this embodiment, the housing 70 further includes, as its integral parts, lateral hood parts 75 protruding backward from the right and left side edges of the rear wall 71 and an upper hood part 79 protruding backward from the upper side edge of the rear wall 71. In this case, the lateral hood parts 75 and the upper hood part 79 form respective parts of a single integral hood.

The mirror member 60 is mounted onto the housing 70 so as to reciprocate between a first position (i.e., the position of the mirror member 60 shown in FIG. 15) and a second position (i.e., the position of the mirror member 60 shown in FIG. 17). The first position is a position of the mirror member 60 where the mirror member 60 is located under, and parallel to, the upper hood part 79 of the housing 70. The second position is a position of the mirror member 60 where the mirror member 60 is located between the half mirror 40 and the viewer 400. Specifically, the second position is a position where the mirror member 60 is arranged such that the surface of the mirror member 60 intersects, at generally right angles, with the optical path A45 of light transmitted through the half mirror 40 to be incident on the viewer's 400 eyes 401. In this case, the mirror member 60 is arranged in the space surrounded with the lateral hood parts 75, the upper hood part 79, and the half mirror 40. That is to say, the mirror member 60 is housed in the housing 70 so as to fall within the projection area of the housing 70. This allows the mirror member 60 to be arranged without increasing the overall size of the housing 70.

In this case, one surface of the mirror member 60 (i.e., the surface, facing away from the half mirror 40 and facing toward the viewer 400, of the mirror member 60 located at the second position) is a reflective surface 61 that reflects at least light falling within the visible light range. The other surface of the mirror member 60 (i.e., the surface opposite from the reflective surface 61) is an opaque surface 62, which reflects the light falling within the visible light range at a lower reflectance than the reflective surface 61.

The housing 70 has a plurality of guide grooves 77, which are cut through the inner surface of right and left lateral hood parts 75 and to which the plurality of projections 64 of the mirror member 60 are inserted. In this embodiment, the plurality of guide grooves 77 includes first guide grooves 773 to which the first projections 641 of the mirror member 60 are inserted and second guide grooves 774 to which the second projections 642 of the mirror member 60 are inserted. The first guide grooves 773 are cut through the inner surface of the lateral hood parts 75 so as to extend in the forward/backward direction. The second guide grooves 774 are cut through the inner surface of the lateral hood parts 75 so as to intersect with the first guide grooves 773.

As shown in FIG. 15, in the first state (unshielding state) where the mirror member 60 is located at the first position, the first projections 641 are located around the internal front end of the first guide grooves 773 and the second projections 642 are located around the internal top end of the second guide grooves 774. The mirror member 60 is located under, and along the lower surface of, the upper hood part 79, and is located outside of the optical path of the light transmitted through the half mirror 40 to eventually impinge on the viewer's 400 eyes 401. Thus, when the mirror member 60 is in the first state, the viewer 400 is able to view the image produced on the display screen 21 of the display device 2 (i.e., the first image) as an image that has been magnified and has had its focal length extended (i.e., the second image) by being reflected by the reflection optical system B1. Note that in the state where the mirror member 60 is located at the first position, the mirror member 60 is kept in the first state by the state keeper 80 that has been already described for the second or third variation.

As the viewer 400 pulls downward the protruding piece of the mirror member 60 in the first state, the first projections 641 slide backward inside the first guide grooves 773 and the second projections 642 slide downward inside the second guide grooves 774 as shown in FIG. 16. In this case, making the first projections 641 and the second projections 642 perform sliding operation while performing rotational operation inside the first guide grooves 773 and the second guide grooves 774, respectively, allows the mirror member 60 to move toward the second position while performing the rotational operation as a whole. As the viewer 400 displaces the mirror member 60 from the first position by pulling downward the protruding piece of the mirror member 60 in the first state, the mirror member 60 moves from the first position to the second position due to its own weight. This facilitates the operation of switching the state of the mirror member 60 from the first state to the second state.

When the state of the mirror member 60 is switched to the second state, the first projections 641 are located near the internal rear ends of the first guide grooves 773 and the second projections 642 are located near the internal lower ends of the second guide grooves 774 as shown in FIG. 17. In the second state, the mirror member 60 stands in the upward/downward direction with the reflective surface 61 facing away from the half mirror 40 (i.e., toward the viewer 400). In this second state, to the viewer's 400 eyes 401, the half mirror 40 is covered almost entirely with the mirror member 60. This allows the viewer 400 to view a reflected image produced by having the external light coming from outside of the housing 70 (from behind the automobile 100) reflected from the reflective surface 61. Note that when the mirror member 60 is located at the second position, the light transmitted through the half mirror 40 is cut off by the opaque surface 62 of the mirror member 60, thus preventing the viewer 400 from viewing the image produced on the display screen 21 of the display device 2. Therefore, if an error occurs in the display operation by the display device 2 due to a failure of the display device 2 or the image capture device 4, the viewer 400 is able to view the reflected image reflected from the reflective surface 61 by switching the state of the mirror member 60 to the second state. Note that when the mirror member 60 reaches the second position, the mirror member 60 is kept in the second state by the state keeper 80 that has already been described for the second or third variation.

Also, to switch the state of the mirror member 60 from the second state to the first state, the user (such as the viewer 400) pushes upward the protruding piece of the mirror member 60. When the protruding piece is pushed upward, the first projections 641 move forward inside the first guide grooves 773 and the second projections 642 move upward inside the second guide grooves 774, thereby switching the state of the mirror member 60 from the second state to the first state. Switching the state of the mirror member 60 to the first state allows the viewer 400 to view the reflected image (second image) produced by having the image (first image) on the display screen 21 of the display device 2 reflected and magnified by the reflection optical system B1.

In this embodiment, in the first state, the mirror member 60 is arranged under the upper hood part 79 with its opaque surface 62 facing downward. This reduces the chances of the external light coming from outside of the housing 70 and incident on the opaque surface 62 being reflected from the opaque surface 62 to form an image on the half mirror 40. In addition, in the first state, the mirror member 60 is arranged under the upper hood part 79 with its opaque surface 62 facing downward, thus reducing the chances of the opaque surface 62 collecting dust.

Optionally, in this embodiment, the reflection optical system B1 may include, instead of the intermediate reflective member 90 (first intermediate reflective member), a second intermediate reflective member for reflecting, toward the last reflective member 50, the light reflected from the half mirror 40. The second intermediate reflective member is also arranged on the bottom of the chamber 73 with its reflective surface facing upward. In this case, the light that has emerged from the display device 2 is first reflected from the half mirror 40 toward the second intermediate reflective member. This reflected light is further reflected from the second intermediate reflective member toward the last reflective member 50. Then, the light reflected from the last reflective member 50 impinges on, and is transmitted through, the half mirror 40 to go out of the housing 70. As can be seen, according to this embodiment, the number and arrangement of reflective members that form the reflection optical system B1 may be changed as appropriate.

In the second embodiment described above, the display device 2 is arranged on the ceiling of the chamber 73. However, this is only an example and should not be construed as limiting. Alternatively, the display device 2 may also be arranged on the bottom of the chamber 73.

In that case, the display device 2, the intermediate reflective member 90, the half mirror 40, the last reflective member 50, and the mirror member 60 will be arranged upside down, compared to the arrangement shown in FIG. 15. Specifically, the half mirror 40 will be arranged obliquely such that the upper end thereof protrudes backward with respect to the lower end thereof. In the first state, the mirror member 60 will be arranged below the half mirror 40.

In the first and second embodiments described above, the half mirror 40 is implemented as an evaporation type beam splitter. However, the half mirror 40 does not have to be an evaporation type beam splitter. Alternatively, the display device 2 may be implemented as an LCD panel, a $\lambda/4$ retarder may be arranged on the display screen 21 thereof, and the half mirror 40 may have a multilayer structure in which a reflective polarizer (reflective polarization film) such as a wire grid and a $\lambda/4$ retarder are stacked one on top of the other on a flat glass plate. In this case, the reflective polarizer forming an integral part of the half mirror 40 may be a polarizer which reflects S-polarized light and transmits P-polarized light, for example. When such a configuration is adopted, the P-polarized light that has emerged from the display screen 21 is transformed by the $\lambda/4$ retarder on the display screen 21 into circularly polarized light. Thereafter, the circularly polarized light is transformed by the λ/4 retarder on the reflective polarizer into S-polarized light. In the S-polarized light, almost every light ray is reflected from the reflective polarizer and the reflected light is transformed by the λ/4 retarder on the reflective polarizer into circularly polarized light. The circularly polarized light is reflected from the last reflective member 50 and then incident again on the λ/4 retarder on the reflective polarizer to be transformed into P-polarized light. In the P-polarized light, almost every light ray is transmitted through the reflective polarizer and the transmitted light ray reaches the viewer's 400 eyes 401. This configuration allows the light that has emerged from the display device 2 to impinge on the viewer's 400 eyes 401 more efficiently than the evaporation type beam splitter.

In the second embodiment, only one intermediate reflective member 90 is provided. However, the number of the intermediate reflective members 90 provided does not have to be one but may be changed as appropriate. Furthermore, the intermediate reflective member 90 does not have to be a plane mirror, but may also be a concave mirror, a convex mirror, or a Fresnel mirror.

Third Embodiment

A third embodiment of the display system 1 will be described with reference to FIGS. 18 and 19.

In the display system 1 according to each of the first and second embodiments described above, the mirror member 60 serving as the shield member 8 is held inseparably by the housing 70 and exposed outside of the chamber 73 of the housing 70. Meanwhile, in this embodiment, a mirror member 60A serving as the shield member 8 is housed inside the chamber 73 of the housing 70. The display system 1 according to the third embodiment has the same configuration as the display system 1 according to the second embodiment except that the mirror member 60A is housed inside the chamber 73 of the housing 70. Thus, in the following description, any constituent element of this third embodiment, having the same function as a counterpart of the second exemplary embodiment described above, will be designated by the same reference numeral as that counterpart's, and description thereof will be omitted herein. In FIG. 18, the optical paths A41-A44 along which the light that has emerged from around the center of the display screen 21 of the display device 2 is transmitted through the half mirror 40 to go out of the housing 70 are indicated by the dotted lines. In FIG. 19, the optical paths A51 and A52 along which the external light incident onto around the center of the mirror member 60A from outside of the housing 70 is reflected from the mirror member 60A are indicated by the dotted lines. Note that in FIGS. 18 and 19, the dotted lines indicating the optical paths A41-A44, A51, and A52 are virtual lines shown on those drawings just for the sake of convenience.

The display system 1 includes the display device 2, the reflection optical system B1, the mirror member 60A serving as the shield member 8, the holding structure 200 for keeping the mirror member 60A in either the unshielding state or the shielding state, and the housing 70.

The display device 2 is arranged on the ceiling of the chamber 73 with its display screen 21 facing downward.

The reflection optical system B1 includes the intermediate reflective member 90 implemented as a plane mirror, for example, the half mirror 40, and the last reflective member 50.

In the housing 70, a plate-shaped mirror member 60A, one surface of which is a reflective surface 61A, is provided as the shield member 8.

The holding structure 200 holds not only the mirror member 60A but also the last reflective member 50 as well.

This holding structure 200 holds the last reflective member 50 and the mirror member 60A rotatably with respect to the housing 70 with the reflective surface 61A of the mirror member 60A and the reflective surface 51 of the last reflective member 50 facing away from each other.

The state where the holding structure 200 has rotated the last reflective member 50 and the mirror member 60A to a rotational position where the reflective surface 51 of the last reflective member 50 faces the half mirror 40 (i.e., the position shown in FIG. 18) is the unshielding state where the light incident on, or reflected from, the last reflective member 50 is not cut off. In the unshielding state, the mirror member 60A is located opposite from the half mirror 40 with respect to the last reflective member 50 and outside of the optical path between the last reflective member 50 and the half mirror 40. In addition, in the unshielding state, the reflective surface 51 of the last reflective member 50 reflects, toward the viewer's 400 eyes 401, the light that has come from the half mirror 40. This allows the viewer 400 to view an image (second image) based on the image (first image) produced on the display screen 21 of the display device 2.

Figure 18:
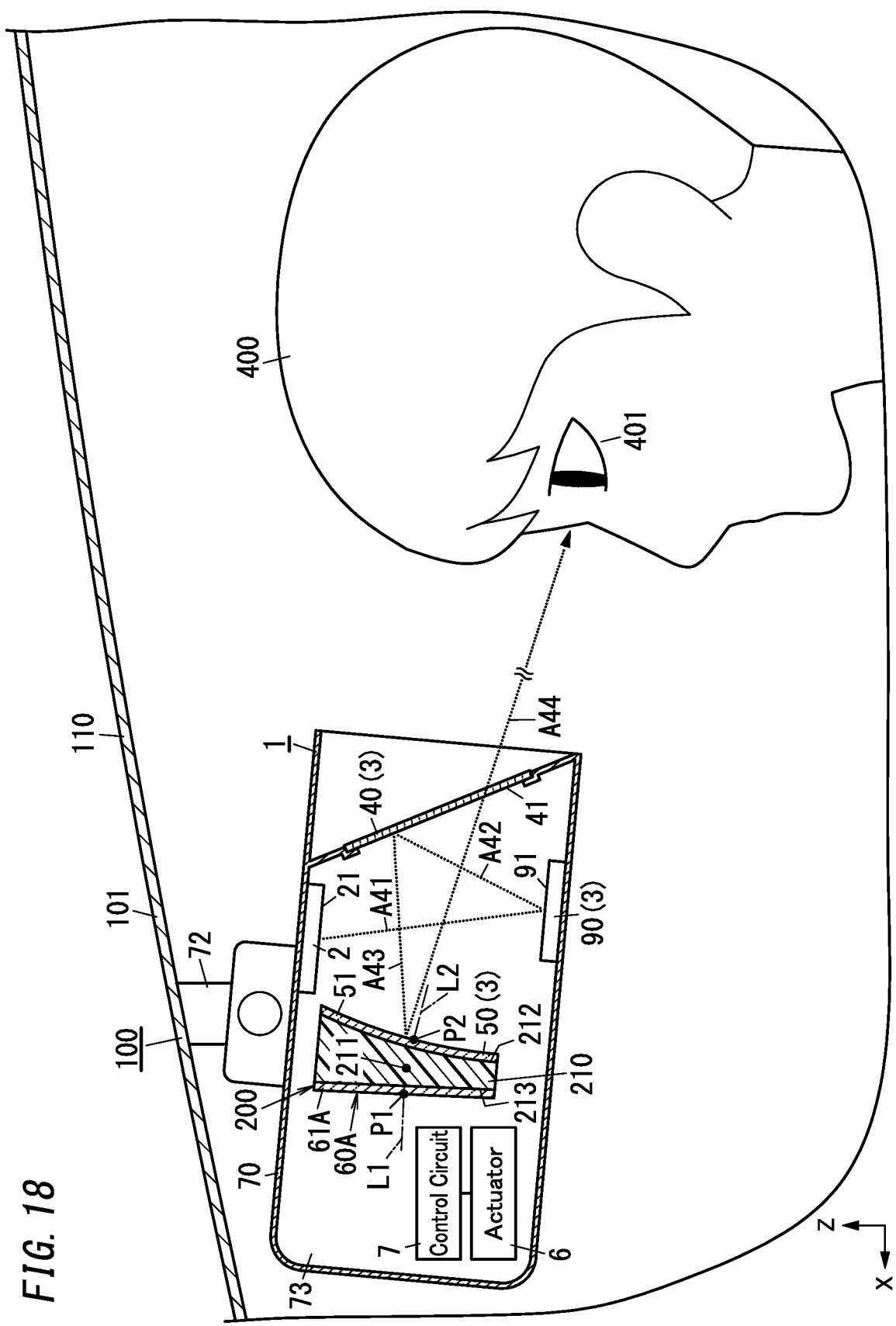
FIG. 18 illustrates a display system according to a third embodiment of the present disclosure in a situation where its mirror member assumes an unshielding state.
Figure 19:
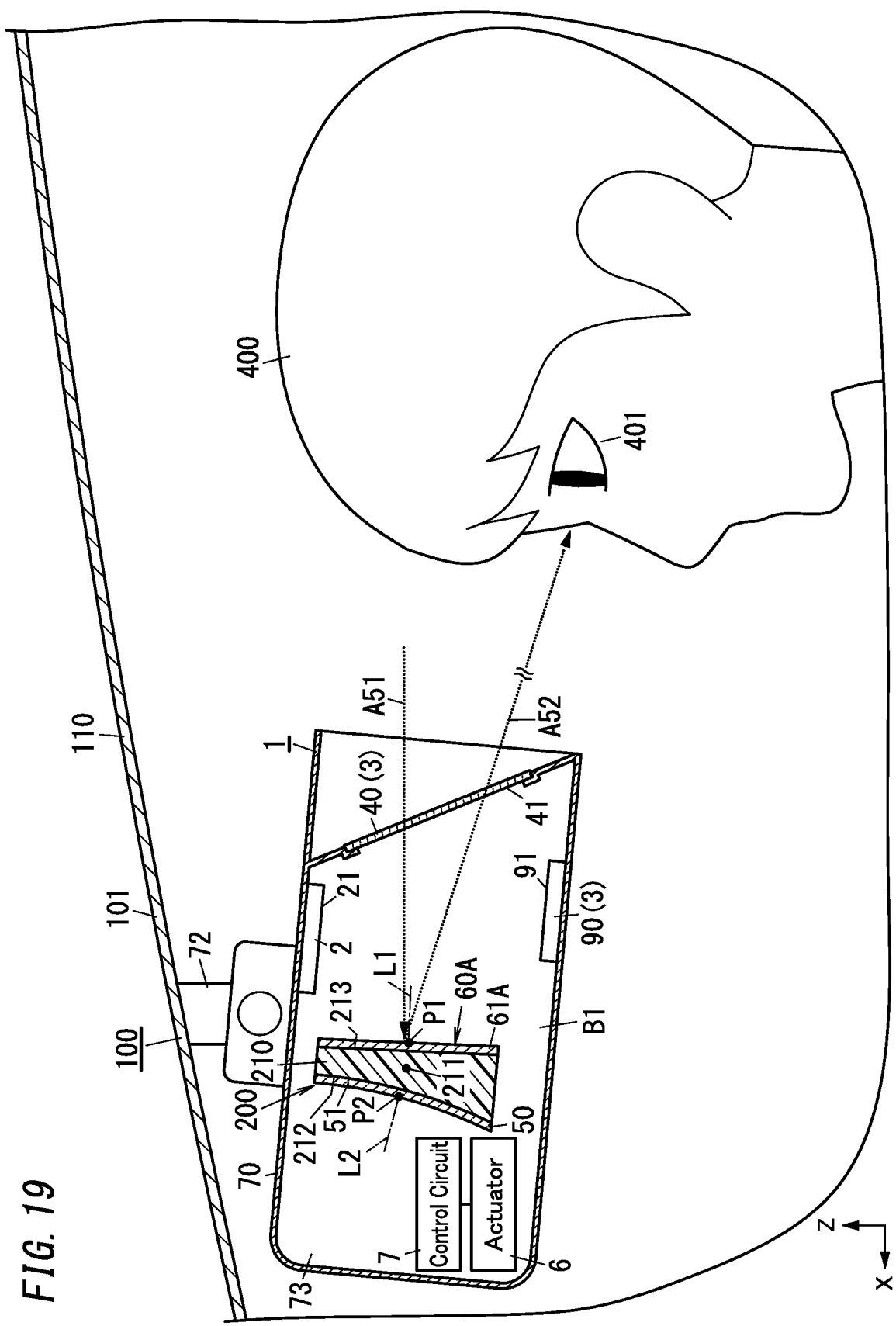
FIG. 19 illustrates the display system in a situation where its mirror member assumes a shielding state.

On the other hand, the state where the holding structure 200 has rotated the last reflective member 50 and the mirror member 60A by 180 degrees from the rotational position shown in FIG. 18 to a rotational position (shown in FIG. 19) is the shielding state where the light that would be incident on the last reflective member 50 is cut off. In this case, the holding structure 200 holds the last reflective member 50 and the mirror member 60A such that a normal L1 to the center P1 of the reflective surface 61A of the mirror member 60A is not parallel to a normal L2 to the center P2 of the reflective surface 51 of the last reflective member 50. As used herein, a normal to the center of a reflective surface is a line that passes through the center of the reflective surface and that is perpendicular to a tangent line drawn with respect to the center of the reflective surface. Also, as used herein, when some line or plane is "perpendicular to" another line or plane, the former line or plane may naturally cross the latter line or plane at right angles but may also look generally perpendicular to the latter to the human eyes. That is to say, an angle of a few degrees may be formed between the former line or plane and the line exactly perpendicular to the latter line or plane.

In the shielding state, the mirror member 60A is located on the optical path between the half mirror 40 and the last reflective member 50. In the shielding state, the light that has emerged from the display screen 21 of the display device 2 is reflected from the intermediate reflective member 90 and the half mirror 40 and then incident on the mirror member 60A. Thus, the light that would be incident on the last reflective member 50 is cut off by the mirror member 60A. In addition, since the normal L1 to the reflective surface 61A of the mirror member 60A is not parallel to the normal L2 to the reflective surface 51 of the last reflective member 50, the light that has emerged from the display device 2 and then incident on the mirror member 60A via the intermediate reflective member 90 and the half mirror 40 is reflected from the mirror member 60A in a direction different from the direction toward the eyes 401 of the viewer 400. This prevents the viewer 400 from viewing an image (second image) based on the image (first image) produced on the display device 2. In other words, the viewer 400 is shielded from the image produced on the display device 2. Note that when the control circuit 7 has rotated, using the actuator 6, the mirror member 60A to a position where the mirror member 60A faces the viewer 400, the display controller 22 suitably receives a notification signal indicating the shielding state from the control circuit 7 and suspends the display operation by the display device 2.

As described above, in the shielding state, the light that has emerged from the display screen 21 of the display device 2 is reflected from the intermediate reflective member 90 and the half mirror 40, incident on the mirror member 60A, and then reflected from the mirror member 60A in a direction different from the direction toward the eyes 401 of the viewer 400. This prevents the viewer 400 from viewing the image based on the image produced on the display screen 21 of the display device 2 (i.e., creating the shielding state). In the shielding state, the external light coming from outside of the housing 70 and incident on the mirror member 60A via the half mirror 40 is reflected by the mirror member 60A toward the viewer's 400 eyes 401, thus allowing the viewer 400 to view the reflected image produced by having the external light coming from outside of the housing 70 reflected from the reflective surface 61.

In this embodiment, the holding structure 200 includes a rotator 210 which is supported rotatably with respect to the housing 70. The last reflective member 50 and the mirror member 60A are held by the rotator 210. The rotator 210 is provided to readily rotate, on a rotational axis 211, between a first rotational position and a second rotational position. The first rotational position is a position where the reflective surface 51 of the last reflective member 50 is arranged to face the viewer 400 in the unshielding state as shown in FIG. 18. The second rotational position is a position where the reflective surface 61A of the mirror member 60A is arranged to face the viewer 400 in the shielding state as shown in FIG. 19. When viewed along the rotational axis 211, the rotator 210 has a trapezoidal shape. The last reflective member 50 is attached to one attachment surface 212 of the rotator 210 and the mirror member 60A is attached to the other attachment surface 213 of the rotator 210. In this embodiment, the last reflective member 50 is implemented as a concave mirror. Thus, the attachment surface 212 to which the last reflective member 50 is attached is a curved surface conforming to the curve of the last reflective member 50. The rotator 210 holds the mirror member 60A and the last reflective member 50 such that the normal L1 to the center P1 of the reflective surface 61A of the mirror member 60A is not parallel to the normal L2 to the center P2 of the reflective surface 51 of the last reflective member 50. This rotator 210 is driven by the actuator 6 (such as a motor) housed in the chamber 73 of the housing 70. In addition, in the chamber 73, also housed is the control circuit 7 for controlling the actuator 6. That is to say, the display system 1 further includes the actuator 6 for reciprocating the rotator 210 back and forth between the first rotational position and the second rotational position.

When receiving a signal, indicating that the display operation is performed normally by the display device 2, from the display device 2 or the display controller 22, for example, the control circuit 7 controls the actuator 6 to make the actuator 6 rotate the rotator 210 to the first rotational position. When the rotator 210 has rotated to the first rotational position, the light that has emerged from the display screen 21 of the display device 2 is reflected from the intermediate reflective member 90 and the half mirror 40 and then incident on the last reflective member 50. The last reflective member 50 reflects, toward the half mirror 40, the light that has come from the half mirror 40. Part of the light reflected from the last reflective member 50 is transmitted through the half mirror 40 and then incident on the viewer's 400 eyes 401, thus allowing the viewer 400 to view an image based on the image produced on the display screen 21 of the display device 2. Meanwhile, the external light coming from behind the automobile 100, transmitted through the half mirror 40, and then incident on the reflective surface 51 of the last reflective member 50 is reflected from the reflective surface 51 in a direction different from the direction toward the eyes of the viewer 400 (i.e., away from his or her eye box), thus preventing the external light from impinging on the viewer's 400 eyes 401.

On receiving an error signal, indicating that an error has occurred in the display operation by the display device 2, from the display device 2 or the display controller 22, for example, the control circuit 7 controls the motor (actuator 6) to make the motor rotate the rotator 210 to the second rotational position. Note that when an error has occurred in the display operation by the display device 2, the display controller 22 suspends the display operation by the display device 2, and therefore, no light emerges from the display screen 21 of the display device 2 in that state. In the state where the rotator 210 has rotated to the second rotational position, the external light coming from outside of the housing 70 (e.g., from behind the automobile 100) and incident on the reflective surface 61A of the mirror member 60A via the half mirror 40 is reflected from the reflective surface 61A of the mirror member 60A toward the viewer's 400 eyes 401. This allows the viewer 400 to view the reflected image produced on the reflective surface 61A of the mirror member 60A.

In this embodiment, the mirror member 60A and the last reflective member 50 are held by the rotator 210 such that the normal L1 to the center P1 of the reflective surface 61A of the mirror member 60A is not parallel to the normal L2 to the center P2 of the reflective surface 51 of the last reflective member 50. Thus, rotating the rotator 210 by 180 degrees from the rotational position of the rotator 210 where the light reflected from the last reflective member 50 is directed toward the viewer 400 allows the light reflected from the mirror member 60A to be directed toward the viewer 400. Therefore, according to this embodiment, every time the rotator 210 is rotated by 180 degrees, the state may be switched alternately from the unshielding state to the shielding state, and vice versa. That is to say, since the rotator 210 may have the same angle of rotation, no matter whether the state needs to be switched to the unshielding state or the shielding state, the same state keeper may be used to hold the rotator 210 at a predetermined rotational position in each of the unshielding state and the shielding state. In addition, the display system 1 further includes the actuator 6 for reciprocating the rotator 210 between the first rotational position and the second rotational position. This allows the viewer 400 to switch the state from the unshielding state to the shielding state, and vice versa, using the actuator 6.

In this embodiment, the mirror member 60A and the last reflective member 50 are held by the rotator 210 such that the normal L1 to the center P1 of the reflective surface 61A of the mirror member 60A is not parallel to the normal L2 to the center P2 of the reflective surface 51 of the last reflective member 50. However, the configuration of the holding structure 200 may be modified as appropriate.

Figure 20:
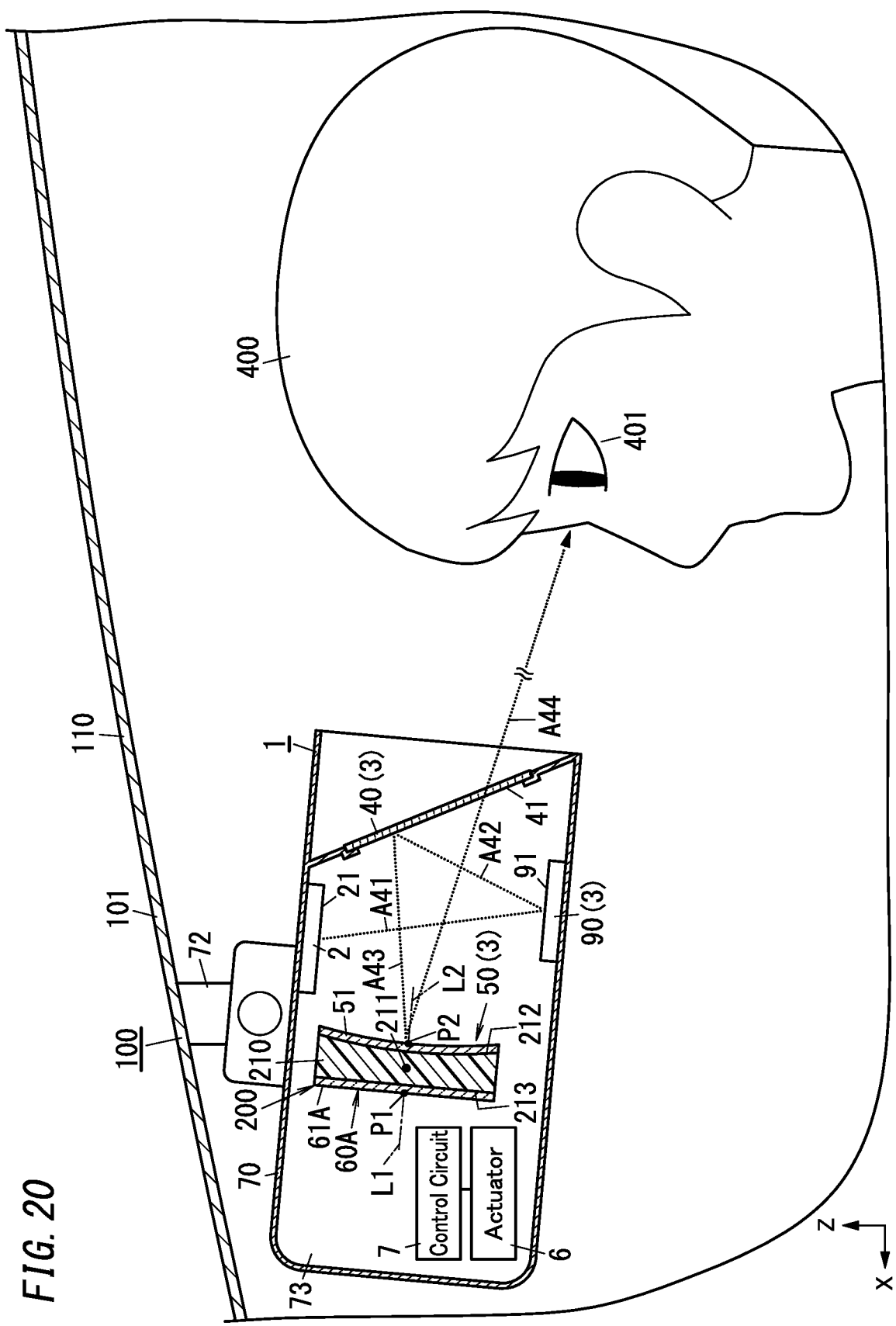
FIG. 20 illustrates a display system according to a variation of the third embodiment in a situation where its mirror member assumes an unshielding state.

For example, as shown in FIG. 20, the rotator 210 may hold the mirror member 60A and the last reflective member 50 such that the reflective surface 61A of the mirror member 60A and the reflective surface 51 of the last reflective member 50 face away from each other and that the normal L1 to the center P1 of the reflective surface 61A of the mirror member 60A is parallel to the normal L2 to the center P2 of the reflective surface 51 of the last reflective member 50. As used herein, when some line or plane is "parallel to" another line or plane, the former line or plane may naturally exactly parallel to the latter line or plane but may also look generally parallel to the latter to the human eyes. That is to say, an angle of a few degrees may be formed between the former and latter lines or planes.

In this embodiment, when rotating the rotator 210 in one direction (which may be either clockwise or counterclockwise) by controlling the actuator 6, the control circuit 7 rotates the rotator 210 to mutually different degrees to switch the state from the unshielding state to the shielding state and from the shielding state to the unshielding state. That is to say, the angle of rotation of the rotator 210 between the first rotational position (i.e., a position corresponding to the unshielding state) and the second rotational position (i.e., a position corresponding to the shielding state) is a predetermined angle other than 180 degrees. Setting the angle of rotation of the rotator 210 in the case of switching the unshielding state to the shielding state at a different value from the angle of rotation of the rotator 210 in the case of switching the shielding state to the unshielding state makes the direction aligned with the normal L2 to the center P2 of the reflective surface 51 of the last reflective member 50 in the unshielding state different from the direction aligned with the normal L1 to the center P1 of the reflective surface 61A of the mirror member 60A in the shielding state.

Thus, in the unshielding state, the light that has emerged from the display screen 21 of the display device 2 and then reflected from the intermediate reflective member 90 and the half mirror 40 is further reflected from the last reflective member 50 toward the viewer 400. This allows the viewer 400 to view the image (second image) based on the image (first image) produced on the display device 2. On the other hand, in the shielding state, the external light coming from outside of the housing 70 (e.g., from behind the housing 70) and then incident on the reflective surface 61A of the mirror member 60A via the half mirror 40 is reflected from the reflective surface 61A toward the viewer 400. This allows the viewer 400 to view the reflected image produced on the reflective surface 61A (i.e., the rear view from the automobile 100). In the shielding state, the display device 2 suspends emitting light. Even if light continued to emerge from the display screen 21 of the display device 2, the outgoing light would be reflected from the intermediate reflective member 90 and the half mirror 40, and then reflected from the reflective surface 61A of the mirror member 60A in a direction different from the direction toward the eyes of the viewer 400 (away from his or her eye box). Thus, the light would not impinge on the viewer's 400 eyes 401.

In this embodiment, the last reflective member 50 and the shield member 8 are held by the rotator 210. However, the rotator 210 is not an essential constituent element but may be omitted as appropriate. Alternatively, the holding structure 200 may mount each of the last reflective member 50 and the shield member 8 directly to the housing 70 separately from each other such that the last reflective member 50 and the shield member 8 are rotatable.

In this embodiment, the last reflective member 50 and the mirror member 60A serving as the shield member 8 are held by the rotator 210. Optionally, at least one additional mirror member may be further held by the rotator 210. In the following description, the mirror member 60A serving as the shield member 8 will be hereinafter referred to as a "first mirror member" and the additional mirror member other than the mirror member 60A serving as the shield member 8 will be hereinafter referred to as a "second mirror member."

Figure 21:
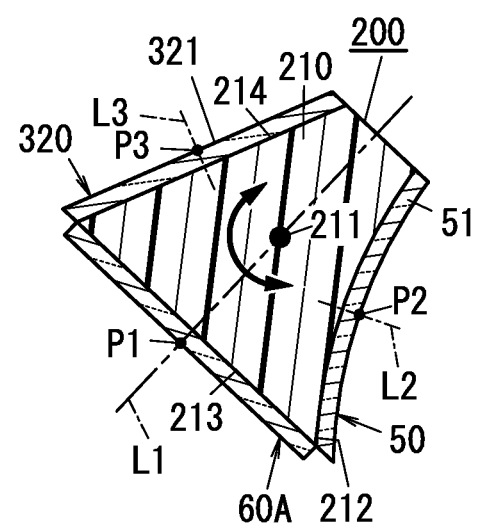
FIG. 21 illustrates another holding structure that the display system may have.

For example, FIG. 21 illustrates an exemplary rotator 210 that holds not only the last reflective member 50 and the first mirror member 60A but also an additional, second mirror member 320 as well. The second mirror member 320 is a plane, antiglare mirror having a lower reflectance than the first mirror member 60A. In this case, a normal L3 to the center P3 of the reflective surface 321 of the second mirror member 320 (additional mirror member) is parallel to neither the normal L2 to the center P2 of the reflective surface 51 of the last reflective member 50 nor the normal L1 to the center P1 of the reflective surface 61A of the first mirror member (mirror member) 60A. Note that the second mirror member 320 does not have to be a plane, antiglare mirror but may also be a convex mirror providing a wide viewing angle.

In this case, when viewed along the rotational axis 211, the rotator 210 has a trapezoidal shape. Out of the four surfaces surrounding the rotational axis 211, the last reflective member 50, the first mirror member 60A, and the second mirror member are respectively attached to three surfaces 212-214 except one of the two parallel planes (e.g., the smaller plane). In this embodiment, the last reflective member 50, the first mirror member 60A, and the second mirror member 320 are attached to the rotator 210 such that the first mirror member 60A is located between the last reflective member 50 and the second mirror member 320.

In this display system 1, in the unshielding state, the control circuit 7 controls the actuator 6 to make the actuator 6 rotate the rotator 210 such that the last reflective member 50 is arranged to face the viewer 400. This allows the viewer 400 to view an image based on the image produced on the display screen 21 of the display device 2.

In the shielding state, on the other hand, the control circuit 7 controls the actuator 6 to make the actuator 6 rotate the rotator 210 such that either the first mirror member 60A or the second mirror member 320 is arranged to face the viewer 400. When the first mirror member 60A is arranged to face the viewer 400, the light coming from behind the housing 70 and incident on the reflective surface 61A of the first mirror member 60A via the half mirror 40 is reflected from the reflective surface 61A toward the viewer 400. This allows the viewer 400 to view the reflected image produced on the reflective surface 61A (i.e., the rear view from the automobile 100). Likewise, when the second mirror member 320 is arranged to face the viewer 400, the light coming from behind the housing 70 and incident on the reflective surface 321 of the second mirror member 320 via the half mirror 40 is reflected from the reflective surface 321 toward the viewer 400. This allows the viewer 400 to view the reflected image produced on the reflective surface 321 (i.e., the rear view from the automobile 100). Note that when the second mirror member 320 is an antiglare mirror having a lower reflectance than the first mirror member 60A, the quantity of the reflected light decreases compared to when the light is reflected from the first mirror member 60A. This reduces the chances of the viewer 400 having a sense of glare even when glaring light such as the light emitted from the headlights of the following vehicle is incident at night on the second mirror member 320

Figure 22A:
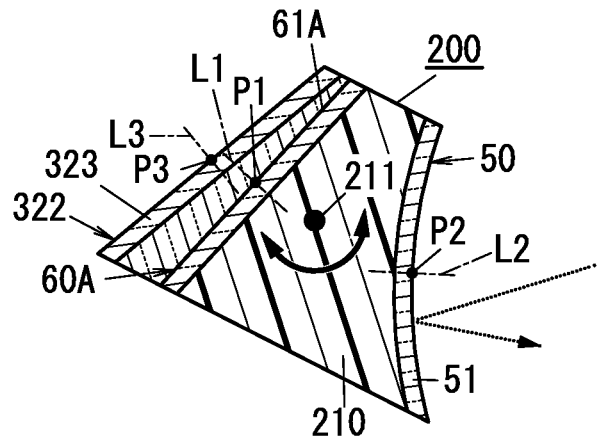
FIG. 22A illustrates a state of the display system where light is reflected from a last reflective member toward a viewer.
Figure 22B:
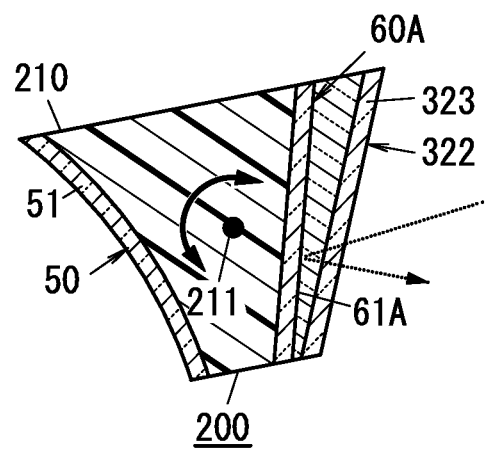
FIG. 22B illustrates a state of the display system where light is reflected from a first mirror member toward the viewer.
Figure 22C:
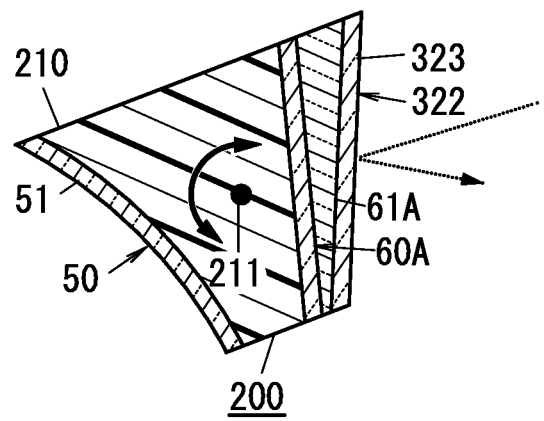
FIG. 22C illustrates a state of the display system where light is reflected from a second mirror member toward the viewer.

Alternatively, as shown in FIGS. 22A-22C, out of the four surfaces, surrounding the rotational axis 211, of the rotator 210 having a trapezoidal cross-sectional shape when viewed along the rotational axis 211, the last reflective member 50 may be arranged on one of the two non-parallel surfaces, and the mirror member 60A may be arranged on the other of the two non-parallel surfaces. In addition, an antiglare mirror 322 having a light-transmitting property may be provided for the rotator 210 so as to receive the light to be incident on the mirror member 60A. The reflectance of the antiglare mirror 322 is lower than that of the mirror member 60A and may be about 10%, for example. Note that the mirror member 60A and the antiglare mirror 322 are implemented as plane mirrors and are held by the rotator 210 such that the reflective surface of the mirror member 60A and the reflective surface 323 of the antiglare mirror 322 are not parallel to each other. That is to say, the mirror member 60A and the antiglare mirror 322 are held by the rotator 210 such that when viewed along the rotational axis 211 of the rotator 210, the normal L1 to the center P1 of the reflective surface 61A of the mirror member 60A and the normal L3 to the center P3 of the reflective surface 323 of the antiglare mirror 322 are not parallel to each other. A member having a light-transmitting property (such as a sheet of glass or acrylic resin) is arranged between the mirror member 60A and the antiglare mirror 322. The antiglare mirror 322 reflects part of the light incident on itself. The rest of the incident light is transmitted through the antiglare mirror 322, incident on the mirror member 60A, and then reflected from the mirror member 60A in a direction different from the direction in which the light is reflected from the antiglare mirror 322.

In this embodiment, in the unshielding state where the rotator 210 has rotated to such a position where the last reflective member 50 faces the viewer 400 as shown in FIG. 22A, the light that has emerged from the display screen 21 of the display device 2 is reflected from the intermediate reflective member 90 and the half mirror 40 and then incident on the reflective surface 51 of the last reflective member 50. Then, the reflective surface 51 of the last reflective member 50 reflects the light that has come from the half mirror 40 toward the viewer's 400 eyes 401. This allows the viewer 400 to view an image based on the image produced on the display screen 21 of the display device 2.

On the other hand, when the rotator 210 rotates to such a position where the light reflected from the reflective surface 61A of the mirror member 60A is incident on the viewer's 400 eyes 401 as shown in FIG. 22B, the viewer 400 views the reflected image produced on the mirror member 60A. That is to say, most of the external light coming from outside of the housing 70 via the half mirror 40 is transmitted through the antiglare mirror 322, incident on the mirror member 60A, and reflected from the reflective surface 61A of the mirror member 60A. The light reflected from the reflective surface 61A is transmitted through the half mirror 40 and then incident on the viewer's 400 eyes 401. This allows the viewer 400 to view the reflected image produced on the mirror member 60A. Note that part of the incoming light is also reflected from the antiglare mirror 322. However, since the antiglare mirror 322 reflects the incoming light in a direction different from the direction toward the eyes of the viewer 400, the viewer 400 does not view the reflected image produced on the antiglare mirror 322.

Furthermore, when the rotator 210 rotates to such a position where the light reflected from the reflective surface 323 of the antiglare mirror 322 is incident on the viewer's 400 eyes 401 as shown in FIG. 22C, the viewer 400 views the reflected image produced on the antiglare mirror 322. That is to say, part of the external light coming from outside of the housing 70 via the half mirror 40 is reflected from the reflective surface 323 of the antiglare mirror 322. The light reflected from the reflective surface 323 is transmitted through the half mirror 40 and then incident on the viewer's 400 eyes 401. This allows the viewer 400 to view the reflected image produced on the antiglare mirror 322. In this case, the antiglare mirror 322 has a lower reflectance than the mirror member 60A. This reduces the chances of the viewer having a sense of glare even when glaring light coming from outside of the housing 70 (such as the light emitted from the headlights of the following vehicle) is incident at night on the antiglare mirror 322. Note that most of the light incident on the antiglare mirror 322 is transmitted through the antiglare mirror 322, incident on the mirror member 60A, and then reflected from the reflective surface 61A of the mirror member 60A. However, since the reflective surface 61A reflects the incoming light in a direction different from the direction toward the eyes of the viewer 400, the viewer 400 does not view the reflected image produced on the mirror member 60A.

In this manner, the last reflective member 50, the mirror member 60A, and the antiglare mirror 322 are held by the rotator 210. Thus, changing the rotational position of the rotator 210 allows the state to be switched from the state where an image based on the image produced on the display device 2 is presented to the viewer 400 (i.e., the unshielding state) to the state where the reflected image produced on either the mirror member 60A or the antiglare mirror 322 is presented to the viewer 400 (i.e., the shielding state), and vice versa.

Figure 23:
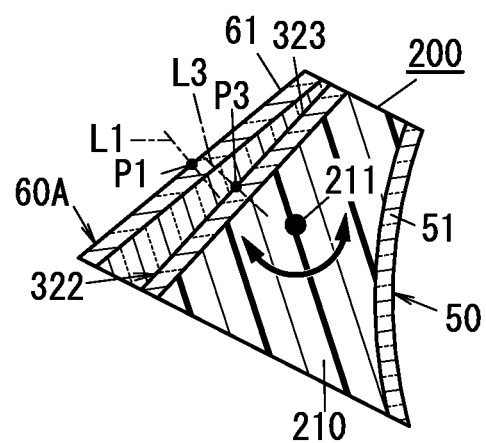
FIG. 23 illustrates still another holding structure that the display system may have.

In the display system 1 shown in FIGS. 22A-22C, the antiglare mirror 322 is arranged to receive the light that is going to be incident on the mirror member 60A. Alternatively, the antiglare mirror 322 may be arranged on one surface of the rotator 210 and the mirror member 60A may be arranged to receive the light that is going to be incident on the antiglare mirror 322 as shown in FIG. 23.

Figure 24:
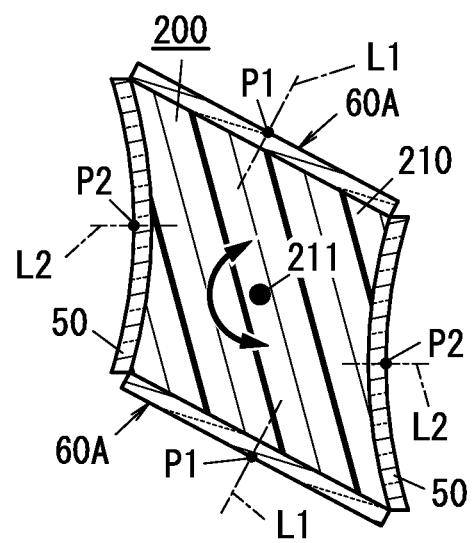
FIG. 24 illustrates yet another holding structure that the display system may have.

Still alternatively, the rotator 210 may also be formed in shape of a quadrangular prism, of which a cross section taken along a plane intersecting with the rotational axis 211 is quadrangular as shown in FIG. 24. In that case, the four side surfaces surrounding the rotational axis 211 of the rotator 210 may be covered with two last reflective members 50 and two mirror members 60A, which are arranged alternately with each other.

In this example, the rotator 210 has a parallelogram cross section when taken along a plane intersecting with the rotational axis 211. In addition, the two last reflective members 50 and the two mirror members 60A are held by the rotator 210 such that when rotated, within a plane perpendicular to the rotational axis 211, by 90 degrees around the rotational axis 211, the normal L2 to the center P2 of the reflective surface 51 of each last reflective member 50 is not parallel to the normal L1 to the center P1 of the reflective surface 61A of each mirror member 60A.

Therefore, in switching the unshielding state to the shielding state, or vice versa, the control circuit 7 may control the actuator 6 to make the actuator 6 rotate the rotator 210 by 90 degrees.

In the unshielding state, the rotator 210 is arranged such that either of the two last reflective members 50 faces the viewer 400, thus allowing the viewer 400 to view an image based on the image produced on the display screen 21 of the display device 2.

On the other hand, in the shielding state, the rotator 210 is arranged such that either of the two mirror members 60A faces the viewer 400. When the mirror member 60A is arranged to face the viewer 400, the external light coming from behind the housing 70 and incident on the reflective surface 61A of the mirror member 60A via the half mirror 40 is reflected from the reflective surface 61A toward the viewer 400. This allows the viewer 400 to view the reflected image produced on the reflective surface 61A (i.e., a rear view from the automobile 100).

As can be seen, the holding structure 200 shown in FIG. 24 is able to switch the unshielding state to the shielding state, and vice versa, by rotating the rotator 210 by 90 degrees. Thus, to switch the state to either the unshielding state or the shielding state, the rotator 210 needs to be rotated by less than 180 degrees. In addition, when the rotator 210 has the orientation shown in FIG. 24, the state may be switched from the unshielding state to the shielding state, and vice versa, by rotating the rotator 210 by 90 degrees either clockwise or counterclockwise.

Specifically, the two mirror members 60A attached to the rotator 210 may be plane mirrors, convex mirrors, or Fresnel mirrors.

Also, in the embodiment described above, the two mirror members 60A held by the rotator 210 are the same type of mirrors. Alternatively, two last reflective members 50 may be respectively attached to two opposing surfaces of the rotator 210, and a mirror member (first mirror member) 60A and another mirror member (second mirror member) 320, which is of a different type from the mirror member 60A, may be attached to the other two surfaces of the rotator 210. The other mirror member 320 may be an antiglare mirror having a lower reflectance than the mirror member 60A or may also be a convex mirror that provides a wider viewing angle than the mirror member 60A.

Figure 25:
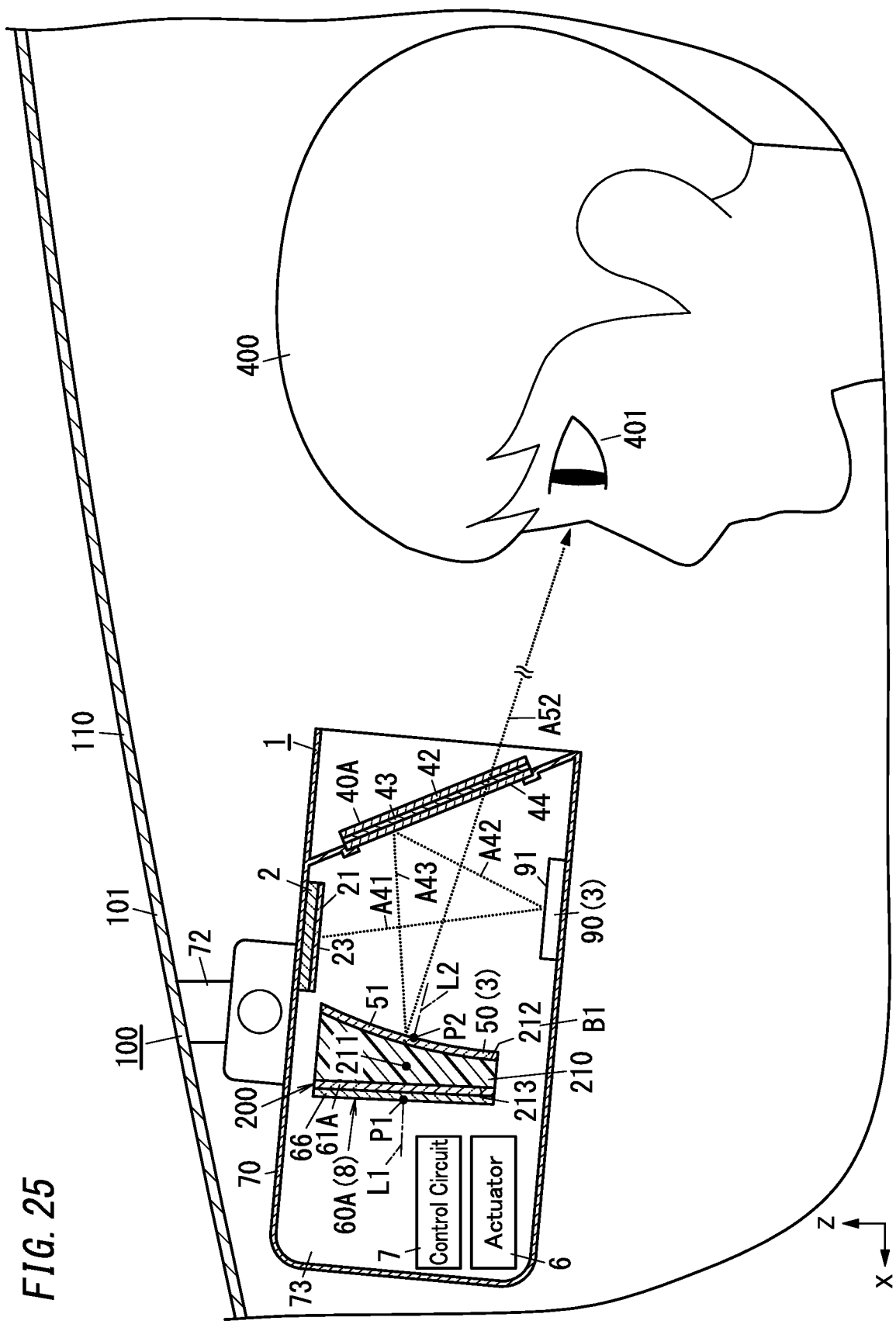
FIG. 25 illustrates a display system according to another variation of the third embodiment in a situation where its mirror member assumes an unshielding state.

Optionally, in this embodiment, a half mirror 40A having the same configuration as the sixth variation of the first embodiment is applicable as the half mirror that the reflection optical system B1 includes as shown in FIG. 25. That is to say, the half mirror included in the reflection optical system B1 may be a half mirror 40A having a multilayer structure in which a reflective polarization film (reflective polarizer 43) that transmits light with a predetermined oscillation direction and a $\lambda/4$ retarder 44 are stacked one on top of the other. The $\lambda/4$ retarder (first $\lambda/4$ retarder) 44 produces, in an electric field oscillation direction, a retardation of a quarter wavelength between the incoming light and the outgoing light of the half mirror 40A. The light that has emerged from the display screen 21 of the display device 2 is incident on the last reflective member 50 via the half mirror 40A and the light reflected from the last reflective member 50 is transmitted through the half mirror 40A and eventually incident on the viewer's 400 eyes 401 to present an image to him or her.

In that case, the display device 2 may include an LCD panel, a $\lambda/4$ retarder 23 may be arranged on the display screen 21 thereof, and the half mirror 40A may have a multilayer structure in which the reflective polarizer 43 such as a wire grid and the $\lambda/4$ retarder 44 are stacked one on top of the other on a flat glass plate 42.

In this embodiment, the plate-shaped mirror member 60A, one surface of which is the reflective surface 61A, is provided as the shield member 8 in the housing 70. In the unshielding state, the mirror member 60A is located at the first position outside of the optical path of the light reflected from the last reflective member 50 to be incident on the viewer's 400 eyes 401 as shown in FIG. 25. In the shielding state, the rotator 210 for holding the mirror member 60A has rotated 180 degrees, and the mirror member 60A is located between the last reflective member 50 and the viewer 400 with the reflective surface 61A oriented toward the viewer 400. On the surface of the mirror member 60A, provided is a $\lambda/4$ retarder (second $\lambda/4$ retarder) 66. The $\lambda/4$ retarder 66 produces, in an electric field oscillation direction, a retardation of a quarter wavelength between the incoming light and outgoing light of the mirror member 60A.

When such a configuration is adopted, the P-polarized light that has emerged from the display screen 21 is transformed, in the unshielding state, by the $\lambda/4$ retarder 23 on the display screen 21 into circularly polarized light. Thereafter, the circularly polarized light is transformed by the $\lambda/4$ retarder 44 on the reflective polarizer 43 into S-polarized light. In the S-polarized light, almost every light ray is reflected from the reflective polarizer 43 and the reflected light is transformed by the $\lambda/4$ retarder 44 on the reflective polarizer 43 into circularly polarized light. The circularly polarized light is reflected from the last reflective member 50 and then incident again on the $\lambda/4$ retarder 44 on the reflective polarizer 43 to be transformed into P-polarized light. In the P-polarized light, almost every light ray is transmitted through the reflective polarizer 43 and the transmitted light ray reaches the viewer's 400 eyes 401. This configuration allows the light that has emerged from the display device 2 to impinge on the viewer's 400 eyes 401 more efficiently than the evaporation type beam splitter.

In the shielding state, on the other hand, the external light coming from outside of the housing 70 is transmitted through the half mirror 40A and enters the housing 70. The P component of this incoming light is transmitted through the reflective polarizer 43 and transformed by the $\lambda/4$ retarder 44 into circularly polarized light. The circularly polarized light transmitted through the half mirror 40A is transformed by the $\lambda/4$ retarder 66 into S-polarized light, which is incident on the reflective surface 61A of the mirror member 60A. The reflective surface 61A of the mirror member 60A reflects the incident light and the reflected light is transmitted again through the $\lambda/4$ retarder 66 to be transformed into circularly polarized light, which is then incident on the half mirror 40A. At this time, the circularly polarized light incident on the half mirror 40A is transmitted through the $\lambda/4$ retarder 44 to be transformed into P-polarized light. In the P-polarizer light, almost every light ray is transmitted through the reflective polarizer 43 and the transmitted light eventually reaches the viewer's 400 eyes 401. This configuration allows the light that has emerged from the display device 2 to impinge on the viewer's 400 eyes 401 more efficiently than the evaporation type beam splitter.

Fourth Embodiment

A fourth embodiment of the display system 1 will be described with reference to FIGS. 26-28.

Figure 26:
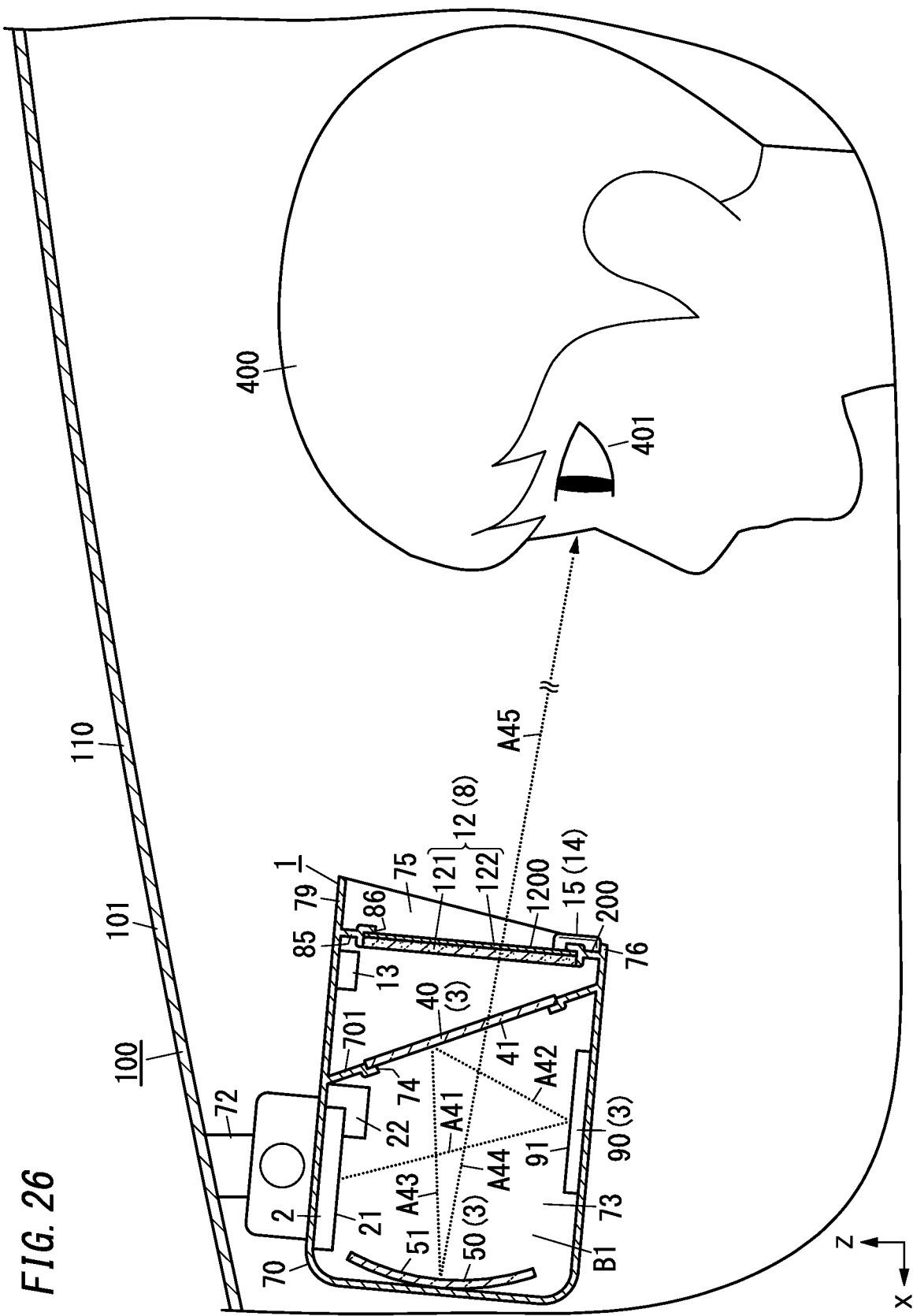
FIG. 26 schematically illustrates a display system according to a fourth embodiment of the present disclosure in a situation where its liquid crystal mirror assumes an unshielding state.
Figure 27:
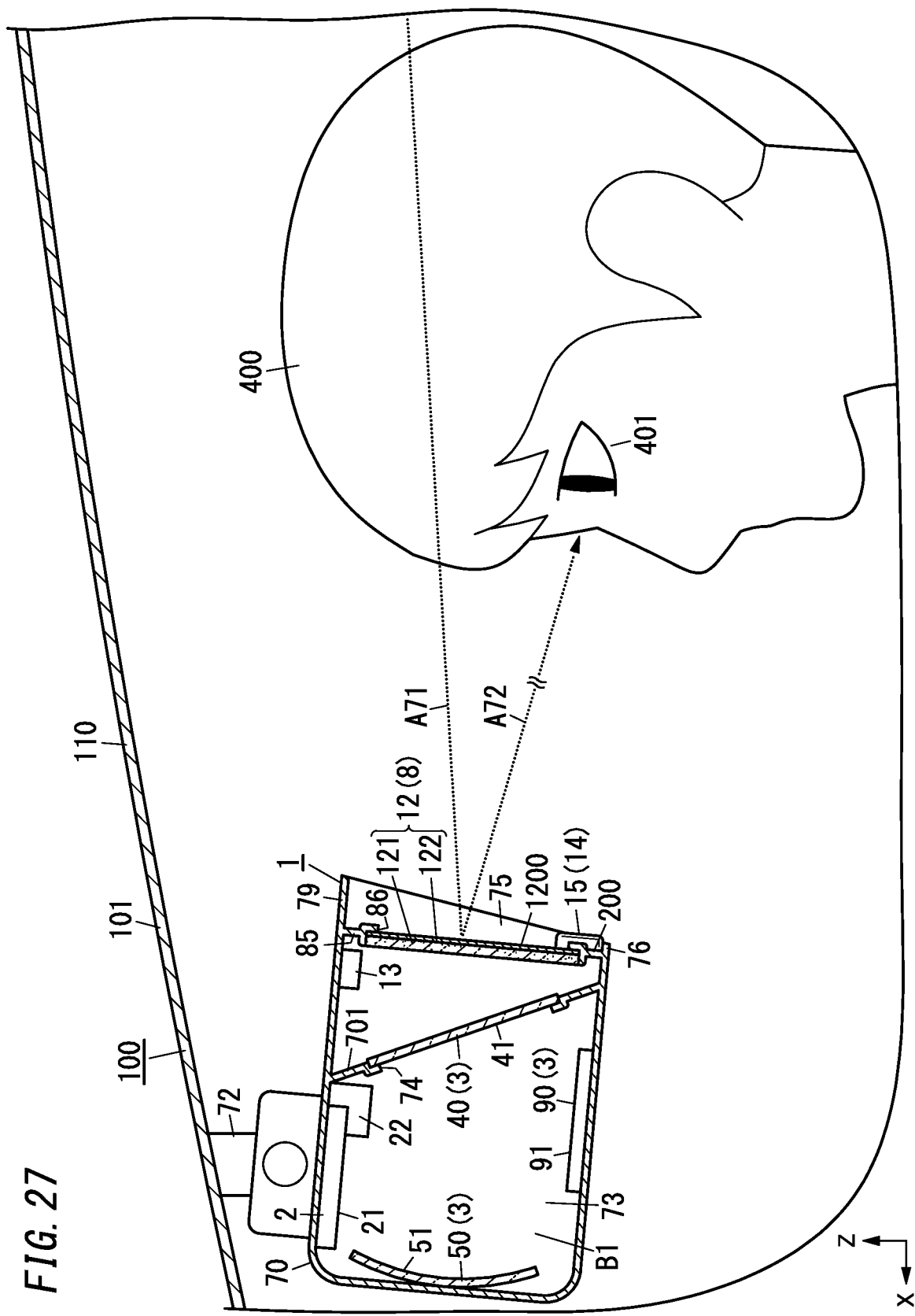
FIG. 27 schematically illustrates the display system in a situation where its liquid crystal mirror assumes a shielding state.

As shown in FIG. 26, the display system 1 according to this embodiment includes: the display device 2 with the display screen 21; two or more reflective members 3 including at least the half mirror 40 and the last reflective member 50; and the housing 70 holding the display device 2 and the two or more reflective members 3. In FIG. 26, the optical paths A41-A45 along which the light that has emerged from around the center of the display screen 21 of the display device 2 is transmitted through the half mirror 40 and the liquid crystal mirror 12 and then goes out of the housing 70 are indicated by the dotted lines. Note that in FIG. 26, the dotted lines indicating the optical paths A41-A45 are virtual lines shown on the drawing just for the sake of convenience.

As described above, the display system 1 includes the reflection optical system B1 including the half mirror 40. The light that has emerged from the display screen 21 of the display device 2 is incident on the last reflective member 50 via the half mirror 40. The light reflected from the last reflective member 50 is eventually incident on the viewer's 400 eyes 401 via the half mirror 40 to present an image (or video) to him or her. The last reflective member 50 may be implemented as a concave mirror.

The display system 1 further includes the shield member 8 (liquid crystal mirror 12) and a driving unit (driver circuit 13). The shield member 8 assumes either the shielding state in which the shield member 8 at least partially cuts off the light reflected from the last reflective member 50 or the unshielding state in which the shield member 8 cancels cutting off the light reflected from the last reflective member 50. The driving unit switches the state of the shield member 8 from the unshielding state to the shielding state according to the output of a detection sensor 14. The detection sensor 14 detects a situation in a predetermined detection area R1 (see FIG. 28).

In this embodiment, the driving unit (driver circuit 13) switches the state of the shield member 8 (liquid crystal mirror 12) from the unshielding state to the shielding state according to the situation in the detection area R1. This reduces the incidence of light on the concave mirror (i.e., the last reflective member 50). Thus, this reduces the chances of the light incident on the concave mirror being condensed by the concave mirror and focused as reflected light onto the detection area R1. Consequently, this reduces the chances of the object O1 (see FIG. 28) present in the detection area R1 being heated by the reflected light.

More specifically, the detection sensor 14 according to this embodiment includes an object sensor 15. The detection area R1 is an area through which the optical path of the light reflected from the last reflective member 50 passes. The object sensor 15 determines whether or not there is any object O1 in the detection area R1. When the object sensor 15 detects the presence of any object O1 in the detection area R1, the driving unit (driver circuit 13) switches the state of the shield member 8 (liquid crystal mirror 12) from the unshielding state to the shielding state. This further reduces the chances of the object O1 present in the detection area R1 being heated by the reflected light.

In the display system 1 according to this embodiment, the driving unit (driver circuit 13) switches the state of the shield member 8 (liquid crystal mirror 12) from the unshielding state to the shielding state according to the result of detection by the detection sensor 14, which is a major difference from the first embodiment described above. In the following description of the display system 1 according to the fourth embodiment, any constituent element of this fourth embodiment, having the same function as a counterpart of the first embodiment described above, will be designated by the same reference numeral as that counterpart's, and description thereof will be omitted herein.

As described above, the display system 1 according to this embodiment includes the display device 2, two or more reflective members 3, the housing 70, the shield member 8 (liquid crystal mirror 12), and the driving unit (driver circuit 13). The display system 1 further includes the display controller 22 and the detection sensor 14. The two or more reflective members 3 include not only the half mirror 40 and the last reflective member 50 but also an intermediate reflective member 90 as well. The intermediate reflective member 90 reflects, toward the half mirror 40, the light that has emerged from the display screen 21 of the display device 2.

The display system 1 according to this embodiment includes a liquid crystal mirror 12 as the shield member 8. The liquid crystal mirror 12 is arranged on the optical paths A44 and A45 of the light reflected from the last reflective member 50. The half mirror 40 is arranged between the liquid crystal mirror 12 serving as the shield member and the last reflective member 50. The transmittance of the light through the liquid crystal mirror 12 (shield member 8) varies according to the applied voltage (i.e., the output of the detection sensor 14). More specifically, in the liquid crystal mirror 12, at least the transmittance of visible light varies according to the applied voltage. That is to say, the liquid crystal mirror 12 may assume, depending on the applied voltage, either the shielding state in which the visible light such as the light reflected from the last reflective member 50 is partially cut off, or the unshielding state in which cutting off the visible light such as the light reflected from the last reflective member 50 is canceled. The shielding state is a state where the transmittance of visible light through the liquid crystal mirror 12 is relatively low. The unshielding state is a state where the transmittance of visible light through the liquid crystal mirror 12 is higher than in the shielding state. That is to say, the "shielding state" as used herein only needs to be a state where the transmittance of the incoming light is lower than in the unshielding state, and therefore, does not have to be a state where the incoming light is cut off totally. The driver circuit 13 may include a power supply circuit and a semiconductor integrated circuit (IC). The driver circuit 13 freely switches the state of the liquid crystal mirror 12 from the unshielding state to the shielding state, and vice versa, by controlling the voltage applied to the liquid crystal mirror 12. In this case, the shield member (liquid crystal mirror 12) is arranged such that when the shield member (liquid crystal mirror 12) assumes the shielding state, the half mirror 40 is located between the shield member (liquid crystal mirror 12) and the last reflective member 50.

Furthermore, when the liquid crystal mirror 12 assumes the shielding state, an outer surface 1200 of the liquid crystal mirror 12 (i.e., the surface facing the viewer 400) is a reflective surface (mirror surface) that reflects visible light. The outer surface 1200 faces away from the reflective surface 51 that is the reflective surface of the last reflective member 50.

The liquid crystal mirror 12 includes a liquid crystal layer 121 and a light diffusion layer 122. The liquid crystal layer 121 is a portion of which the transmittance varies according to the voltage applied by the driver circuit 13. More specifically, as the molecular alignment direction of the liquid crystal layer 121 varies with the applied voltage, the mode of operation of the liquid crystal layer 121 switches from transmission to cutoff, and vice versa. The light diffusion layer 122 is stacked on the liquid crystal layer 121. The light diffusion layer 122 is formed by adding scattering particles to a base material. Diffusion of light by the light diffusion layer 122 reduces reflection of an unwanted image on the liquid crystal mirror 12.

The light that has emerged from the display screen 21 of the display device 2 is reflected from the intermediate reflective member 90, from the half mirror 40, and then from the last reflective member 50. Part of the reflected light is transmitted through the half mirror 40 to impinge on the liquid crystal mirror 12.

When the liquid crystal mirror 12 is in the shielding state, most of the light reflected from the last reflective member 50 is either absorbed into, or reflected from (i.e., cut off by), the liquid crystal mirror 12, and therefore, the viewer 400 is unable to view, from outside of the housing 70, the image produced on the display screen 21. Also, as shown in FIG. 27, when the liquid crystal mirror 12 is in the shielding state, the outer surface 1200 (i.e., the surface facing the viewer 400) of the liquid crystal mirror 12 serves as a mirror surface. This allows the viewer 400 to monitor a rear view, produced on the liquid crystal mirror 12, from the automobile 100. That is to say, even if any error has occurred in the display operation by the display device 2, the display system 1 is also able to provide an alternative image as the mirror image produced on the liquid crystal mirror 12. In FIG. 27, the optical paths A71 and A72 of the external light coming from outside of the housing 70, incident on around the center of the liquid crystal mirror 12, and then reflected from the liquid crystal mirror 12 are indicated by the dotted lines. Note that in FIG. 27, the dotted lines indicating the optical paths A72 and A72 are virtual lines shown on the drawing just for the sake of convenience.

As shown in FIG. 26, when the liquid crystal mirror 12 is in the unshielding state, most of the light reflected from the last reflective member 50 is transmitted through the liquid crystal mirror 12, thus allowing the viewer 400 to view, from outside of the housing 70, the image produced on the display screen 21 (as indicated by the optical paths A41-A45).

Figure 28:
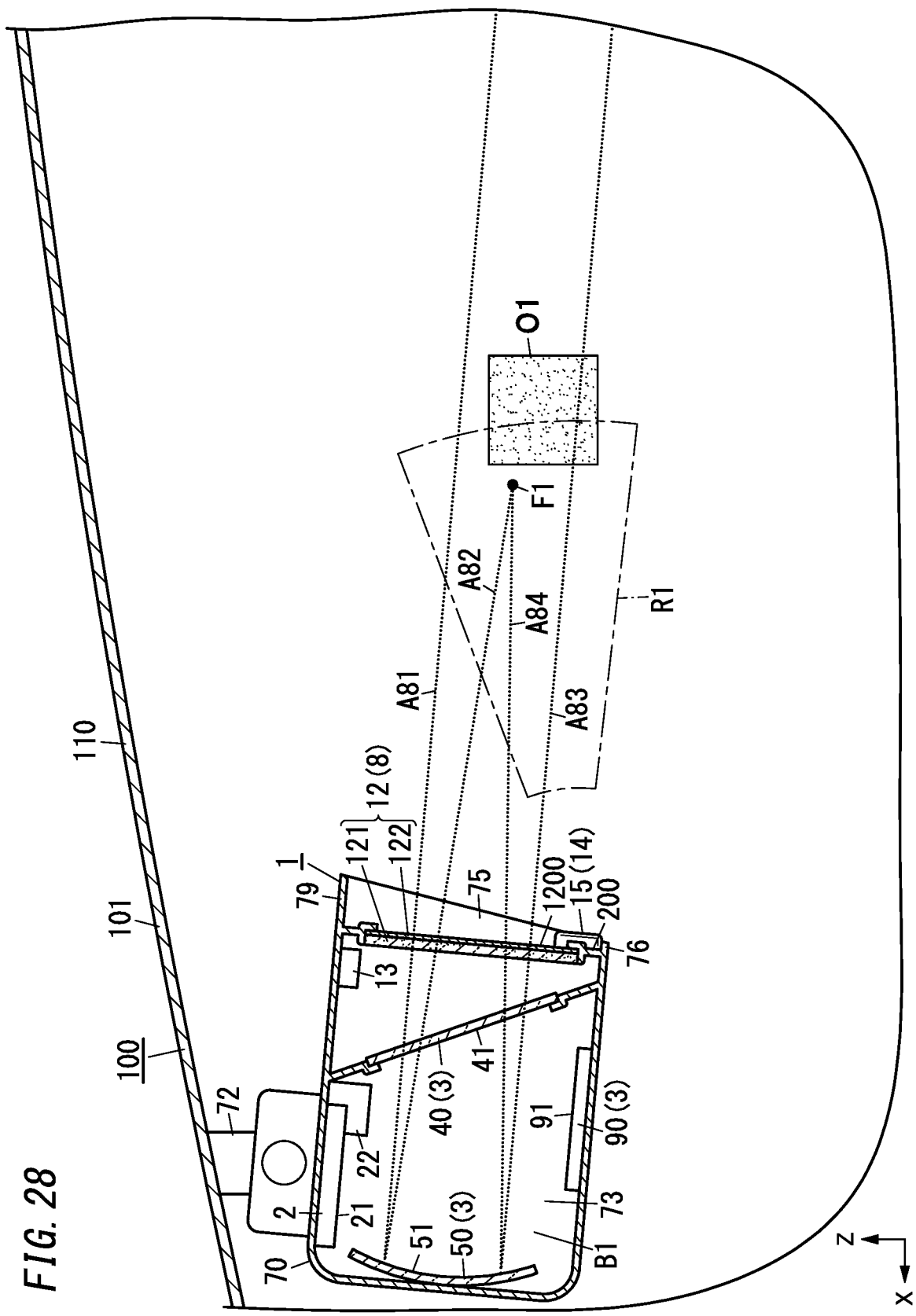
FIG. 28 schematically illustrates an exemplary optical path of external light in a situation where the liquid crystal mirror of the display system assumes an unshielding state.

Meanwhile, the detection sensor 14 detects a situation in the detection area R1 as shown in FIG. 28. The detection sensor 14 according to this embodiment includes an object sensor 15 for detecting the presence of any object O1 in the detection area R1. The object sensor 15 according to this embodiment is a proximity sensor. Examples of the object sensor 15 include an ultrasonic sensor, a capacitive proximity switch, and a post sensitive device (PSD). Specific examples of the objects O1 include the driver's or passenger's personal belongings, furniture such as curtains, decorative items such as character straps attached to the windshield, and body parts of humans or animals on board. Note that the object O1 is illustrated just schematically in FIG. 28 and does not represent its actual shape.

The object sensor 15 is held by the housing 70. More specifically, the object sensor 15 may be housed in the housing 70. However, this is only an example and should not be construed as limiting. Alternatively, the object sensor 15 may be arranged outside of the housing 70.

The detection area R1 is an area having a predetermined range and located behind the housing 70. The detection area R1 is an area covering the focal point F1 of the last reflective member 50. For example, when an ultrasonic sensor is used as the object sensor 15, the range of the detection area R1 may be limited by measuring the received signal strength indicator (RSSI). That is to say, when finding the received signal strength indicator of the ultrasonic sensor falling within a predetermined range, the driver circuit 13 may determine that some object O1 should be present in the detection area R1. The shortest distance from the center of the detection area R1 to the housing 70 may be about 10 centimeters. Also, the shortest distance from the center of the eye box (i.e., the location of the eyes 401 of the viewer 400 such as the driver of the automobile 100) to the housing 70 is longer than the shortest distance from the detection area R1 to the housing 70. The eye box is located outside of the detection area R1. The shortest distance from the center of the eye box to the housing 70 may be about 50 centimeters, for example.

The parallel light incident on the last reflective member 50 is focused toward the focal point F1. In FIG. 28, the two optical paths of the parallel light coming from outside of the housing 70 and incident on the last reflective member 50 are indicated by the dotted lines. One of the two optical paths includes optical paths A81 and A82 and the other optical path includes optical paths A83 and A84. Note that in FIG. 28, the dotted lines indicating the optical paths A81, A82, A83, and A84 are virtual lines shown on the drawing just for the sake of convenience.

External light (such as sunlight) may be incident on the last reflective member 50. In addition, the light reflected from the last reflective member 50 may be focused toward the focal point F1. Therefore, if any object O1 is present at or around the focal point F1, then the object O1 may be heated by the light reflected from the last reflective member 50. That is why the driver circuit 13 switches the state of the liquid crystal mirror 12 from the unshielding state to the shielding state according to the output of the detection sensor 14. More specifically, when the object sensor 15 of the detection sensor 14 detects the presence of any object O1 in the detection area R1, the driver circuit 13 switches the state of the liquid crystal mirror 12 from the unshielding state to the shielding state. This reduces the chances of the object O1 present in the detection area R1 being heated by the reflected light. Also, when the state of the liquid crystal mirror 12 is switched to the shielding state, the viewer 400 is able to view the reflected image produced by having the external light coming from outside of the housing 70 reflected from the outer surface 1200 of the liquid crystal mirror 12.

In some cases, an error may occur in the display operation performed by the display device 2. For example, no image may be produced on the display screen 21 due to a failure of the display device 2. In addition, when the display device 2 is supposed to display an image captured by the image capture device 4, the display device 2 may fail to perform the display operation normally due to either a failure of the image capture device 4 or a communication error occurring between the image capture device 4 and the display device 2. In this display system 1, when an error occurs in the display operation by the display device 2 due to a failure of the display device 2, for example, the state of the liquid crystal mirror 12 is switched from the unshielding state to the shielding state, thereby presenting, to the viewer 400, the reflected image produced by having the external light coming from outside of the housing 70 reflected from the outer surface 1200 of the liquid crystal mirror 12. In addition, according to this embodiment, the state of the liquid crystal mirror 12 is switched from the unshielding state to the shielding state, and the reflected image produced by having the external light coming from outside of the housing 70 (i.e., the light coming from behind the viewer 400) reflected from the outer surface 1200 of the liquid crystal mirror 12 is also presented to the viewer 400. Therefore, compared to a situation where the half mirror 40 is used instead of an optical mirror by adjusting the angle of the entire housing 70 without using the liquid crystal mirror 12, the tilt angle of the housing 70 may be reduced significantly. This reduces the chances of the viewer's 400 sight in front of him or her being obstructed by the housing 70. Thus, the display system 1 according to this embodiment is able to display an alternative image even when any error occurs in the display operation by the display device 2, and yet reduce a decline in the visibility of the front view. In addition, this embodiment also allows the state of the liquid crystal mirror 12 to be switched from the unshielding state to the shielding state even without tilting the housing 70.

In addition, when the automobile 100 is in a stopped state, the driver circuit 13 switches the state of the liquid crystal mirror 12 to the shielding state. As used herein, the "stopped state" refers to a state of the automobile 100 that has stopped performing traveling-related functions. More specifically, the stopped state refers herein to a state where no electricity is supplied to circuits that need to be activated to make the automobile 100 travel. For example, when the automobile 100 is a gas vehicle with an ignition coil, the stopped state refers herein to a state where no electricity is supplied to the ignition coil. In the first to third embodiments described above, when the automobile 100 is in the stopped state where the automobile 100 has stopped performing all traveling-related functions, the actuator 6 may displace the mirror member 60 or 60A to the second position and may switch the state of the mirror member 60 or 60A to the shielding state.

The housing 70 of the display system 1 has a middle wall 701. The middle wall 701 is inclined obliquely and has a through hole 74. The dimension of the through hole 74 as measured in the rightward/leftward direction (i.e., the direction perpendicular to the upward/downward direction and the forward/backward direction) is larger than its dimension as measured in the upward/downward direction. The ratio of its dimension as measured in the rightward/leftward direction (i.e., its longer-side dimension) to its dimension as measured in the upward/downward direction (i.e., its shorter-side dimension) may be approximately 3:1 to 6:1. The half mirror 40 is fitted into the through hole 74.

The housing 70 further has a rear wall 85. The rear wall 85 is provided behind the middle wall 701. The rear wall 85 extends in the upward/downward direction. The rear wall 85 has an opening 86, which allows the spaces in front of, and behind, the rear wall 85 of the housing 70 to communicate with each other. The dimension of the opening 86 as measured in the rightward/leftward direction (i.e., the direction perpendicular to the upward/downward direction and the forward/backward direction) is larger than its dimension as measured in the upward/downward direction. The ratio of its dimension as measured in the rightward/leftward direction (i.e., its longer-side dimension) to its dimension as measured in the upward/downward direction (i.e., its shorter-side dimension) may be approximately 3:1 to 6:1. The liquid crystal mirror 12 is fitted into the opening 86. In this case, the rear wall 85 and other walls of the housing 70 form the holding structure 200 for holding the liquid crystal mirror 12 as the shield member 8, no matter whether the housing 70 is in the unshielding state or the shielding state.

In addition, the housing 70 further includes, as its integral parts, lateral hood parts 75 protruding backward from the right and left side edges of the rear wall 85, and a lower hood part 76 protruding backward from the lower side edge of the rear wall 85. That is to say, the housing 70 includes the lateral hood parts 75 and the lower hood part 76. In this case, the lateral hood parts 75 and the lower hood part 76 form respective parts of a single integral hood. The housing 70 further includes an upper hood part 79 protruding backward from the upper side edge of the rear wall 85.

The display system 1 according to this embodiment includes, as two or more reflective members 3 for reflecting the light that has emerged from the display screen 21 of the display device 2, the half mirror 40, the last reflective member 50, and the intermediate reflective member 90. In other words, the display system 1 includes the reflection optical system B1 constituted of the half mirror 40, the last reflective member 50, and the intermediate reflective member 90.

The half mirror 40 is fitted into the through hole 74 cut through the middle wall 701 of the housing 70. The half mirror 40 has a light-transmitting property. That is to say, the half mirror 40 has the capability of transmitting a part of the incoming light and reflecting almost the rest of the incoming light. In this embodiment, the half mirror 40 is implemented as a beam splitter in a flat plate shape having an optical transmittance of approximately 50% and an optical reflectance of approximately 50%. The half mirror 40 is arranged obliquely with respect to the upward/downward direction such that the lower end of the half mirror 40 protrudes backward with respect to the upper end of the half mirror 40.

The surface, facing the last reflective member 50 (hereinafter referred to as the "inner surface"), of the half mirror 40 faces the display screen 21 of the display device 2 and the reflective surface 51 of the last reflective member 50. In this embodiment, the half mirror 40 is arranged such that a normal to the inner surface 41 thereof intersects obliquely with the direction in which the light that has emerged from the display screen 21 of the display device 2 is incident on the half mirror 40 and with the direction in which the light reflected from the reflective surface 51 is incident on the half mirror 40. In this embodiment, the inner surface 41 that is the reflective surface, from which the light that has come from the display device 2 is reflected, is a flat surface. However, this is only an example and should not be construed as limiting. The inner surface 41 may also be a curved surface such as a free-form surface. Forming the inner surface 41 of the half mirror 40 as a free-form surface allows the distortion of the image produced on the reflective surface 51 to be reduced, the curvature of the image plane to be reduced, and the resolution to be increased.

The last reflective member 50 may be configured as a concave mirror, for example. The reflective surface 51 of the last reflective member 50 may be formed by evaporating a reflective metal film of aluminum, for example, on the surface of glass. The last reflective member 50 is arranged in a front region of the chamber 73 with the reflective surface 51 facing backward. In other words, the last reflective member 50 is arranged inside the chamber 73 so as to face the inner surface 41 of the half mirror 40.

In this embodiment, the inner surface 41 of the half mirror 40 reflects a part of the light that has emerged from the display screen 21 of the display device 2 toward the reflective surface 51 of the last reflective member 50. The reflective surface 51 of the last reflective member 50 further reflects, toward the half mirror 40, the light that has been reflected from the inner surface 41 of the half mirror 40. The half mirror 40 transmits a part of the light coming from the last reflective member 50 and the light transmitted through the half mirror 40 is eventually incident on the viewer's 400 eyes 401. This allows the viewer 400 to view an image based on the image produced on the display screen 21 of the display device 2.

Next, it will be described how the display system 1 according to this embodiment and the electronic mirror system 5 including the display system 1 operate. Note that the state of the liquid crystal mirror 12 is supposed to have been switched to the unshielding state where cutting off the light reflected from the last reflective member 50 is canceled.

For example, when receiving a control signal, instructing the electronic mirror system 5 to start operating, from an electronic control unit (ECU) of the automobile 100 while receiving power supplied from a battery of the automobile 100, the electronic mirror system 5 starts operating.

For example, when receiving a control signal that instructs the display controller 22 to start operating from the ECU of the automobile 100, the display controller 22 makes the image capture device 4 to capture an image representing a rear view from the automobile 100 at a predetermined frame rate, thus acquiring the image data of the image captured from the image capture device 4.

On receiving the image data of the captured image from the image capture device 4, the display controller 22 generates an image based on the captured image and has the generated image produced on the display screen 21 of the display device 2.

When the image is produced on the display screen 21 of the display device 2, the light forming the image travels in the direction parallel to the optical path A11 toward the reflective surface 91 of the intermediate reflective member 90. The light reflected from the intermediate reflective member 90 is directed toward the inner surface 41 of the half mirror 40. The half mirror 40 is a beam splitter. The inner surface 41 of the half mirror 40 reflects part of the light reflected from the intermediate reflective member 90 toward the reflective surface 51 of the last reflective member 50. The reflective surface 51 is a concave mirror, which reflects, toward the inner surface 41 of the half mirror 40, light forming a magnified image by magnifying the image produced on the display screen 21. When the light reflected from the reflective surface 51 of the last reflective member 50 is incident on the inner surface 41 of the half mirror 40, part of the incident light is transmitted through the half mirror 40 and the liquid crystal mirror 12 to leave the housing 70. This allows the viewer 400 to view the image magnified by the reflective surface 51. Thus, the viewer 400 is able to monitor the rear view from the automobile 100 by viewing, through the half mirror 40 and the liquid crystal mirror 12, the image magnified by the reflective surface 51.

Also, when the object sensor 15 of the detection sensor 14 detects the presence of any object O1 in the detection area R1, the driver circuit 13 switches the state of the liquid crystal mirror 12 from the unshielding state to the shielding state. This reduces the chances of the object O1 present in the detection area R1 being heated by the reflected light. In addition, this also allows, when the state of the liquid crystal mirror 12 is switched to the shielding state, the reflected image, produced by having the external light coming from outside of the housing 70 reflected from the outer surface 1200 of the liquid crystal mirror 12, to be presented to the viewer 400.

Thereafter, when the object sensor 15 of the detection sensor 14 no longer detects the presence of any object O1 in the detection area R1, the driver circuit 13 switches the state of the liquid crystal mirror 12 from the shielding state to the unshielding state.

Optionally, when a predetermined amount of time passes since the object sensor 15 of the detection sensor 14 detected the presence of any object O1 in the detection area R1 for the last time, the driver circuit 13 may switch the state of the liquid crystal mirror 12 from the shielding state to the unshielding state.

(4) Variation of Fourth Embodiment

A variation of the fourth embodiment will be described with reference to FIG. 29.

In a display system 1 according to this variation, when a predetermined condition on external light is satisfied, the driver circuit (driving unit) 13 stops switching the state of the shield member 8 (such as the liquid crystal mirror 12) according to the output of the detection sensor 14.

In this case, the predetermined condition is a condition on external light coming from outside of, and incident on, the display system 1. The external light coming from outside of, and incident on, the display system 1 includes natural light such as sunlight coming from outside of the automobile 100 equipped with the display system 1. For example, if the sunlight directly incident on the last reflective member 50 is reflected from the last reflective member 50 and focused around the focal point F1 of the last reflective member 50, then an object O1 present around the focal point F1 is heated by the sunlight focused around the focal point F1. When the quantity of the external light incident on the last reflective member 50 exceeds a permissible range, then the object O1 present around the focal point F1 could be heated abnormally. Thus, once the quantity of the external light incident on the last reflective member 50 exceeds the permissible range in the unshielding state, the shield member 8 is suitably switched to the shielding state according to the output of the detection sensor 14. On the other hand, as long as the quantity of the external light incident on the last reflective member 50 falls within the permissible range, the shield member 8 does not have to be switched to the shielding state according to the output of the detection sensor 14.

The predetermined condition may be, for example, that the quantity of the external light incident on the last reflective member 50 in the unshielding state should fall within a predetermined permissible range. When the predetermined condition is satisfied, the driver circuit (driving unit) 13 stops switching the state of the shield member 8 (such as the liquid crystal mirror 12) according to the output of the detection sensor 14, thus allowing the shield member 8 to keep the current state (i.e., the unshielding state). In this variation, instead of directly measuring the quantity of the external light incident on the last reflective member 50, the driver circuit 13 indirectly determines, based on at least one of time information about time or vehicle information about the automobile 100, whether or not the quantity of the external light incident on the last reflective member 50 falls within the permissible range.

In this fourth embodiment, the display system 1 is mounted on the automobile 100. As shown in FIG. 28, the detection sensor 14 includes the object sensor 15 for determining whether or not there is any object O1 in the detection area R1. The optical path of the light reflected from the last reflective member 50 passes through the detection area R1. In this variation, the predetermined condition is a condition based on at least one of time information about time or vehicle information about the automobile 100.

The time information includes at least information about the current time. Optionally, the time information may include not only the information about the current time but also information about the current date and season, for example. This time information is acquired from the ECU that the automobile 100 includes or the global positioning system (GPS), for example.

The vehicle information may include rainfall related information about a rainfall at the location where the automobile 100 is currently present. The rainfall related information may include, for example, at least one of: measurement information collected by a raindrop sensor provided for the automobile 100 to detect any rainfall; measurement information collected by a temperature/humidity sensor to measure the temperature and the humidity; or information indicating the operating conditions of the wipers of the automobile 100.

The vehicle information may also include current location information (such as latitude, longitude, and altitude information) indicating the automobile's 100 current location measured by a positioning system such as the GPS. The vehicle information may include location information indicating where the automobile 100 is currently present (i.e., either traveling or at a stop) and obtained based on the current location information of the automobile 100 and map information. The vehicle information may also include traveling direction information about either the traveling direction measured by an azimuth sensor provided for the automobile 100, for example, or the traveling direction estimated based on the history of the current location information.

The vehicle information may further include, for example, tilt angle information about the results of measurement made by a tilt angle sensor provided for the automobile 100 to measure the tilt angle of the automobile 100. As used herein, the "tilt angle" of the automobile 100 includes at least a pitch angle defined by the longitudinal axis of the automobile 100 with respect to the horizontal plane. The sign of the pitch angle is determined to be positive when the front-end portion of the automobile 100 is tilted upward, and to be negative when the front-end portion of the automobile 100 is tilted downward.

The vehicle information may further include lighting information indicating whether lights, such as headlights and clearance lamps, provided for the automobile 100 are ON or OFF.

In this case, the predetermined condition may be, for example, that it should be nighttime when there is much less external light than in the daytime. That is to say, if the condition that it should be nighttime is satisfied, then the condition that the quantity of light incident on the last reflective member 50 should fall within the permissible range is also satisfied. Thus, the driver circuit 13 determines, by seeing if it is nighttime, whether or not the quantity of the external light incident on the last reflective member 50 falls within the permissible range. On finding that it is nighttime, the driver circuit 13 stops switching the state of the liquid crystal mirror 12 according to the output of the object sensor 15. Specifically, if the condition that the current time according to the time information should fall within the nighttime hours that begin at the sunset time and end at the sunrise time is satisfied, the driver circuit 13 stops switching the state of the liquid crystal mirror 12 according to the output of the object sensor 15. In this case, the sunset time and the sunrise time may be fixed times. Alternatively, the driver circuit 13 may set the sunset and sunrise times in accordance with information about the current day or season included in the time information. Still alternatively, the driver circuit 13 may also set the sunset and sunrise times in accordance with not only information about the current day or season included in the time information but also information about the latitude, longitude, and altitude of the current location indicated by the current location information. Optionally, when finding, in accordance with the lighting information included in the vehicle information, at least one of the headlights or the clearance lamps ON, the driver circuit 13 may determine that it should be nighttime and may stop switching the state of the liquid crystal mirror 12 according to the output of the object sensor 15.

Alternatively, the predetermined condition may also be that it should be raining when there is much less external light than when it is fine or cloudy. That is to say, if the condition that it should be raining is satisfied, then the condition that the quantity of external light incident on the last reflective member 50 should fall within the permissible range is also satisfied. Thus, the driver circuit 13 determines, by seeing if it is raining, whether or not the quantity of the external light incident on the last reflective member 50 falls within the permissible range. On finding that it is raining, the driver circuit 13 stops switching the state of the liquid crystal mirror 12 according to the output of the object sensor 15. Specifically, when determining, based on the rainfall related information included in the vehicle information, that it should be raining, the driver circuit 13 stops switching the state of the liquid crystal mirror 12 according to the output of the object sensor 15.

Still alternatively, the predetermined condition may also be that the automobile 100 should be currently located in a place that the sunlight does not reach (such as in a tunnel or an underground parking lot). That is to say, if the condition that the automobile 100 should be currently located in a place that the sunlight does not reach is satisfied, then the condition that the quantity of external light incident on the last reflective member 50 should fall within the permissible range is also satisfied. Thus, the driver circuit 13 determines, by seeing if the automobile 100 is currently out of the sunlight's reach, whether or not the quantity of the external light incident on the last reflective member 50 falls within the permissible range. Specifically, when determining, based on the current location information included in the vehicle information and the map information, that the automobile 100 should currently be out of the sunlight's reach, the driver circuit 13 stops switching the state of the liquid crystal mirror 12 according to the output of the object sensor 15.

Yet alternatively, the predetermined condition may also be that the altitude (elevation angle) of the sun should be greater than the maximum value of the altitude at or under which the sunlight is able to be directly incident on the last reflective member 50 (this maximum value will be hereinafter referred to as a "reference angle"). If the altitude (elevation angle) of the sun is greater than the reference angle, even the sunlight coming in through the windows of the automobile 100 is much less likely to be incident on the last reflective member 50. That is why if the condition that the altitude of the sun should be greater than the reference angle is satisfied, then the quantity of the external light incident on the last reflective member 50 should also fall within the permissible range. Thus, the driver circuit 13 determines, by seeing if the sun's altitude is greater than the reference angle, whether or not the quantity of the external light incident on the last reflective member 50 falls within the permissible range. Specifically, the driver circuit 13 estimates the altitude of the sun based on the time information (i.e., information about the current time and day) and the current location information (i.e., the latitude and longitude of the current location), and when finding the sun's estimated altitude to be greater than the reference angle, stops switching the state of the liquid crystal mirror 12 according to the output of the object sensor 15. In this case, the predetermined condition may also take, into account, the tilt angle (such as a pitch angle) of the automobile 100. That is to say, in that case, when finding the sum of the sun's estimated altitude (elevation angle) and the pitch angle of the automobile 100 greater than the reference angle, the driver circuit 13 may stop switching the state of the liquid crystal mirror 12 according to the output of the object sensor 15.

Yet alternatively, the predetermined condition may also be that the automobile's 100 orientation (which may be defined by the automobile's 100 traveling direction or tilt angle) does not allow external light (such as sunlight) coming from outside of the automobile 100 to be incident easily onto the last reflective member 50. In other words, the predetermined condition may be that the sun should be located outside of the range viewable through the automobile's 100 windows (rear or side windows) from the position of the last reflective member 50. If the sun is located outside of the range viewable through the automobile's 100 windows from the position of the last reflective member 50, then the quantity of the external light incident on the last reflective member 50 should also fall within the permissible range. Thus, the driver circuit 13 determines, by seeing if the automobile's 100 orientation does not allow external light coming from outside of the automobile 100 to be incident easily onto the last reflective member 50, whether or not the quantity of the external light incident on the last reflective member 50 falls within the permissible range. Specifically, when finding, based on the traveling direction information included in the vehicle information, the automobile 100 facing south (i.e., facing toward the sun), the driver circuit 13 determines that the automobile's 100 orientation should not allow the external light to be easily incident on the last reflective member 50. Also, when finding, according to the result of estimation of the sun's azimuth angle based on the time information and the current location information and the traveling direction information, the automobile 100 facing toward the sun, the driver circuit 13 may determine that the automobile 100 should currently have an orientation that does not allow natural light to easily enter the last reflective member 50.

Optionally, the driver circuit 13 may determine, based on the tilt angle information included in the vehicle information, whether or not the automobile 100 currently has such an orientation that does not allow the sunlight to be easily incident on the last reflective member 50. For example, if the automobile 100 is going uphill, then the front-end portion of the automobile 100 tilts upward, thus making it less easy for the sunlight to be incident on the last reflective member 50. On the other hand, if the automobile 100 is going downhill, then the front-end portion of the automobile 100 tilts downward, thus making it easier for the sunlight to be incident on the last reflective member 50. Therefore, when finding, based on the tilt angle information (pitch angle information) included in the vehicle information, the pitch angle greater than a predetermined decision angle (such as zero degrees), the driver circuit 13 determines that the automobile 100's current orientation should not allow the sunlight to be easily incident on the last reflective member 50.

Next, it will be described with reference to FIG. 29 exactly how the driver circuit 13 stops, when the predetermined condition on the external light is satisfied, switching the state of the shield member 8 (such as the liquid crystal mirror 12) according to the output of the detection sensor 14.

The driver circuit 13 determines, at a predetermined timing (e.g., every time a predetermined amount of decision time passes), whether or not the predetermined condition is satisfied (in Step S1). This predetermined condition includes at least one of the plurality of conditions enumerated above.

When finding the predetermined condition not satisfied in Step S1 (i.e., if the answer is NO in Step S1), the driver circuit 13 determines whether or not the object sensor 15 has detected the presence of any object O1 in the detection area R1 (in Step S2).

If the object sensor 15 has detected no objects O1 in Step S2 (if the answer is NO in Step S2), then the driver circuit 13 maintains the current state of the liquid crystal mirror 12 as it is (in Step S4). This allows the current state (which may be either the unshielding state or the shielding state) to be maintained according to the viewer's 400 preference.

On the other hand, if the object sensor 15 has detected any object O1 in Step S2 (i.e., if the answer is YES in Step S2), then the driver circuit 13 switches the state of the liquid crystal mirror 12 to the shielding state (in Step S5). In the shielding state, the viewer 400 is able to view the reflected image produced on the reflective surface of the liquid crystal mirror 12. In addition, controlling the liquid crystal mirror 12 to the shielding state reduces the chances of the external light being incident on the last reflective member 50.

On the other hand, when finding the predetermined condition satisfied in Step S1 (if the answer is YES in Step S1), the driver circuit 13 may ignore the output of the object sensor 15, for example, to stop switching the state of the shield member 8 (liquid crystal mirror 12) according to the output of the object sensor 15 (in Step S3). This allows the display system 1 to keep the current state of the shield member 8 (such as the unshielding state), thus reducing the chances of the state of the shield member 8 being switched unintentionally due to detection errors by the object sensor 15. In addition, when the predetermined condition is satisfied, the driver circuit 13 stops switching the state of the shield member 8 (liquid crystal mirror 12), thus allowing the state (which may be either the unshielding state or the shielding state) to be maintained according to the viewer's 400 preference.

The driver circuit 13 repeatedly performs this series of processing steps S1 to S5 over and over again. When the predetermined condition is satisfied, the driver circuit 13 may stop automatically switching the state of the shield member 8 (liquid crystal mirror 12) according to the output of the object sensor 15.

Figure 29:
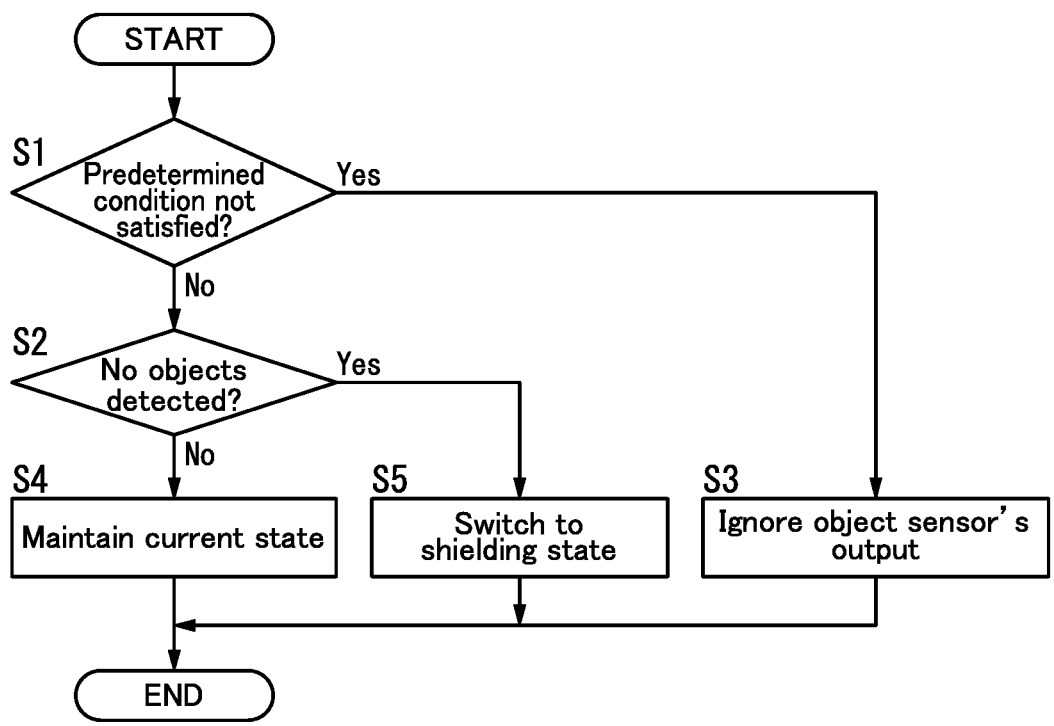
FIG. 29 is a flowchart showing a procedure in which the display system operates.

Note that the flowchart shown in FIG. 29 shows just an exemplary method for the display system 1 according to this variation to switch the state of the shield member 8 based on the predetermined condition. If necessary, the order of the processing steps may be changed as appropriate, any additional processing step may be performed, or any processing step may be omitted as needed.

According to the flowchart shown in FIG. 29, the current state of the liquid crystal mirror 12 is maintained in Step S4. However, this is only an example and should not be construed as limiting. Alternatively, the liquid crystal mirror 12 may be switched to the unshielding state in Step S4.

Optionally, when the state of the liquid crystal mirror 12 is switched to the shielding state, the display controller 22 may instruct the display device 2 to suspend the display operation. This cuts down the power consumption of the display system 1.

Note that the configuration described for the fourth embodiment (including its variations) may be adopted in combination as appropriate with any of the configurations described for the first, second, and third embodiments (including their variations). That is to say, in the first, second, or third embodiment, the control circuit 7 may drive the actuator 6 based on the result of detection by the detection sensor 14 (object sensor 15) to switch the state of the shield member 8 to either the unshielding state or shielding state.

Fifth Embodiment

A fifth embodiment of the display system 1 will be described with reference to FIG. 30.

In the display system 1 according to the fifth embodiment, the detection sensor 14 includes a light quantity sensor 16 instead of the object sensor 15, which is a major difference from the fourth embodiment described above. In the other respects, the fifth embodiment has the same configuration as the fourth embodiment described above. Thus, in the following description, any constituent element of this fifth embodiment, having the same function as a counterpart of the fourth embodiment described above, will be designated by the same reference numeral as that counterpart's, and description thereof will be omitted herein.

Figure 30:
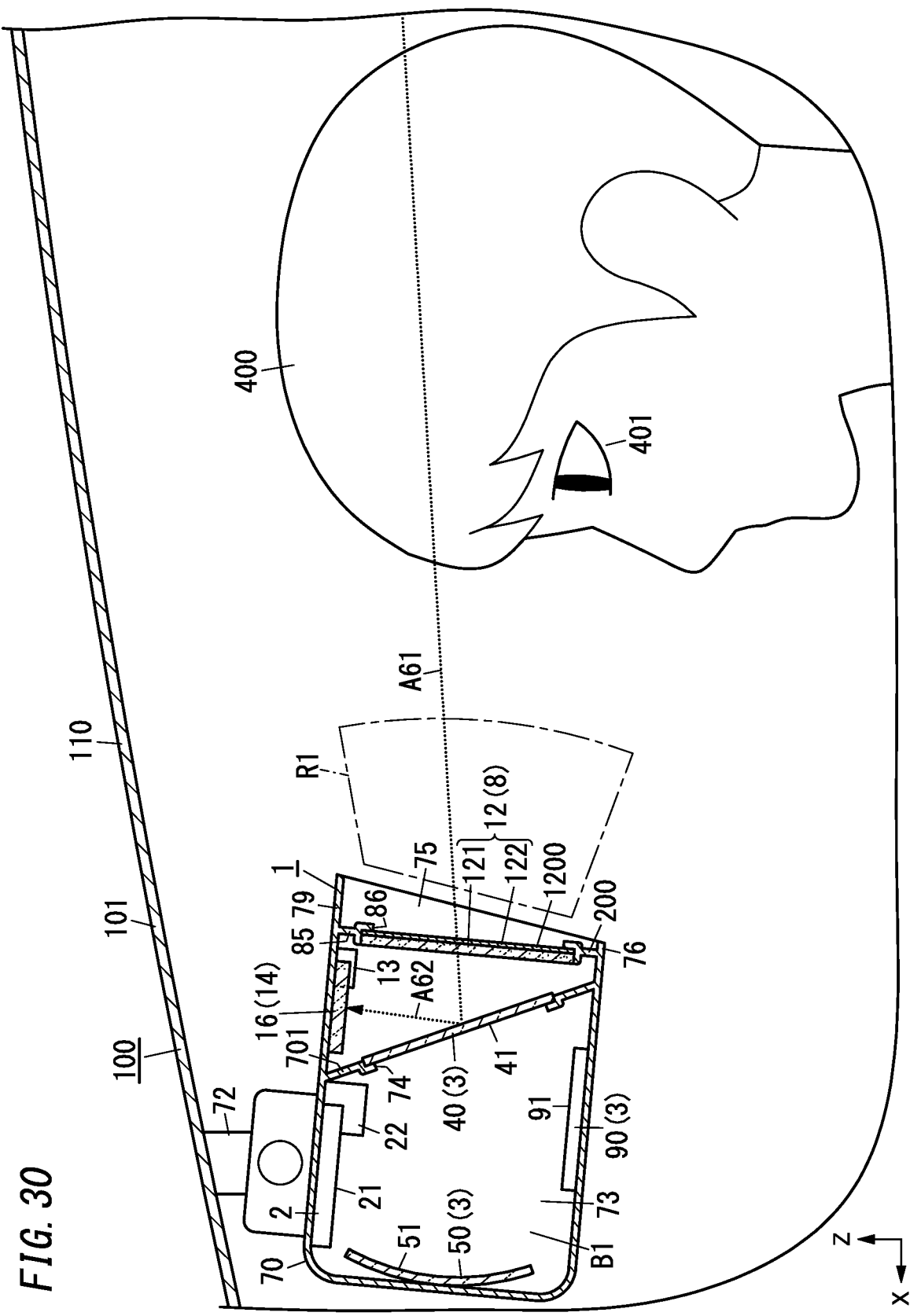
FIG. 30 schematically illustrates a display system according to a fifth embodiment of the present disclosure in a situation where its liquid crystal mirror assumes an unshielding state.

In FIG. 30, the optical paths A61 and A62 along which the external light incident onto around the center of the liquid crystal mirror 12 from outside of the housing 70 is reflected from the liquid crystal mirror 12 and then incident on the light quantity sensor 16 are indicated by the dotted lines. Note that in FIG. 30, the dotted lines indicating the optical paths A61 and A62 are virtual lines shown on the drawing just for the sake of convenience.

The light quantity sensor 16 detects, as a situation in the detection area R1, the quantity of at least part of the external light coming in from the detection area R1. In this embodiment, the light quantity sensor 16 detects the quantity of the external light passing through the detection area R1 to impinge on the light quantity sensor 16. In this embodiment, the light quantity sensor 16 is housed in the housing 70. Specifically, the light quantity sensor 16 is arranged on the ceiling of the housing 70 inside the housing 70. This allows the light quantity sensor 16 to detect the quantity of at least part of the external light coming into the housing 70 from the detection area R1. The light quantity sensor 16 is suitably able to detect at least light with the same wavelength as the sunlight. The light quantity sensor 16 may be implemented as a solar panel, for example. The solar panel generates electricity corresponding to the quantity of light received. The electricity generated by the solar panel is output to the driver circuit 13. In this embodiment, the detection area R1 may be different from the detection area R1 according to the first embodiment. The detection area R1 according to this embodiment may be an area through which the optical path of the light reflected from the last reflective member 50 does not pass. Optionally, the light quantity sensor 16 may be arranged on the bottom surface of the housing 70 inside the housing 70. That is to say, the light quantity sensor 16 may be arranged on either the lower or upper internal surface of the housing 70.

The driver circuit 13 switches, according to the output of the light quantity sensor 16, the state of the liquid crystal mirror 12 from the unshielding state to the shielding state. For example, if the quantity of light according to the output of the light quantity sensor 16 is greater than a predetermined value, the driver circuit 13 switches the state of the liquid crystal mirror 12 from the unshielding state to the shielding state. This predetermined value may be set at a value lower than the measured value of the light quantity sensor 16 when an increase in the temperature of the object O1 present around the focal point F1, toward which the light reflected from the last reflective member 50 is focused, has a predetermined upper limit value. This reduces, even when the object O1 is present in the detection area R1, the chances of the object O1 being heated by the light reflected from the last reflective member 50. Also, when the quantity of light according to the output of the light quantity sensor 16 is equal to or less than the predetermined value and the liquid crystal mirror 12 assumes the unshielding state, the quantity of light in the detection area R1 is relatively small. Thus, in such a situation, even when any object O1 is present in the detection area R1, the chances of the object O1 being heated are relatively low. Consequently, the chances of the object O1 being heated are reducible, no matter whether the liquid crystal mirror 12 assumes the unshielding state or the shielding state. That is to say, this fifth embodiment achieves the same advantages as the fourth embodiment described above.

In addition, when a predetermined amount of time passes since the state of the liquid crystal mirror 12 was switched from the unshielding state to the shielding state, the driver circuit 13 switches the state of the liquid crystal mirror 12 from the shielding state to the unshielding state. This allows the display system 1 to automatically recover the capability as an electronic mirror.

The light quantity sensor 16 may be implemented as a photodiode, a phototransistor, or a photoresistor, for example.

Optionally, the detection sensor 14 may include not only the light quantity sensor 16 but also the object sensor 15 as well. The driver circuit 13 may switch, according to both the output of the light quantity sensor 16 and the output of the object sensor 15, the state of the liquid crystal mirror 12 from the unshielding state to the shielding state, and vice versa. For example, when the quantity of light according to the output of the light quantity sensor 16 is greater than a predetermined value and it is determined, according to the output of the object sensor 15, that an object O1 should be present in the detection area R1, the driver circuit 13 may switch the state of the liquid crystal mirror 12 from the unshielding state to the shielding state. Thus, in a situation where the quantity of light is equal to or less than the predetermined value, even when a determination is made that an object O1 should be present in the detection area R1, the driver circuit 13 does not switch the state of the liquid crystal mirror 12 to the shielding state. This increases the chances of the viewer 400 viewing an image magnified by the reflective surface 51.

Also, when finding the quantity of light according to the output of the light quantity sensor 16 greater than a first value (predetermined value), the driver circuit 13 switches the state of the liquid crystal mirror 12 from the unshielding state to the shielding state. Thereafter, when a predetermined amount of time passes, the reflectance of the liquid crystal mirror 12 may be changed, only for a predetermined short period of time, into an intermediate reflectance between the reflectance in the unshielding state and the reflectance in the shielding state. The predetermined period needs to be at least equal to or longer than a minimum required period for the light quantity sensor 16 to detect the quantity of light and is suitably as short as possible. If the quantity of light detected by the light quantity sensor 16 after the reflectance has been changed into the intermediate reflectance is greater than a second value, then the quantity of light in the detection area R1 is still significant. Thus, in such a situation, the driver circuit 13 may change the reflectance of the liquid crystal mirror 12 into the reflectance in the shielding state again. That is to say, at that time, the driver circuit 13 switches the state of the liquid crystal mirror 12 to the shielding state. After that, every time a predetermined amount of time passes, the driver circuit 13 may set the reflectance of the liquid crystal mirror 12 at the intermediate reflectance only for the predetermined short period of time, until the quantity of light detected by the light quantity sensor 16 becomes equal to or less than the second value. On the other hand, when finding the quantity of light detected by the light quantity sensor 16 equal to or less than the second value after the reflectance has been changed into the intermediate reflectance, the driver circuit 13 may switch the state of the liquid crystal mirror 12 to the unshielding state. The second value may be smaller than the first value, for example. This configuration allows the state of the liquid crystal mirror 12 to be automatically switched from the shielding state to the unshielding state when the quantity of light decreases in the detection area R1.

(5) Variations of Fifth Embodiment

(5.1) First Variation

A first variation of the display system 1 according to the fifth embodiment will be described with reference to FIG. 31.

Figure 31:
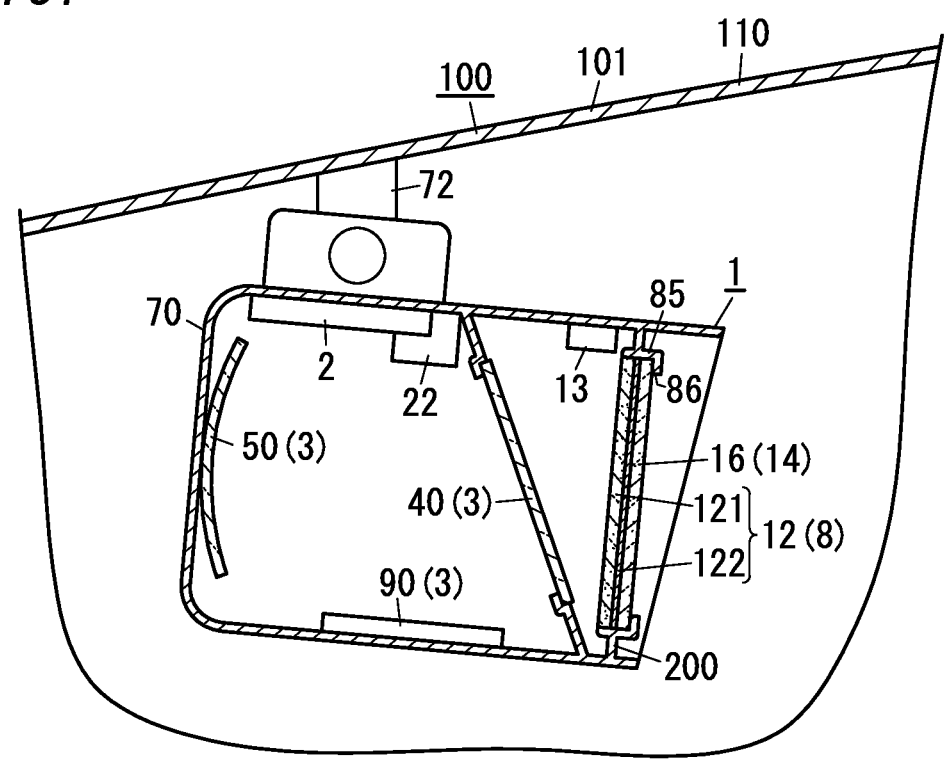
FIG. 31 schematically illustrates a display system according to a first variation of the fifth embodiment.

In the display system 1 according to this first variation, the light quantity sensor 16 is arranged on the outer surface of the liquid crystal mirror 12 as shown in FIG. 31, which is a major difference from the fifth embodiment described above. In the other respects, the first variation has the same configuration as the fifth embodiment described above. Thus, in the following description, any constituent element of this first variation, having the same function as a counterpart of the fifth embodiment described above, will be designated by the same reference numeral as that counterpart's, and description thereof will be omitted herein.

The light quantity sensor 16 has a light transmitting property. The light quantity sensor 16 may be implemented as a dye-sensitized solar panel, for example. The light quantity sensor 16 is stacked on the liquid crystal mirror 12. The light quantity sensor 16 is arranged on the surface of the liquid crystal mirror 12 serving as a shield member. More specifically, the light quantity sensor 16 is arranged to cover the back surface of the liquid crystal mirror 12. When the liquid crystal mirror 12 assumes the unshielding state, the light that has emerged from the display device 2 and then reflected from the last reflective member 50 is transmitted through the liquid crystal mirror 12 and the light quantity sensor 16 to go out of the housing 70. Note that the light quantity sensor 16 does not have to cover the liquid crystal mirror 12 entirely but may cover the liquid crystal mirror 12 only partially. The light quantity sensor 16 and the liquid crystal mirror 12 are fitted into the opening 86 of the rear wall 85.

In the fifth embodiment described above, when the liquid crystal mirror 12 assumes the shielding state, the external light coming from outside of the housing 70 does not reach the light quantity sensor 16. In contrast, in this first variation, the external light coming from outside of the housing 70 always reaches the light quantity sensor 16, no matter whether the liquid crystal mirror 12 assumes the shielding state or unshielding state.

When finding the quantity of light according to the output of the light quantity sensor 16 greater than a first threshold value, the driver circuit 13 switches the state of the liquid crystal mirror 12 from the unshielding state to the shielding state. Thereafter, when finding the quantity of light according to the output of the light quantity sensor 16 less than a second threshold value, the driver circuit 13 switches the state of the liquid crystal mirror 12 from the shielding state to the unshielding state. That is to say, according to this first variation, the state of the liquid crystal mirror 12 may be switched from the shielding state to the unshielding state according to the output of the light quantity sensor 16.

The second threshold value may be the same as, or smaller than, the first threshold value. If the quantity of light is in the vicinity of the first threshold value and the second threshold value is the same as the first threshold value, then a so-called "chattering" phenomenon will occur that the state of the liquid crystal mirror 12 switches frequently from the shielding state to the unshielding state, and vice versa. This chattering phenomenon is reducible by setting the second threshold value at a value smaller than the first threshold value.

In addition, since the light quantity sensor 16 overlaps at least partially with the liquid crystal mirror 12, it is easy to secure an installation space for the light quantity sensor 16. However, the light quantity sensor 16 does not have to overlap at least partially with the liquid crystal mirror 12. Alternatively, the light quantity sensor 16 may be arranged at an arbitrary position behind the liquid crystal mirror 12 (i.e., in the negative X-axis direction). The light quantity sensor 16 may be implemented as a photodiode, a phototransistor, or a photoresistor, for example. If the light quantity sensor 16 does not have a light-transmitting property, then the light quantity sensor 16 suitably does not overlap with the liquid crystal mirror 12.

(5.2) Second Variation

A second variation of the display system 1 according to the fifth embodiment will be described with reference to FIG. 32.

Figure 32:
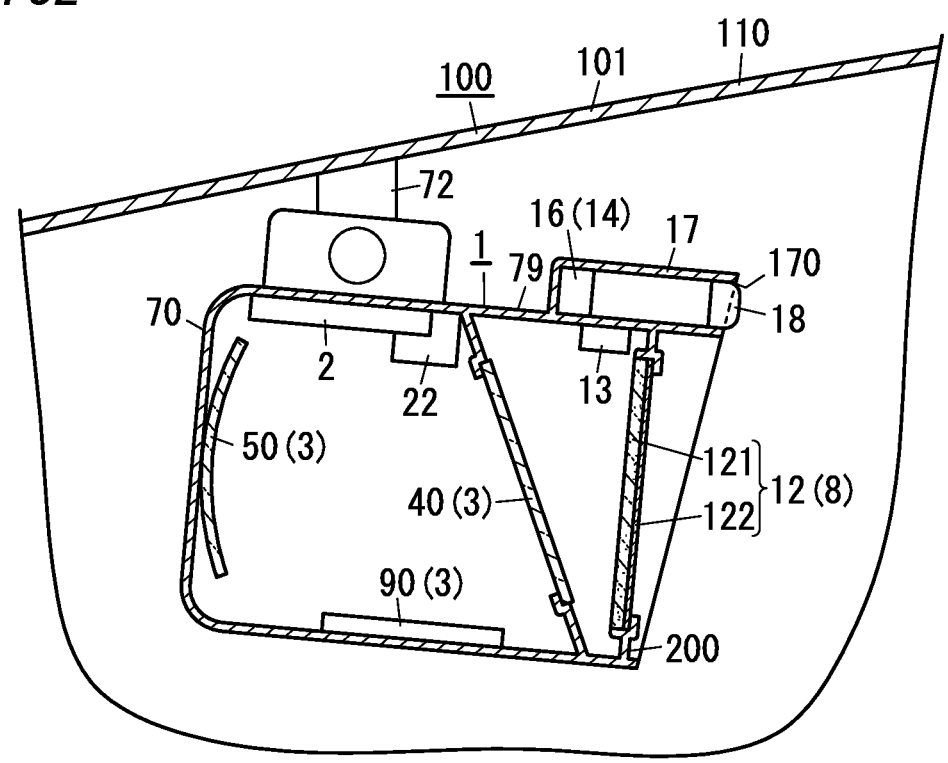
FIG. 32 schematically illustrates a display system according to a second variation of the fifth embodiment.

The display system 1 according to the second variation further includes a box-shaped member 17 and a lens 18 as shown in FIG. 32, which is a major difference from the fifth embodiment described above. In the other respects, the second variation has the same configuration as the fifth embodiment described above. Thus, in the following description, any constituent element of this second variation, having the same function as a counterpart of the fifth embodiment described above, will be designated by the same reference numeral as that counterpart's, and description thereof will be omitted herein.

The box-shaped member 17 is arranged adjacent to the housing 70. More specifically, the box-shaped member 17 is arranged adjacent to the upper hood part 79 of the housing 70. The box-shaped member 17 forms an integral part of the housing 70. The box-shaped member 17 has an opening 170 at one end thereof closer to the detection area R1. The shape of the box-shaped member 17 is similar to that of the housing 70. Thus, the quantity of light incident on the box-shaped member 17 varies proportionally to the quantity of light incident on the housing 70. That is to say, the quantity of light incident on the housing 70 may be detected as a pseudo quantity of incident light by having the light quantity sensor 16 detect the quantity of light incident on the box-shaped member 17. As used herein, if two shapes are "similar to each other," then the two shapes may naturally be exactly similar to each other but may also be substantially similar to each other with a difference falling within a tolerance range.

The light quantity sensor 16 is housed in the box-shaped member 17. The light quantity sensor 16 is arranged in the vicinity of the other end (bottom), opposite from the opening 170, of the box-shaped member 17. As the last reflective member 50 is arranged at the front end of the housing 70, the light quantity sensor 16 is also arranged at the front end of the box-shaped member 17. That is to say, the relative arrangement of the light quantity sensor 16 to the box-shaped member 17 corresponds to the relative arrangement of the last reflective member 50 to the housing 70. The light quantity sensor 16 according to this second variation may be implemented as a photodiode, for example.

The lens 18 may be made of a synthetic resin, for example. The lens 18 is arranged to close the opening 170. The lens 18 condenses the light onto the light quantity sensor 16. This increases the quantity of light incident on the light quantity sensor 16, compared to a situation where no lenses 18 are provided. Thus, even when the quantity of light at the opening 170 is relatively small, the light quantity sensor 16 is still able to detect the quantity of incoming light accurately enough.

As in the first variation described above, external light reaches the light quantity sensor 16, no matter whether the liquid crystal mirror 12 assumes the shielding state or the unshielding state. When finding the quantity of light according to the output of the light quantity sensor 16 greater than the first threshold value, the driver circuit 13 switches the state of the liquid crystal mirror 12 from the unshielding state to the shielding state. Thereafter, when finding the quantity of light according to the output of the light quantity sensor 16 smaller than the second threshold value, the driver circuit 13 switches the state of the liquid crystal mirror 12 from the shielding state to the unshielding state. That is to say, according to this second variation, the state of the liquid crystal mirror 12 may be switched from the shielding state to the unshielding state according to the output of the light quantity sensor 16, as in the first variation described above.

(5.3) Third Variation

A third variation of the display system 1 according to the fifth embodiment will be described with reference to FIG. 33.

Figure 33:
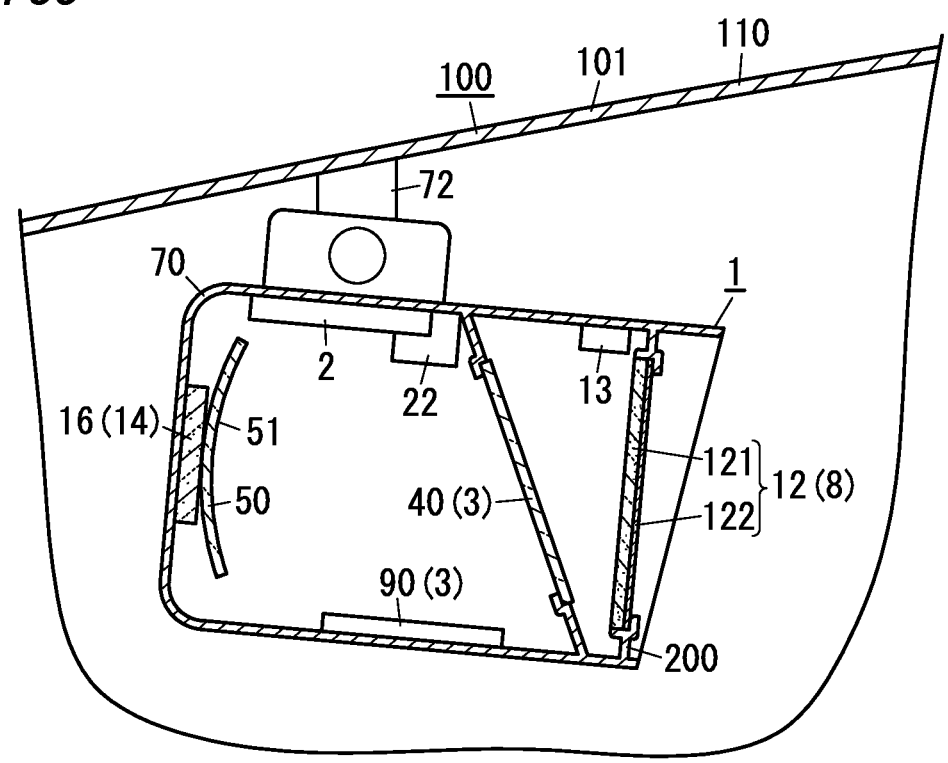
FIG. 33 schematically illustrates a display system according to a third variation of the fifth embodiment.

In the display system 1 according to this third variation, the light quantity sensor 16 is arranged in front of the last reflective member 50 as shown in FIG. 33, which is a major difference from the fifth embodiment described above. In the other respects, the third variation has the same configuration as the fifth embodiment described above. Thus, in the following description, any constituent element of this third variation, having the same function as a counterpart of the fifth embodiment described above, will be designated by the same reference numeral as that counterpart's, and description thereof will be omitted herein.

The light quantity sensor 16 is arranged opposite from the half mirror 40 with respect to the last reflective member 50.

Part of the light incident on the last reflective member 50 is transmitted through the last reflective member 50. The transmittance of the last reflective member 50 with respect to visible light may be about 10%. The visible light transmitted through the last reflective member 50 impinges on the light quantity sensor 16. When finding the quantity of light according to the output of the light quantity sensor 16 greater than a predetermined value, the driver circuit 13 switches the state of the liquid crystal mirror 12 from the unshielding state to the shielding state. Optionally, the display system 1 may include an amplifier circuit for amplifying the output of the light quantity sensor 16.

Also, when a predetermined amount of time passes since the state of the liquid crystal mirror 12 was switched from the unshielding state to the shielding state, the driver circuit 13 switches the state of the liquid crystal mirror 12 from the shielding state to the unshielding state. This allows the driver circuit 13 to determine whether or not the quantity of light detected by the light quantity sensor 16 has decreased.

In this third variation, the quantity of light transmitted through the last reflective member 50 is detected by the light quantity sensor 16. This allows the quantity of light incident on the last reflective member 50 to be detected more accurately. In addition, since the light quantity sensor 16 is arranged outside of the optical path of the light that has emerged from the display device 2, it is easy to secure an arrangement space for the light quantity sensor 16.

Optionally, the last reflective member 50 may transmit light falling outside of the visible light wavelength range. For example, the last reflective member 50 may transmit an infrared ray, and the light quantity sensor 16 may detect the quantity of the infrared ray. According to that configuration, the infrared ray included in the sunlight, for example, is transmitted through the last reflective member 50 and the quantity of the infrared ray is detected by the light quantity sensor 16. If the sunlight or any other light including an infrared ray is incident on the last reflective member 50 to make the quantity of the infrared ray detected by the light quantity sensor 16 relatively large, then the quantity of the visible light that would have impinged on the last reflective member 50 should also be relatively large. When finding the quantity of the infrared ray detected by the light quantity sensor 16 equal to or greater than a predetermined value, the driver circuit 13 may switch the state of the liquid crystal mirror 12 from the unshielding state to the shielding state.

(5.4) Fourth Variation

Figure 34:
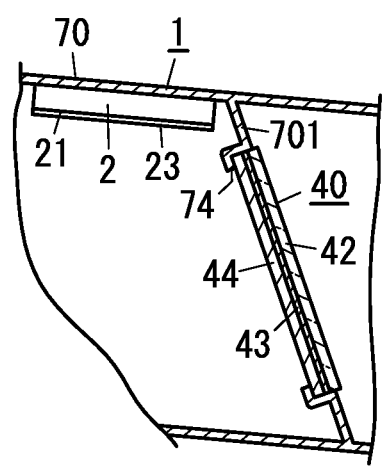
FIG. 34 illustrates, on a larger scale, a main part of a display system according to a fourth variation of the fifth embodiment.

In the embodiments described above, the half mirror 40 is implemented as an evaporation type beam splitter. However, the half mirror 40 does not have to be an evaporation type beam splitter. Alternatively, the display device 2 may be implemented as an LCD panel, a λ/4 retarder 23 may be arranged on the display screen 21 thereof, and the half mirror 40 may have a multilayer structure in which a reflective polarizer 43 such as a wire grid and a λ/4 retarder 44 are stacked one on top of the other on a flat glass plate 42 as shown in FIG. 34. That is to say, the half mirror 40 shown in FIG. 34 has a multilayer structure in which the reflective polarization film (reflective polarizer 43) and the λ/4 retarder 44 are stacked one on top of the other. The reflective polarizer 43 transmits light having a predetermined oscillation direction. The λ/4 retarder 44 produces, in the electric field oscillation direction, a retardation of a quarter wavelength between the incoming light and outgoing light of the half mirror 40. In this case, the reflective polarizer 43 forming part of the half mirror 40 may be polarizer which reflects S-polarized light and transmits P-polarized light, for example. When such a configuration is adopted, the P-polarized light that has emerged from the display screen 21 is transformed by the λ/4 retarder 23 on the display screen 21 into circularly polarized light. Thereafter, the circularly polarized light is transformed by the λ/4 retarder 44 on the reflective polarizer 43 into S-polarized light. In the S-polarized light, almost every light ray is reflected from the reflective polarizer 43 and the reflected light is transformed by the λ/4 retarder 44 on the reflective polarizer 43 into circularly polarized light. The circularly polarized light is reflected from the last reflective member 50 and then incident again on the λ/4 retarder 44 on the reflective polarizer 43 to be transformed into P-polarized light. In the P-polarized light, almost every light ray is transmitted through the reflective polarizer 43 and the transmitted light ray impinges on the viewer's 400 eyes 401. This configuration allows the light that has emerged from the display device 2 to impinge on the viewer's 400 eyes 401 more efficiently than the evaporation type beam splitter.

Optionally, if a liquid crystal member such as the liquid crystal mirror 12 is used as the shield member 8 in the example illustrated in FIG. 34 as in the fourth or fifth embodiment, then the following configuration is suitably adopted. Specifically, the reflection optical system B1, including the λ/4 retarder 44 of the half mirror 40 and the λ/4 retarder 23 on the display screen 21, is designed such that when the liquid crystal member is in the unshielding state, the polarization direction of the light reflected from the last reflective member 50 is aligned with the alignment direction of the liquid crystal molecules when the reflected light enters the liquid crystal layer. On the other hand, when the liquid crystal member is in the shielding state, the polarization direction of the light reflected from the last reflective member 50 intersects with the alignment direction of liquid crystal molecules when the reflected light enters the liquid crystal layer.

The configuration of this fourth variation may be applied to the fourth embodiment described above. In that case, the advantages of this fourth variation are achievable by the fourth embodiment as well.

(5.5) Fifth Variation

A fifth variation of the display system 1 according to the fifth embodiment will be described with reference to FIG. 35.

In the display system 1 according to the fifth variation, when a predetermined condition on external light is satisfied, the driver circuit (driving unit) 13 stops switching the state of the shield member 8 (such as the liquid crystal mirror 12) according to the output of the detection sensor 14, which is a major difference from the fifth embodiment and first to fourth variations thereof described above.

This predetermined condition is a condition on the external light coming from around the display system 1. The predetermined condition is a condition on the external light (such as sunlight) coming from outside of the automobile 100 equipped with the display system 1 and eventually incident on the last reflective member 50. More specifically, the predetermined condition is a condition on the external light incident on the last reflective member 50 in the unshielding state, and may include a condition that the quantity of external light incident on the last reflective member 50 in the unshielding state should fall within a predetermined permissible range, for example. In this case, the permissible range of the quantity of light is the same as the permissible range that has already been described for the "(4) Variation for fourth embodiment," and therefore, description thereof will be omitted herein.

When the predetermined condition is satisfied, the driver circuit (driving unit) 13 stops switching the state of the shield member 8 (such as the liquid crystal mirror 12) according to the output of the detection sensor 14, thus allowing the shield member 8 to maintain its current state (i.e., the unshielding state). In this variation, the quantity of the external light incident on the last reflective member 50 is not measured directly, but the driver circuit 13 indirectly determines, based on at least one of time information about time or vehicle information about the automobile 100 which is not related to the quantity of light detected by the light quantity sensor 16, whether or not the quantity of the external light incident on the last reflective member 50 falls within the permissible range.

In the fifth embodiment and the first to fourth variations thereof, the display system 1 is mounted on the automobile 100. As shown in FIGS. 30 to 33, the detection sensor 14 includes the light quantity sensor 16 for detecting the quantity of at least part of the external light coming in from the detection area R1. The predetermined condition described above is a condition based on at least one of time information about time or vehicle information about the automobile 100 which is not related to the operation of the automobile 100 according to the quantity of surrounding light (around the automobile 100). Note that vehicle information related to the operation of the automobile 100 according to the quantity of the surrounding light includes information about the operation of devices, of which the operating state varies according to the quantity of the surrounding light, and includes at least the lighting information that has already been described for the "(4) Variation of fourth embodiment." Whenever lights such as the headlights are ON, the quantity of light detected by the light quantity sensor 16 becomes equal to or less than a predetermined value. Thus, as long as a decision process is performed based on the quantity of light detected by the light quantity sensor 16, there is no need to determine whether or not a predetermined condition based on the lighting information is satisfied. Thus, the driver circuit 13 determines, based on at least one of time information about time or vehicle information about the automobile 100 which is not related to the operation of the automobile 100 according to the quantity of the surrounding light, whether or not the predetermined condition is satisfied. When finding the predetermined condition satisfied, the driver circuit 13 stops switching the state of the shield member 8 according to the output of the light quantity sensor 16. On the other hand, when finding the predetermined condition not satisfied, the driver circuit 13 switches the state of the shield member 8 according to the output of the light quantity sensor 16.

In this case, the time information includes at least information about the current time. Optionally, the time information may include not only the information about the current time but also information about the current date and season, for example. This time information is acquired from the ECU that the automobile 100 includes or the GPS, for example.

The vehicle information includes multiple types of information that have already been described for the "(4) Variation of fourth embodiment." Among the multiple types of vehicle information, lighting information about lights such as the headlights is information related to the operation of the automobile 100 according to the quantity of the surrounding light. Therefore, the other types of vehicle information which are not related to the operation of the automobile 100 according to the quantity of the surrounding light include at least one of the rainfall related information, current location information, traveling direction information, or tilt angle information, each of which has already been described for the "(4) Variation of fourth embodiment."

In this case, as in the "(4) Variation of fourth embodiment," the predetermined condition may be that it should be nighttime when there is much less natural light than in the daytime. That is to say, if the condition that it should be nighttime is satisfied, then the driver circuit 13 stops switching the state of the liquid crystal mirror 12 according to the output of the light quantity sensor 16. Specifically, if the condition that the current time according to the time information should fall within the nighttime hours that begin at the sunset time and end at the sunrise time is satisfied, the driver circuit 13 stops switching the state of the liquid crystal mirror 12 according to the output of the light quantity sensor 16. In this case, the sunset time and the sunrise time may be fixed times. Alternatively, the driver circuit 13 may set the sunset and sunrise times in accordance with information about the current day or season included in the time information. Still alternatively, the driver circuit 13 may also set the sunset and sunrise times in accordance with not only information about the current day or season included in the time information but also information about the current location indicated by the current location information.

Alternatively, the predetermined condition may also be that it should be raining when there is much less natural light than when it is fine or cloudy. That is to say, if the condition that it should be raining is satisfied, then the driver circuit 13 stops switching the state of the liquid crystal mirror 12 according to the output of the light quantity sensor 16. Specifically, when determining, based on the rainfall related information included in the vehicle information, that it should be raining, the driver circuit 13 stops switching the state of the liquid crystal mirror 12 according to the output of the light quantity sensor 16.

Yet alternatively, the predetermined condition may also be that the altitude (elevation angle) of the sun should be greater than the maximum value of the altitude at or under which the sunlight is able to be directly incident on the last reflective member 50 (this maximum value will be hereinafter referred to as a "reference angle"). If the altitude (elevation angle) of the sun is greater than the reference angle, even the sunlight coming in through the windows of the automobile 100 is much less likely to be incident on the last reflective member 50. Thus, the driver circuit 13 estimates the altitude of the sun based on the time information (i.e., information about the current time and day) and the current location information (i.e., the latitude and longitude of the current location), and when finding the sun's estimated altitude greater than the reference angle, the driver circuit 13 stops switching the state of the liquid crystal mirror 12 according to the output of the light quantity sensor 16. In this case, the predetermined condition may also take, into account, the tilt angle (such as a pitch angle) of the automobile 100. That is to say, in that case, when finding the sum of the sun's estimated altitude (elevation angle) and the pitch angle of the automobile 100 greater than the reference angle, the driver circuit 13 may stop switching the state of the liquid crystal mirror 12 according to the output of the light quantity sensor 16.

Yet alternatively, the predetermined condition may also be that the automobile's 100 orientation (which may be defined by the automobile's 100 traveling direction or tilt angle) does not allow natural light (such as sunlight) coming from outside of the automobile 100 to be incident easily onto the last reflective member 50. In other words, the predetermined condition may be that the sun should be located outside of the range viewable through the automobile's 100 windows (rear or side windows) from the position of the last reflective member 50. Specifically, when finding, based on the traveling direction information included in the vehicle information, the automobile 100 facing south (i.e., facing toward the sun), the driver circuit 13 determines that the automobile's 100 orientation should not allow the natural light to be easily incident on the last reflective member 50. Also, when finding, according to the result of estimation of the sun's azimuth angle based on the time information and the current location information and the traveling direction information, the automobile 100 facing toward the sun, the driver circuit 13 may determine that the automobile 100 should currently have an orientation that does not allow natural light to easily enter the last reflective member 50.

Optionally, the driver circuit 13 may determine, based on the tilt angle information included in the vehicle information, whether or not the automobile 100 currently has such an orientation that does not allow the sunlight to be easily incident on the last reflective member 50. For example, if the automobile 100 is going uphill, then the front-end portion of the automobile 100 tilts upward, thus making it less easy for the sunlight to be incident on the last reflective member 50. On the other hand, if the automobile 100 is going downhill, then the front-end portion of the automobile 100 tilts downward, thus making it easier for the sunlight to be incident on the last reflective member 50. Therefore, when finding, based on the tilt angle information (pitch angle information) included in the vehicle information, the pitch angle greater than a predetermined decision angle (such as zero degrees), the driver circuit 13 determines that the automobile 100 should currently have such an orientation that does not allow the sunlight to be easily incident on the last reflective member 50.

Next, it will be described with reference to FIG. 35 exactly how the driver circuit 13 stops, when finding the predetermined condition on the external light satisfied, switching the state of the shield member 8 (such as the liquid crystal mirror 12) according to the output of the detection sensor 14 (light quantity sensor 16).

The driver circuit 13 determines, at a predetermined timing (e.g., every time a predetermined amount of decision time passes), whether or not the predetermined condition is satisfied (in Step S11). This predetermined condition includes at least one of the plurality of conditions described above for this variation.

When finding the predetermined condition not satisfied in Step S11 (i.e., if the answer is NO in Step S11), the driver circuit 13 determines whether or not the quantity of light detected by the light quantity sensor 16 is equal to or less than a predetermined value (in Step S12).

If the quantity of light detected by the light quantity sensor 16 in Step S12 is equal to or less than the predetermined value (if the answer is YES in Step S12), then the driver circuit 13 maintains the current state of the liquid crystal mirror 12 as it is (in Step S14). This allows the current state (which may be either the unshielding state or the shielding state) to be maintained according to the viewer's 400 preference.

On the other hand, if the quantity of light detected by the light quantity sensor 16 in Step S12 is greater than the predetermined value (i.e., if the answer is NO in Step S12), then the driver circuit 13 switches the state of the liquid crystal mirror 12 to the shielding state (in Step S15). In the shielding state, the viewer 400 is able to view the reflected image produced on the reflective surface of the liquid crystal mirror 12. In addition, controlling the liquid crystal mirror 12 to the shielding state reduces the chances of the external light being incident on the last reflective member 50.

On the other hand, when finding the predetermined condition satisfied in Step S11 (if the answer is YES in Step S11), the driver circuit 13 may ignore the output of the light quantity sensor 16, for example, to stop switching the state of the shield member 8 (liquid crystal mirror 12) according to the output of the light quantity sensor 16 (in Step S13). This allows the display system 1 to keep the current state of the shield member 8 (such as the unshielding state), thus reducing the chances of the state of the shield member 8 being switched erroneously due to detection errors by the light quantity sensor 16. In addition, when the predetermined condition is satisfied, the driver circuit 13 stops switching the state of the shield member 8 (liquid crystal mirror 12), thus allowing the state (which may be either the unshielding state or the shielding state) to be maintained according to the viewer's 400 preference.

The driver circuit 13 repeatedly performs this series of processing steps S11 to S15 over and over again. When the predetermined condition is satisfied, the driver circuit 13 may stop automatically switching the state of the shield member 8 (liquid crystal mirror 12) according to the output of the light quantity sensor 16.

Figure 35:
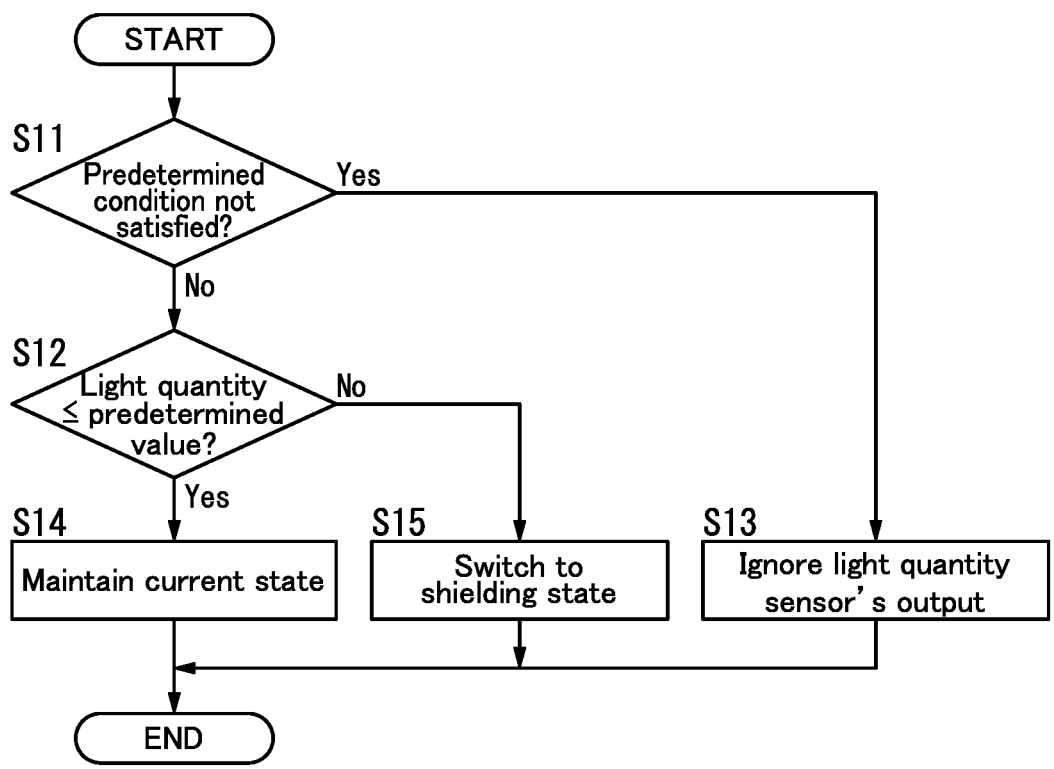
FIG. 35 is a flowchart showing a procedure in which a display system according to a fifth variation of the fifth embodiment operates.

Note that the flowchart shown in FIG. 35 shows just an exemplary method for the display system 1 according to this embodiment to switch the state of the shield member 8 based on the predetermined condition. If necessary, the order of the processing steps may be changed as appropriate, any additional processing step may be performed, or any processing step may be omitted as needed.

According to the flowchart shown in FIG. 35, the current state of the liquid crystal mirror 12 is maintained in Step S14. However, this is only an example and should not be construed as limiting. Alternatively, the state of the liquid crystal mirror 12 may be switched to the unshielding state in Step S14.

Note that the configuration described for the fifth embodiment (including its variations) may be adopted in combination as appropriate with any of the configurations described for the first, second, and third embodiments (including their variations). That is to say, in the first, second, or third embodiment, the control circuit 7 may control the actuator 6 as the driving unit based on the result of detection by the light quantity sensor 16 to switch the state of the shield member 8 to either the unshielding state or shielding state. Also, in the first, second, or third embodiment, the control circuit 7 may control the actuator 6 as the driving unit based on the result of detection by the object sensor 15 and the result of detection by the light quantity sensor 16 to switch the state of the shield member 8 to either the unshielding state or shielding state.

(6) Other Variations

The variations to be enumerated below are applicable to either some or all of the first to fifth embodiments described above (including their variations).

The display system 1 does not have to be applied to the automobile 100 but is applicable to any other type of moving vehicles including bicycles, motorcycles, forklifts, railway trains, aircrafts, construction machines, ships, and boats. The display system 1 does not have to be applied to a moving vehicle, either, but may also be applied to the display screen of an amusement device, for example.

Also, when applied to the automobile 100, the display system 1 does not have to be installed within a viewable range for the driver. Alternatively, the display system 1 may also be installed within a viewable range for a person seated in a back seat or an assistant driver's seat, for example.

Figure 36:
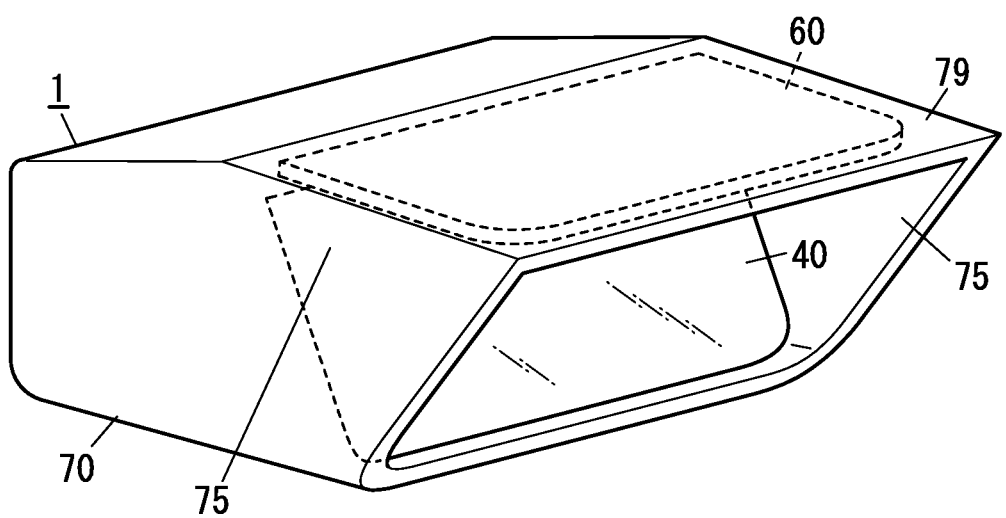
FIG. 36 is a schematic perspective view illustrating an alternative implementation of a housing for the display systems according to the first to fifth embodiments.

Furthermore, in the first embodiment described above, the mirror member 60 has a rectangular shape. However, this is only an example and should not be construed as limiting. Alternatively, the mirror member 60 may have two or four rounded corners as shown in FIG. 36, and the housing 70 may also have rounded corners corresponding to the ones of the mirror member 60. Note that in FIG. 36, illustration of the projections 64 and the guide grooves 77 is omitted. However, the locations and shapes of the projections and guide grooves may be changed as appropriate such that the mirror member 60 may reciprocate between the first position and the second position. Adopting such a configuration reduces the feeling of oppression that the housing 70 gives when viewed from the assistant driver's seat. Optionally, in any of the second to fifth embodiments, the mirror member 60 may have two or four rounded corners, and the housing 70 may also have rounded corners corresponding to the ones of the mirror member 60.

In the first to fifth embodiments described above, the reflection optical system B1 may also be configured to have the light, reflected from the last reflective member 50, further reflected from, not transmitted through, the half mirror 40, before impinging on the viewer's 400 eyes 401. That is to say, the light reflected from the last reflective member 50 just needs to be incident on the viewer's 400 eyes 401 via the half mirror 40.

In the fourth or fifth embodiment described above, the detection sensor 14 may be provided outside of the display system 1.

The detection sensor 14 does not have to be held by the housing 70. Alternatively, the detection sensor 14 may also be held by the moving vehicle body 110 (such as the roof 101) of the automobile 100.

The detection sensor 14 may include an additional image capture device held by the moving vehicle body 110 (such as the roof 101) of the automobile 100. The additional image capture device is provided separately from the image capture device 4 (see FIG. 2) for capturing an image outside of the automobile 100. The additional image capture device may be implemented as a two-dimensional image sensor such as a CCD image sensor or a CMOS image sensor. The driver circuit 13 may determine, based on the image captured by the additional image capture device, whether or not there is any object O1 in the detection area R1.

The object sensor 15 of the detection sensor 14 may detect the presence of only an object O1 moving in the detection area R1. That is to say, the object sensor 15 may be configured to detect no still objects O1. Such an object sensor 15 may be implemented as a Doppler sensor that utilizes the Doppler effect of an electromagnetic wave such as a microwave.

Optionally, the detection sensor 14 may include a plurality of sensors. For example, the detection sensor 14 may include a plurality of light quantity sensors 16 such as photodiodes which are arranged side by side along the width of the housing 70 (in the rightward/leftward direction). This would improve the detection accuracy of the detection sensor 14.

The detection sensor 14 may be arranged on an inner bottom surface or inner top surface (i.e., the ceiling) of the housing 70. In FIG. 26, the object sensor 15 is arranged on the bottom surface of the housing 70. Alternatively, the object sensor 15 may also be arranged on the top surface of the housing 70. Also, in FIG. 30, the light quantity sensor 16 is arranged on an inner top surface of the housing 70 inside the housing 70. Alternatively, the light quantity sensor 16 may also be arranged on an inner bottom surface of the housing 70 inside the housing 70.

In the fourth or fifth embodiment described above, the driving unit (such as the driver circuit 13) may change the orientation of the housing 70 according to the output of the detection sensor 14. Optionally, the display system 1 may include an actuator for generating driving force that changes the orientation of the housing 70. The driver circuit 13 may change the orientation of the housing 70 by controlling the operation of the actuator when switching the state of the liquid crystal mirror 12 according to the output of the detection sensor 14. The actuator may change the orientation of the housing 70 by driving, in rotation, a supporting member 72 such as a ball joint for supporting the housing 70, for example. The driver circuit 13 may change the orientation of the housing 70 to such an orientation that allows the driver to view the housing 70 in the depth direction (i.e., in the forward/backward direction) when the state of the liquid crystal mirror 12 switches from the shielding state to the unshielding state, for example. This allows the driver to squarely view the image displayed on the display system 1. Alternatively, the driver circuit 13 may change the orientation of the housing 70 to such an orientation that allows the driver to view the housing 70 obliquely to the depth direction (i.e., the forward/backward direction) when the state of the liquid crystal mirror 12 switches from the unshielding state to the shielding state, for example. This allows the rear view from the automobile 100 to be produced on the liquid crystal mirror 12 when viewed from the driver.

Optionally, the driving unit (such as the driver circuit 13) may change, according to the output of the detection sensor 14, the orientation of the housing 70 to an orientation determined for each individual driver. That is to say, since the height of the eye box varies from one driver to another, the orientation of the housing 70 may be adjusted to an orientation suitable for each individual driver. For example, the driving unit may read identification information from an electronic car key that each individual driver owns to identify the driver based on the identification information read out from the electronic car key. If necessary, the display system 1 may include a setting operating unit for setting, in advance, the orientation of the housing 70 for each individual driver.

Note that when the orientation of the housing 70 changes, the orientation of the detection sensor 14 mounted on the housing 70 also changes, and therefore, the detection area R1 of the detection sensor 14 may vary. Thus, the detection sensor 14 may include a plurality of sensors. For example, the detection sensor 14 may include two sensors. The detection sensor 14 may detect the state of a certain detection area R1 by selectively using either of the two sensors according to the orientation of the housing 70. Specifically, one of the two sensors detects the state of the detection area R1 when the liquid crystal mirror 12 assumes the shielding state and the orientation of the housing 70 is the first orientation. The other of the two sensors detects the state of the detection area R1 when the liquid crystal mirror 12 assumes the unshielding state and the orientation of the housing 70 is the second orientation.

Optionally, the state of the certain detection area R1 may be detected by the detection sensor 14 by having the detection range of the detection sensor 14 limited by some limiting means when the orientation of the housing 70 changes. For example, when the detection sensor 14 includes the light quantity sensor 16, the light quantity sensor 16 is housed in a case with two openings (limiting means). When the liquid crystal mirror 12 assumes the shielding state and the orientation of the housing 70 has the first orientation, the light quantity sensor 16 detects the quantity of the light coming in through one of the two openings. When the liquid crystal mirror 12 assumes the unshielding state and the orientation of the housing 70 has the second orientation, the light quantity sensor 16 detects the quantity of the light coming in through the other of the two openings. If necessary, a lens may be fitted into each of the two openings. Also, one of the two openings may be opened, and the other opening may be closed according to the orientation of the housing 70.

Alternatively, the driving unit (such as the driver circuit 13) may change the orientation of the shield member 8 (such as the liquid crystal mirror 12) instead of changing the orientation of the housing 70.

If the detection sensor 14 includes a post sensitive device (PSD) serving as the object sensor 15, then the driver circuit 13 may switch the state of the liquid crystal mirror 12 from the shielding state to the unshielding state according to the output of the PSD. The PSD may include two infrared light-emitting diodes, for example. The PSD is basically used to determine, in the following manner, whether or not there is any object O1 in the detection area R1. Specifically, the PSD detects the location of the object O1 based on the difference between the intensity of a reflected wave of an infrared ray radiated from one infrared light-emitting diode and the intensity of a reflected wave of an infrared ray radiated from the other infrared light-emitting diode. Alternatively, the driver circuit 13 may switch the state of the liquid crystal mirror 12 from the shielding state to the unshielding state based on the sum of the two intensities, which has been calculated instead of the difference between the two intensities. Specifically, when finding the sum of the two intensities equal to or less than a predetermined value, the driver circuit 13 may switch the state of the liquid crystal mirror 12 from the shielding state to the unshielding state.

Optionally, after having switched the state of the shield member 8 (such as the liquid crystal mirror 12), the driving unit (such as the driver circuit 13) may maintain the updated state for a predetermined amount of time, irrespective of the output of the detection sensor 14. This reduces the chances of the state of the shield member 8 changing continuously during a short period of time.

Alternatively, the driving unit (such as the driver circuit 13) may switch the state of the shield member 8 (such as the liquid crystal mirror 12) based on not only the output of the detection sensor 14 but also a time-related condition. For example, when finding the quantity of light detected by the light quantity sensor 16, serving as the detection sensor 14, greater than a predetermined value continuously for a predetermined amount of time, the driver circuit 13 may switch the state of the liquid crystal mirror 12 from the unshielding state to the shielding state.

Still alternatively, the driving unit (such as the driver circuit 13) may maintain the shield member 8 (such as the liquid crystal mirror 12) in the unshielding state during particular hours of the day, irrespective of the output of the detection sensor 14. The particular hours of the day may be from 19:00 to 5:00 (next day), during which the chances of the sunlight being radiated are slim. Yet alternatively, the driving unit may maintain the shield member 8 in the unshielding state, irrespective of the output of the detection sensor 14, when the brightness outside of the automobile 100 is equal to or greater than a predetermined brightness value. The brightness outside of the automobile 100 is detected by a light quantity sensor provided for the automobile 100 separately from the display system 1.

Optionally, the display device 2 may adjust the luminance on its display screen 21 according to the quantity of light detected by the light quantity sensor 16. The chances of the light that has emerged from the display screen 21 producing an unwanted image of either the liquid crystal mirror 12 or the half mirror 40 may be reduced by increasing the luminance on the display screen 21 as the quantity of light detected by the light quantity sensor 16 increases.

When the liquid crystal mirror 12 is used as the shield member 8, the display system 1 may include a state operating unit for accepting the operation of switching the state of the liquid crystal mirror 12 from the shielding state to the unshielding state, and vice versa. The driver circuit 13 switches the state of the liquid crystal mirror 12 from the shielding state to the unshielding state, and vice versa, by changing the voltage applied to the liquid crystal mirror 12 as any operation is performed on the state operating unit. This configuration allows the user (such as the driver) to switch the state of the liquid crystal mirror 12 by operating the state operating member by him- or herself, not just having the state switched automatically by the driver circuit 13.

In the fourth or fifth embodiment described above, a liquid crystal shutter may be used as an alternative shield member 8, instead of the liquid crystal mirror 12. The transmittance of light through the liquid crystal shutter varies according to the applied voltage. Unlike the liquid crystal mirror 12, the surface, facing the viewer 400 (i.e., the external surface 1200), of the liquid crystal shutter in the shielding state is not a mirror surface, but either absorbs or scatters visible light.

In the fourth or fifth embodiment described above, a member that always absorbs or scatters light may be used as the shield member 8. For example, a black plate may be used as the shield member 8. Also, the detection area R1 may be limited to an area where the image displayed by the display system 1 is cut off by the object O1 when viewed from the viewer 400 (such as the driver). Furthermore, when the presence of any object O1 is detected in the detection area R1, the state of the shield member 8 may be switched from the unshielding state to the shielding state. That is to say, even if the shield member 8 assumes the unshielding state, the state of the shield member 8 may be switched to the shielding state, only when the image displayed by the display system 1 is not viewable for the viewer 400.

(Resume)

As can be seen from the foregoing description, a display system (1) according to a first aspect includes: a display device (2) having a display screen (21); a reflection optical system (B1) including at least a last reflective member (50); a housing (70); and a shield member (8). On the last reflective member (50), light, emerging from the display screen (21) of the display device (2), is incident either directly or indirectly. The last reflective member (50) reflects the incident light toward a viewer's (400) eyes (401). The housing (70) holds the display device (2) and the reflection optical system (B1). The shield member (8) is held by the housing (70) to assume either a shielding state or an unshielding state. The shielding state is a state where the shield member (8) at least partially cuts off light incident on, or reflected from, the last reflective member (50). The unshielding state is a state where the shielding state is canceled. The shield member (8) in the shielding state reflects, toward the viewer's (400) eyes (401), external light impinging on the housing (70). The housing (70) has a holding structure (200) to hold the shield member (8), no matter whether the shield member (8) assumes the shielding state or the unshielding state.

This aspect provides a display system (1) which is able to display an alternative image even when an error occurs in the display operation by the display device (2), and thereby reduce a decline in the visibility of a front view.

In a display system (1) according to a second aspect, which may be implemented in conjunction with the first aspect, the reflection optical system (B1) further includes a half mirror (40). The light that has emerged from the display screen (21) of the display device (2) is incident on the last reflective member (50) via the half mirror (40), and the light reflected from the last reflective member (50) is transmitted through the half mirror (40) and then incident on the viewer's (400) eyes (401).

This aspect allows the overall size of the display system (1) to be reduced while extending the optical path length by having the light reflected at least twice by the half mirror (40) and the last reflective member (50), respectively.

In a display system (1) according to a third aspect, which may be implemented in conjunction with the first aspect, the housing (70) includes, as the shield member (8), a mirror member (60) in a plate shape. One surface of the mirror member (60) is a reflective surface (61). The mirror member (60) switches its state from a first state to a second state, and vice versa, by performing a sliding operation and a rotational operation. The first state is the unshielding state in which the mirror member (60) is placed at a first position outside of an optical path of the light reflected from the last reflective member (50) to be incident on the viewer's (400) eyes (401). The second state is the shielding state in which the mirror member (60) is placed at a second position between the last reflective member (50) and the viewer (400) with the reflective surface (61) oriented toward the viewer (400) and in which the external light coming from outside of the housing (70) is reflected from the reflective surface (61) to produce a reflected image on the viewer's (400) eyes (401).

This aspect provides a display system (1) which is able to display an alternative image even when an error occurs in the display operation by the display device (2), and thereby reduce a decline in the visibility of a front view.

In a display system (1) according to a fourth aspect, which may be implemented in conjunction with the third aspect, the reflection optical system (B1) further includes a half mirror (40). The light that has emerged from the display screen (21) of the display device (2) is incident on the last reflective member (50) via the half mirror (40). The light reflected from the last reflective member (50) is transmitted through the half mirror (40) and then incident on the viewer's (400) eyes (401).

This aspect allows the overall size of the display system (1) to be reduced while extending the optical path length by having the light reflected at least twice by the half mirror (40) and the last reflective member (50), respectively.

In a display system (1) according to a fifth aspect, which may be implemented in conjunction with the fourth aspect, the other surface, opposite from the reflective surface (61), of the mirror member (60) is an opaque surface (62) to reflect at least light, falling within a visible light wavelength range, at a lower reflectance than the reflective surface (61). The first state is a state where the opaque surface (62) of the mirror member (60) faces the half mirror (40).

This aspect reduces the chances of external light that has been incident, in the first state, on the opaque surface (62) of the mirror member (60) from outside of the housing (70) being reflected from the opaque surface (62) and the half mirror (40) and incident on the viewer's (400) eyes (401).

In a display system (1) according to a sixth aspect, which may be implemented in conjunction with the fifth aspect, the opaque surface (62) absorbs and/or scatters at least the light falling within the visible light wavelength range.

This aspect reduces the chances of external light that has been incident, in the first state, on the opaque surface (62) from outside of the housing (70) being reflected from the opaque surface (62) and the half mirror (40) and incident on the viewer's (400) eyes (401).

In a display system (1) according to a seventh aspect, which may be implemented in conjunction with any one of the fourth to sixth aspects, the reflection optical system (B1) further includes an intermediate reflective member (90) to reflect, toward the half mirror (40), the light that has emerged from the display screen (21) of the display device (2).

This aspect provides a display system (1) which is able to display an alternative image even when an error occurs in the display operation by the display device (2), and thereby reduce a decline in the visibility of a front view.

In a display system (1) according to an eighth aspect, which may be implemented in conjunction with any one of the fourth to seventh aspects, the display device (2) includes a liquid crystal panel. The display screen (21) is provided with a first $\lambda/4$ retarder (23) to produce, in an electric field oscillation direction, a retardation of a quarter wavelength between incoming light and outgoing light. The half mirror (40A) has a multilayer structure in which a reflective polarization film (43) and a second $\lambda/4$ retarder (44) are stacked one on top of the other. The reflective polarization film (43) transmits light having a predetermined oscillation direction. The second $\lambda/4$ retarder (44) produces, in the electric field oscillation direction, a retardation of a quarter wavelength between incoming light and outgoing light of the half mirror (40A).

This aspect allows the light that has emerged from the display device (2) to impinge on the viewer's (400) eyes (401) highly efficiently.

In a display system (1) according to a ninth aspect, which may be implemented in conjunction with any one of the third to eighth aspects, the holding structure (200) includes a projection (64, 751) and a guide groove (77, 65). The projection (64, 751) is provided for one of two members consisting of the housing (70) and the mirror member (60). The guide groove (77, 65) is provided for the other of the two members consisting of the housing (70) and the mirror member (60) and receives the projection (64, 751) inserted thereto. The mirror member (60) has its state switched from the first state to the second state, and vice versa, by having a position of the projection (64, 751) changed inside the guide groove (77, 65).

This aspect allows the mirror member (60) to reciprocate between the first position and the second position by moving the projection (64, 751) along the guide groove (77, 65).

In a display system (1) according to a tenth aspect, which may be implemented in conjunction with the ninth aspect, the holding structure (200) further includes a guide member (78) to be inserted into the guide groove (77) to slide along the guide groove (77). The projection (64) is supported rotatably by the guide member (78).

This aspect allows the guide member (78) to move smoothly along the guide groove (77).

A display system (1) according to an eleventh aspect, which may be implemented in conjunction with any one of the third to ninth aspects, further includes a state keeper (80) to keep the mirror member (60) in each of the first state and the second state.

This aspect reduces the chances of the mirror member (60) causing a backlash in the first state or the second state.

In a display system (1) according to a twelfth aspect, which may be implemented in conjunction with the eleventh aspect, the state keeper (80) includes a magnet (81) provided for at least one of the two members consisting of the mirror member (60) and the housing (70). The mirror member (60) is kept, by magnetic force applied by the magnet (81), in each of the first state and the second state.

This aspect reduces the chances of the mirror member (60) causing a backlash in the first state or the second state.

In a display system (1) according to a thirteenth aspect, which may be implemented in conjunction with the twelfth aspect, the magnet (81) is an electromagnet.

This aspect reduces the chances of the mirror member (60) causing a backlash in the first state or the second state.

In a display system (1) according to a fourteenth aspect, which may be implemented in conjunction with the eleventh aspect, the state keeper (80) includes a ball plunger (83) provided for one of two members consisting of the housing (70) and the mirror member (60). The other of the two members consisting of the housing (70) and the mirror member (60) has a receiving hole (84) to receive a ball (831) of the ball plunger (83) inserted. The mirror member (60) is kept in each of the first state and the second state by having the ball (831) inserted into the receiving hole (84).

This aspect reduces the chances of the mirror member (60) causing a backlash in the first state or the second state.

A display system (1) according to a fifteenth aspect, which may be implemented in conjunction with any one of the third to fourteenth aspects, further includes an operating member (63) to allow a user (such as the viewer (400)) to manually switch a state of the mirror member (60) to either the first state or the second state.

This aspect provides a display system (1) which is able to display an alternative image even when an error occurs in the display operation by the display device (2), and thereby reduce a decline in the visibility of a front view.

In a display system (1) according to a sixteenth aspect, which may be implemented in conjunction with the fifteenth aspect, displacing the mirror member (60) from the first position using the operating member (63) causes the state of the mirror member (60) to be switched from the first state to the second state due to the mirror member's (60) own weight.

This aspect provides a display system (1) which is able to display an alternative image even when an error occurs in the display operation by the display device (2), and thereby reduce a decline in the visibility of a front view.

A display system (1) according to a seventeenth aspect, which may be implemented in conjunction with any one of the third to sixteenth aspects, further includes an actuator (6) to reciprocate the mirror member (60) between the first position and the second position.

This aspect provides a display system (1) which is able to display an alternative image even when an error occurs in the display operation by the display device (2), and thereby reduce a decline in the visibility of a front view.

In a display system (1) according to an eighteenth aspect, which may be implemented in conjunction with the seventeenth aspect, the actuator (6) includes a motor. A control circuit (7) to control the motor drives, when receiving an error signal indicating that an error has occurred in display operation by the display device (2), the motor to displace the mirror member (60) from the first position to the second position.

This aspect provides a display system (1) which is able to display an alternative image even when an error occurs in the display operation by the display device (2), and thereby reduce a decline in the visibility of a front view.

In a display system (1) according to a nineteenth aspect, which may be implemented in conjunction with the seventeenth or eighteenth aspect, the display system (1) is mounted on an automobile (100). In a stopped state where the automobile (100) stops traveling-related functions, the actuator (6) displaces the mirror member (60) to the second position.

This aspect reduces the chances of the object (O1) being heated by the light when the automobile (100) is at a stop.

In a display system (1) according to a twentieth aspect, which may be implemented in conjunction with the first aspect, the housing (70) includes, as the shield member (8), a mirror member (60A) in a plate shape. One surface of the mirror member (60) is a reflective surface. The holding structure (200) further holds the last reflective member (50). The holding structure (200) holds the last reflective member (50) and the mirror member (60A) such that the last reflective member (50) and the mirror member (60A) are rotatable with respect to the housing (70) with respective reflective surfaces (61A, 51) of the mirror member (60A) and the last reflective member (50) facing away from each other. A normal (L1) to a center (P1) of the reflective surface (61A) of the mirror member (60A) is not parallel to a normal (L2) to a center (P2) of the reflective surface (51) of the last reflective member (50).

This aspect allows the unshielding state to be switched to the shielding state, and vice versa, by rotating the mirror member (60A) and the last reflective member (50) by 180 degrees with respect to the housing (70).

In a display system (1) according to a twenty-first aspect, which may be implemented in conjunction with the twentieth aspect, the holding structure (200) includes a rotator (210) held rotatably with respect to the housing (70). The last reflective member (50) and the mirror member (60A) are held by the rotator (210). The rotator (210) rotates, in the unshielding state, to a first rotational position where the reflective surface (51) of the last reflective member (50) is arranged to face the viewer (400), and also rotates, in the shielding state, to a second rotational position where the reflective surface (61A) of the mirror member (60A) is arranged to face the viewer (400).

This aspect allows the unshielding state to be switched to the shielding state, and vice versa, by rotating the rotator (210) to either the first rotational position or the second rotational position.

In a display system (1) according to a twenty-second aspect, which may be implemented in conjunction with the twenty-first aspect, the rotator (210) holds the mirror member (60A) and the last reflective member (50) such that a normal (L1) to a center (P1) of the reflective surface (61A) of the mirror member (60) is not parallel to a normal (L2) to a center (P2) of the reflective surface (51) of the last reflective member (50).

This aspect allows the unshielding state to be switched to the shielding state, and vice versa, by rotating the rotator (210) by 180 degrees.

In a display system (1) according to a twenty-third aspect, which may be implemented in conjunction with the first aspect, the housing (70) includes, as the shield member (8), a mirror member (60A) in a plate shape. One surface of the mirror member (60A) is a reflective surface. The holding structure (200) includes a rotator (210) held rotatably with respect to the housing (70). The rotator (210) holds the mirror member (60A) and the last reflective member (50) such that respective reflective surfaces (61A, 51) of the mirror member (60A) and the last reflective member (50) face away from each other and that a normal (L1) to a center (P1) of the reflective surface (61A) of the mirror member (60) is parallel to a normal (L2) to a center (P2) of the reflective surface (51) of the last reflective member (50). The rotator (210) rotates, in the unshielding state, to a first rotational position where the reflective surface (51) of the last reflective member (50) is arranged to face the viewer (400), and also rotates, in the shielding state, to a second rotational position where the reflective surface (61A) of the mirror member (60A) is arranged to face the viewer (400). An angle of rotation of the rotator (210) between the first rotational position and the second rotational position is a predetermined angle other than 180 degrees.

This aspect allows the unshielding state to be switched to the shielding state, and vice versa, by rotating the rotator (210) by a predetermined angle.

In a display system (1) according to a twenty-fourth aspect, which may be implemented in conjunction with any one of the twenty-first to twenty-third aspects, the rotator (210) further holds at least one additional mirror member (320). A normal (L3) to a center (P3) of a reflective surface (321) of the at least one additional mirror member (60) is not parallel to a normal (L2) to a center (P2) of the reflective surface (51) of the last reflective member (50) or a normal (L1) to a center (P1) of the reflective surface (61A) of the mirror member (60A).

This aspect allows a reflected image to be displayed by the additional mirror member (320) by rotating the rotator (210) to a rotational position where the additional mirror member (320) faces the viewer (400).

In a display system (1) according to a twenty-fifth aspect, which may be implemented in conjunction with any one of the twenty-first to twenty-third aspects, the rotator (210) has a shape of a quadrangular prism, of which a cross section intersecting with a rotational axis (211) thereof is quadrangular. The last reflective member (50) and the mirror member (60) are arranged alternately on each pair of four side faces, arranged along the rotational axis (211), of the rotator (210).

This aspect allows the angle of rotation, by which the rotator (210) needs to be rotated to switch the shielding state to the unshielding state, and vice versa, to be decreased to less than 180 degrees.

In a display system (1) according to a twenty-sixth aspect, which may be implemented in conjunction with any one of the twenty-first to twenty-fifth aspects, the mirror member (60A) is a plane mirror. An antiglare mirror (322) having a light transmitting property is arranged on one surface, on which the external light is incident, of the mirror member (60A). The mirror member (60A) and the antiglare mirror (322) are held by the rotator (210) such that when viewed along the rotational axis (211) of the rotator (210), a normal (L1) to a center (P1) of the reflective surface (61A) of the mirror member (60A) is not parallel to a normal (L3) to a center (P3) of the reflective surface (323) of the antiglare mirror (322).

This aspect allows a reflected image to be displayed by the antiglare mirror (322) by rotating the rotator (210) to a rotational position where the antiglare mirror (322) reflects the light toward the viewer (400).

A display system (1) according to a twenty-seventh aspect, which may be implemented in conjunction with any one of the twenty-first to twenty-sixth aspects, further includes an actuator (6) to reciprocate the rotator (210) between the first rotational position and the second rotational position.

This aspect allows the rotator (210) to reciprocate between the first rotational position and the second rotational position by using the actuator (6).

In a display system (1) according to a twenty-eighth aspect, which may be implemented in conjunction with any one of the twenty-first to twenty-seventh aspects, the reflection optical system (B1) further includes a half mirror (40). The light that has emerged from the display screen (21) of the display device (2) is incident on the last reflective member (50) via the half mirror (40), and the light reflected from the last reflective member (50) is transmitted through the half mirror (40) and then incident on the viewer's (400) eyes (401) to present an image to the viewer (400). The half mirror (40) has a multilayer structure in which a reflective polarization film (43) and a first λ/4 retarder (44) are stacked one on top of the other. The reflective polarization film (43) transmits light having a predetermined oscillation direction. The first λ/4 retarder (44) produces, in an electric field oscillation direction, a retardation of a quarter wavelength between incoming light and outgoing light of the half mirror (40). The housing (70) includes, as the shield member (8), a mirror member (60A) in a plate shape. One surface of the mirror member (60A) is a reflective surface (61A). In the unshielding state, the mirror member (60A) is placed at a first position outside of an optical path of the light reflected from the last reflective member (50) to be incident on the viewer's (400) eyes (401). In the shielding state, the mirror member (60A) is placed at a point between the last reflective member (50) and the viewer (400) with the reflective surface oriented toward the viewer (400). On the surface of the mirror member (60A), arranged is a second λ/4 retarder (66) to produce, in the electric field oscillation direction, a retardation of a quarter wavelength between incoming light and outgoing light of the mirror member (60A).

This aspect allows the light that has emerged from the display device (2) to impinge on the viewer's (400) eyes (401) highly efficiently.

A display system (1) according to a twenty-ninth aspect, which may be implemented in conjunction with the first aspect, further includes a driving unit (which may be a driver circuit (13) or the actuator (6)) to switch a state of the shield member (8) from the unshielding state to the shielding state in accordance with output of a detection sensor (14) to detect a situation in a predetermined detection area.

According to this aspect, the driving unit (which may be the driver circuit (13) or the actuator (6)) switches the state of the shield member (8) from the unshielding state to the shielding state in accordance with a situation in the detection area (R1). This reduces the chances of an object (O1) present in the detection area (R1) being heated by the reflected light.

In a display system (1) according to a thirtieth aspect, which may be implemented in conjunction with the twenty-ninth aspect, an optical path of the light reflected from the last reflective member (50) passes through the detection area (R1). The detection sensor (14) includes an object sensor (15) to determine whether or not there is any object (O1) in the detection area (R1). The driving unit (which may be the driver circuit (13) or the actuator (6)) switches, when the object sensor (15) detects presence of the object (O1) in the detection area (R1), the state of the shield member (8) from the unshielding state to the shielding state.

According to this aspect, the driving unit (which may be the driver circuit (13) or the actuator (6)) switches the state of the shield member (8) from the unshielding state to the shielding state in accordance with a situation in the detection area (R1). This reduces the chances of an object (O1) present in the detection area (R1) being heated by the reflected light.

In a display system (1) according to a thirty-first aspect, which may be implemented in conjunction with the thirtieth aspect, the object sensor (15) is held by the housing (70).

This aspect allows the display device (2) and other members forming parts of the display system (1) and the object sensor (15) to be aggregated in the same housing (70).

In a display system (1) according to a thirty-second aspect, which may be implemented in conjunction with the thirtieth or thirty-first aspect, the object sensor (15) detects the presence of the object (O1) while the object (O1) is moving in the detection area (R1).

This aspect reduces the chances of the object sensor (15) detecting the presence or absence of the object (O1) erroneously.

In a display system (1) according to a thirty-third aspect, which may be implemented in conjunction with any one of the twenty-ninth to thirty-second aspects, the reflection optical system (B1) further includes a half mirror (40). The light that has emerged from the display screen (21) of the display device (2) is incident on the last reflective member (50) via the half mirror (40), and the light reflected from the last reflective member (50) is transmitted through the half mirror (40) and then incident on the viewer's (400) eyes (401) to present an image to the viewer (400).

This aspect allows the overall size of the display system (1) to be reduced while extending the optical path length by having the light reflected at least twice by the half mirror (40) and the last reflective member (50), respectively.

In a display system (1) according to a thirty-fourth aspect, which may be implemented in conjunction with the thirty-third aspect, the shield member (8) in the shielding state is arranged such that the half mirror (40) is located between the shield member (8) and the last reflective member (50).

This aspect allows the space left between the shield member (8) and the last reflective member (50) to be used effectively as an arrangement space for the half mirror (40).

In a display system (1) according to a thirty-fifth aspect, which may be implemented in conjunction with the thirty-third or thirty-fourth aspect, the half mirror (40) has a multilayer structure in which a reflective polarization film (43) and a λ/4 retarder (44) are stacked one on top of the other. The reflective polarization film (43) transmits light having a predetermined oscillation direction. The λ/4 retarder (44) produces, in an electric field oscillation direction, a retardation of a quarter wavelength between incoming light and outgoing light of the half mirror (40).

This aspect allows the light that has emerged from the display device (2) to impinge on the viewer's (400) eyes more efficiently than in a situation where an evaporated beam splitter is used as the half mirror (40).

In a display system (1) according to a thirty-sixth aspect, which may be implemented in conjunction with any one of the twenty-ninth to thirty-fifth aspects, the shield member (8) is an optical mirror (60) having a reflective surface (61). The reflective surface (61) reflects light in a direction in which the reflected light is further reflected from the last reflective member (50) while the shield member (8) is in the shielding state.

This aspect allows the viewer (400) to view the image produced on the reflective surface (61) while the shield member (8) is in the shielding state.

In a display system (1) according to a thirty-seventh aspect, which may be implemented in conjunction with any one of the twenty-ninth to thirty-sixth aspects, the detection sensor (14) includes a light quantity sensor (16). The light quantity sensor (16) detects a quantity of at least part of the external light coming from the detection area (R1).

This aspect allows the driving unit (which may be either the driver circuit (13) or the actuator (6)) to switch the state of the shield member (8) from the unshielding state to the shielding state according to the quantity of light detected by the light quantity sensor (16). This further reduces the chances of the object (O1) present in the detection area (R1) being heated by the reflected light.

A display system (1) according to a thirty-eighth aspect, which may be implemented in conjunction with the thirty-seventh aspect, further includes a lens (18). The lens (18) condenses light onto the light quantity sensor (16).

This aspect allows, even when the quantity of light incident on the light quantity sensor (16) is relatively small, the quantity of light to be detected accurately.

In a display system (1) according to a thirty-ninth aspect, which may be implemented in conjunction with the thirty-seventh or thirty-eighth aspect, the light quantity sensor (16) is arranged on an inner bottom surface or an inner top surface of the housing (70) inside the housing (70).

This aspect allows an arrangement space for the light quantity sensor (16) to be secured easily.

A display system (1) according to a fortieth aspect, which may be implemented in conjunction with the thirty-seventh or thirty-eighth aspect, further includes a box-shaped member (17). The box-shaped member is arranged adjacent to the housing (70) and has an opening (170) at one end thereof closer to the detection area (R1). The light quantity sensor (16) is housed in the box-shaped member (17).

This aspect allows an arrangement space for the light quantity sensor (16) to be secured easily.

In a display system (1) according to a forty-first aspect, which may be implemented in conjunction with the thirty-seventh or thirty-eighth aspect, the light quantity sensor (16) is arranged on a surface of the shield member (8).

This aspect allows an arrangement space for the light quantity sensor (16) to be secured easily.

In a display system (1) according to a forty-second aspect, which may be implemented in conjunction with any one of the twenty-ninth to forty-first aspects, the shield member (liquid crystal mirror (12)) is arranged on an optical path of the light reflected from the last reflective member (50). The transmittance of the light transmitted through the shield member (liquid crystal mirror (12)) varies according to output of the detection sensor (14).

This aspect allows the state of the shield member to be easily switched from the unshielding state to the shielding state, and vice versa, by changing the voltage applied to the shield member (liquid crystal mirror (12)).

In a display system (1) according to a forty-third aspect, which may be implemented in conjunction with any one of the twenty-ninth to forty-second aspects, the driving unit (which may be either the driver circuit (13) or the actuator (6)) changes an orientation of the housing (70) according to output of the detection sensor (14).

This aspect allows the orientation of the housing (70) to be changed into an orientation beneficial for the user (such as the viewer (400)) depending on whether the shield member (8) is in the unshielding state or the shielding state. For example, when the shield member is in the unshielding state, the orientation of the housing (70) may be changed into an orientation that allows the user (such as the viewer (400)) to view the image easily.

In a display system (1) according to a forty-fourth aspect, which may be implemented in conjunction with any one of the twenty-ninth to forty-third aspects, the driving unit (which may be either the driver circuit (13) or the actuator (6)) stops, when a predetermined condition on external light is satisfied, switching the state of the shield member (8) according to output of the detection sensor (14).

According to this aspect, when a predetermined condition is satisfied, the driving unit stops switching the state of the shield member (8) according to the output of the detection sensor (14). This reduces the chances of the state of the shield member (8) being switched due to an erroneous detection by the detection sensor (14).

In a display system (1) according to a forty-fifth aspect, which may be implemented in conjunction with the forty-fourth aspect, the display system (1) is mounted on an automobile (100). An optical path of the light reflected from the last reflective member (50) passes through the detection area (R1). The detection sensor (14) includes an object sensor (15) to determine whether or not there is any object in the detection area (R1). The predetermined condition is a condition based on at least one of time information about time or vehicle information about the automobile (100).

According to this aspect, when a predetermined condition based on at least one of time information or vehicle information is satisfied, the driving unit stops switching the state of the shield member (8) according to the output of the object sensor (15). This reduces the chances of the state of the shield member (8) being switched due to an erroneous detection by the object sensor (15).

In a display system (1) according to a forty-sixth aspect, which may be implemented in conjunction with the forty-fourth aspect, the display system (1) is mounted on an automobile (100). The detection sensor (14) includes a light quantity sensor (16) to detect a quantity of at least part of external light coming from the detection area (R1). The predetermined condition is a condition based on at least one of time information about time or non-related information. The non-related information forms part of vehicle information about the automobile (100) and is unrelated to the automobile's (100) operation varying with a light quantity in a surrounding environment.

According to this aspect, when a predetermined condition based on at least one of time information or part of vehicle information requiring switching of the driving unit to be controlled based on the quantity of light detected by the light quantity sensor (16) is satisfied, the driving unit stops switching the state of the shield member (8) according to the output of the light quantity sensor (16). This reduces the chances of the state of the shield member (8) being switched due to an erroneous detection by the light quantity sensor (16).

Note that constituent elements according to the second to forty-sixth aspects, other than the first aspect, are not essential constituent elements for the display system (1) but may be omitted as appropriate.

An electronic mirror system (5) according to a forty-seventh aspect includes: the display system (1) of any one of the first to forty-sixth aspects; and an image capture device (4). The display device (2) displays, on the display screen (21), an image captured by the image capture device (4).

This aspect provides an electronic mirror system (5) including the display system (1) which is able to display an alternative image even when an error occurs in the display operation by the display device (2), and thereby reduce a decline in the visibility of a front view.

A moving vehicle (automobile (100)) according to a forty-eighth aspect includes: the electronic mirror system (5) of the forty-seventh aspect; and a moving vehicle body (110) mounting the electronic mirror system (5) thereon.

This aspect provides a moving vehicle including a display system (1) which is able to display an alternative image even when an error occurs in the display operation by the display device (2), and thereby reduce a decline in the visibility of a front view.

The invention claimed is:

1. A display system comprising:
   a display device having a display screen;
   a reflection optical system including at least a last reflective member, on which light that has emerged from the display screen of the display device is incident either directly or indirectly, the last reflective member being arranged to reflect the light toward a viewer's eyes;
   a housing holding the display device and the reflection optical system; and
   a shield member held by the housing to assume either a shielding state or an unshielding state, the shielding state being a state where the shield member at least partially cuts off light incident on, or reflected from, the last reflective member, the unshielding state being a state where the shielding state is canceled,
   the shield member being arranged to, in the shielding state, reflect, toward the viewer's eyes, external light impinging on the housing,
   the housing having a holding structure configured to hold the shield member, no matter whether the shield member assumes the shielding state or the unshielding state.

2. The display system of claim 1, wherein
the reflection optical system further includes a half mirror, and
the light that has emerged from the display screen of the display device is incident on the last reflective member via the half mirror, and the light reflected from the last reflective member is transmitted through the half mirror and then incident on the viewer's eyes.

3. The display system of claim 1, wherein
the housing includes, as the shield member, a mirror member in a plate shape, one surface of the mirror member being a reflective surface,
the mirror member being configured to switch its state from a first state to a second state, and vice versa, by performing a sliding operation and a rotational operation,
the first state being the unshielding state in which the mirror member is placed at a first position outside of an optical path of the light reflected from the last reflective member to be incident on the viewer's eyes,
the second state being the shielding state in which the mirror member is placed at a second position between the last reflective member and the viewer with the reflective surface oriented toward the viewer and in which the external light coming from outside of the housing is reflected from the reflective surface to produce a reflected image on the viewer's eyes.

4. The display system of claim 3, wherein
the reflection optical system further includes a half mirror, and
the light that has emerged from the display screen of the display device is incident on the last reflective member via the half mirror, and the light reflected from the last reflective member is transmitted through the half mirror and then incident on the viewer's eyes.

5. The display system of claim 4, wherein
the other surface, opposite from the reflective surface, of the mirror member is an opaque surface reflecting at least light, falling within a visible light wavelength range, at a lower reflectance than the reflective surface, and
the first state is a state where the opaque surface of the mirror member faces the half mirror.

6. The display system of claim 4, wherein
the display device includes a liquid crystal panel,
the display screen is provided with a first λ/4 retarder producing, in an electric field oscillation direction, a retardation of a quarter wavelength between incoming light and outgoing light, and
the half mirror has a multilayer structure in which a reflective polarization film and a second λ/4 retarder are stacked one on top of the other, the reflective polarization film transmitting light having a predetermined oscillation direction, the second λ/4 retarder producing, in the electric field oscillation direction, a retardation of a quarter wavelength between incoming light and outgoing light of the half mirror.

7. The display system of claim 3, wherein
the holding structure includes:
a projection provided for one of two members consisting of the housing and the mirror member; and
a guide groove provided for the other of the two members consisting of the housing and the mirror member and configured to receive the projection inserted thereto, and
the mirror member has its state switched from the first state to the second state, and vice versa, by having a position of the projection changed inside the guide groove.

8. The display system of claim 3, further comprising a state keeper configured to keep the mirror member in each of the first state and the second state.

9. The display system of claim 8, wherein
the state keeper includes a magnet provided for at least one of the two members consisting of the mirror member and the housing, and
the mirror member is kept, by magnetic force applied by the magnet, in each of the first state and the second state.

10. The display system of claim 3, further comprising an actuator configured to reciprocate the mirror member between the first position and the second position.

11. The display system of claim 10, wherein
the actuator includes a motor, and
a control circuit to control the motor is configured to, when receiving an error signal indicating that an error has occurred in display operation by the display device, drive the motor to displace the mirror member from the first position to the second position.

12. The display system of claim 10, wherein
the display system is mounted on an automobile, and
in a stopped state where the automobile stops running-related functions, the actuator displaces the mirror member to the second position.

13. The display system of claim 1, wherein
the housing includes, as the shield member, a mirror member in a plate shape, one surface of the mirror member being a reflective surface,
the holding structure is configured to further hold the last reflective member,
the holding structure holds the last reflective member and the mirror member such that the last reflective member and the mirror member are rotatable with respect to the housing with respective reflective surfaces of the mirror member and the last reflective member facing away from each other,
a normal to a center of the reflective surface of the mirror member is not parallel to a normal to a center of the reflective surface of the last reflective member,
the holding structure includes a rotator held rotatably with respect to the housing,
the last reflective member and the mirror member are held by the rotator, and
the rotator is configured to rotate, in the unshielding state, to a first rotational position where the reflective surface of the last reflective member is arranged to face the viewer, and also rotate, in the shielding state, to a second rotational position where the reflective surface of the mirror member is arranged to face the viewer.

14. The display system of claim 13, wherein
the rotator holds the mirror member and the last reflective member such that a normal to a center of the reflective surface of the mirror member is not parallel to a normal to a center of the reflective surface of the last reflective member.

15. The display system of claim 13, wherein
the rotator further holds at least one additional mirror member, and
a normal to a center of a reflective surface of the at least one additional mirror member is not parallel to a normal to a center of the reflective surface of the last reflective member or a normal to a center of the reflective surface of the mirror member.

16. The display system of claim 1, further comprising a driving unit configured to switch a state of the shield member from the unshielding state to the shielding state in accordance with output of a detection sensor configured to detect a situation in a predetermined detection area.

17. The display system of claim 16, wherein
an optical path of the light reflected from the last reflective member passes through the detection area,
the detection sensor includes an object sensor configured to determine whether or not there is any object in the detection area, and
the driving unit is configured to, when the object sensor detects presence of the object in the detection area, switch the state of the shield member from the unshielding state to the shielding state.

18. The display system of claim 16, wherein
the reflection optical system further includes a half mirror, and
the light that has emerged from the display screen of the display device is incident on the last reflective member via the half mirror, and the light reflected from the last reflective member is transmitted through the half mirror and then incident on the viewer's eyes to present an image to the viewer.

19. The display system of claim 16, wherein
the detection sensor includes a light quantity sensor configured to detect a quantity of at least part of the external light coming from the detection area.

20. The display system of claim 16, wherein
the driving unit is configured to change an orientation of the housing according to output of the detection sensor.

* * * * *